(12) United States Patent  
Obayashi et al.

(10) Patent No.: US 9,223,801 B2
(45) Date of Patent: Dec. 29, 2015

(54) INFORMATION MANAGEMENT METHOD AND INFORMATION MANAGEMENT APPARATUS

(75) Inventors: Toshifumi Obayashi, Toyota (JP); Mio Okunishi, Gifu (JP); Kyohei Tamai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 453 days.

(21) Appl. No.: 13/562,721

(22) Filed: Jul. 31, 2012

(65) Prior Publication Data

US 2013/0073553 A1  Mar. 21, 2013

(30) Foreign Application Priority Data

Sep. 15, 2011 (JP) ................................. 2011-202442

(51) Int. Cl.
*G06F 17/30* (2006.01)
(52) U.S. Cl.
CPC ...... *G06F 17/30241* (2013.01); *G06F 17/3087* (2013.01)
(58) Field of Classification Search
CPC .................... G06F 17/30315; G06F 17/30345; G06F 17/30442
USPC .......... 707/715, 741, 737, 736, 812, 769, 797
See application file for complete search history.

(56) References Cited

U.S. PATENT DOCUMENTS 5,742,924 A * 4/1998 Nakayama ..................... 701/458
5,793,310 A * 8/1998 Watanabe et al. ........ 340/995.14
6,011,494 A * 1/2000 Watanabe et al. ........ 340/995.14
8,849,792 B2 * 9/2014 Obayashi et al. ............. 707/715
2001/0011270 A1 8/2001 Himmelstein et al.
2002/0169548 A1 * 11/2002 Kuroda et al. ................ 701/212

(Continued)

FOREIGN PATENT DOCUMENTS

JP  2007-41189  2/2007
JP  2007-538343  12/2007

OTHER PUBLICATIONS

"Geotagging Devices and Software; Now You'll Always Know Where You Took That Picture.", May 1, 2009, pp. 1-5, Retrieved from the Internet: URL:http://www.shutterbug.com /content/geotagging-devices-and-software-now-you%e2%80%9911-always-know-where-you-took-pictures.

(Continued)

*Primary Examiner* — Sheree Brown
(74) *Attorney, Agent, or Firm* — Staas & Halsey LLP

(57) ABSTRACT

An information management method to be executed by a computer, the information management method includes: accepting a registration request including information in which latitude and longitude are included, and correspondence information corresponding to the position information; generating one character string by alternately arraying one character of the latitude and another one character of the longitude, each of the one character and the other one character is in a same digit regarding all of the digits of each of the latitude and the longitude, or some digits from the least significant digit of each of the latitude and the longitude; and storing the correspondence information in a storage unit in a manner correlated with the character string as a key.

8 Claims, 57 Drawing Sheets

1

(56) References Cited

U.S. PATENT DOCUMENTS

| | | |
|---|---|---|
| 2005/0278378 A1 | 12/2005 | Frank |
| 2005/0280557 A1* | 12/2005 | Jha et al. ................. 340/988 |
| 2006/0145839 A1* | 7/2006 | Sandage ................. 340/539.17 |
| 2006/0271281 A1* | 11/2006 | Ahn et al. .................... 701/208 |
| 2008/0162519 A1 | 7/2008 | Hsieh |
| 2008/0240506 A1 | 10/2008 | Nakamura et al. ............ 382/104 |
| 2009/0307263 A1* | 12/2009 | Skibiski et al. ........... 707/103 R |
| 2010/0217525 A1* | 8/2010 | King et al. ................... 701/300 |
| 2010/0289675 A1 | 11/2010 | Ueda |
| 2011/0320319 A1* | 12/2011 | Streich ........................ 705/27.1 |
| 2012/0036163 A1* | 2/2012 | Myers et al. ................. 707/797 |

OTHER PUBLICATIONS

Extended European Search Report dated Jul. 24, 2014 in European Patent Application No. 12178026.6-1951/2570941.

Japanese Office Action dated Nov. 18, 2014 in corresponding Japanese Patent Application No. 2011-202442 (4 pages) (3 pages English Translation).

First Chinese Office Action issued Jan. 27, 2015 by State Intellectual Property Office of China (SIPO) in related Chinese Patent Application No. 201210343176.8, including Search Report (8 pages) (14 pages English Translation).

Chinese Office Action dated Oct. 8, 2015 in related Chinese Patent Application No. 201210343176.8 (7 pages) (7 pages English Translation).

* cited by examiner

FIG. 7

| THE POSITION AND SIZE OF THE FIRST RECTANGULAR REGION |
| THE POSITION AND SIZE OF THE SECOND RECTANGULAR REGION |
| ⋮ |
| THE POSITION AND SIZE OF THE n'TH RECTANGULAR REGION |

FIG. 8

| KEY | VALUE | | |
|---|---|---|---|
| ++10339515263748 | id | DATA | REGISTRATION DATE AND TIME |
| | id1111 | ·MOBILE DEVICE ID<br>·REPRESENTATIVE POSITION (LATITUDE AND LONGITUDE)<br>·SIZE INFORMATION<br>·ATTRIBUTE INFORMATION | ... |
| | id2222 | ... | ... |
| | id3333 | ... | ... |
| ++10339515888888800112233 | id | DATA | REGISTRATION DATE AND TIME |
| | id5555 | ... | ... |
| ++10339515999900 | id | DATA | REGISTRATION DATE AND TIME |
| | id6666 | ... | ... |
| ++10339515999901 | id | DATA | REGISTRATION DATE AND TIME |
| | id6666 | ... | ... |
| ++10339515999910 | id | DATA | REGISTRATION DATE AND TIME |
| | id6666 | ... | ... |

131

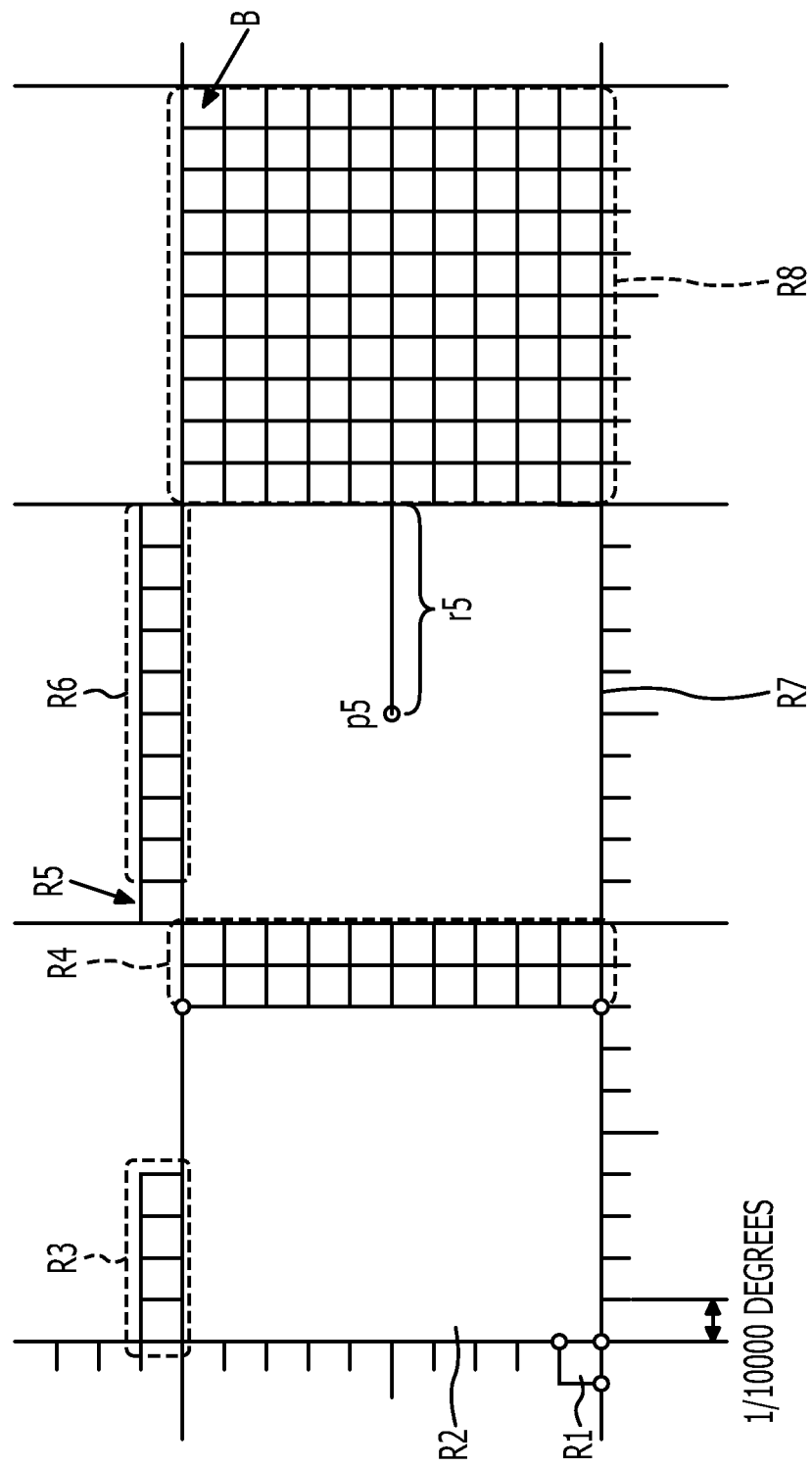

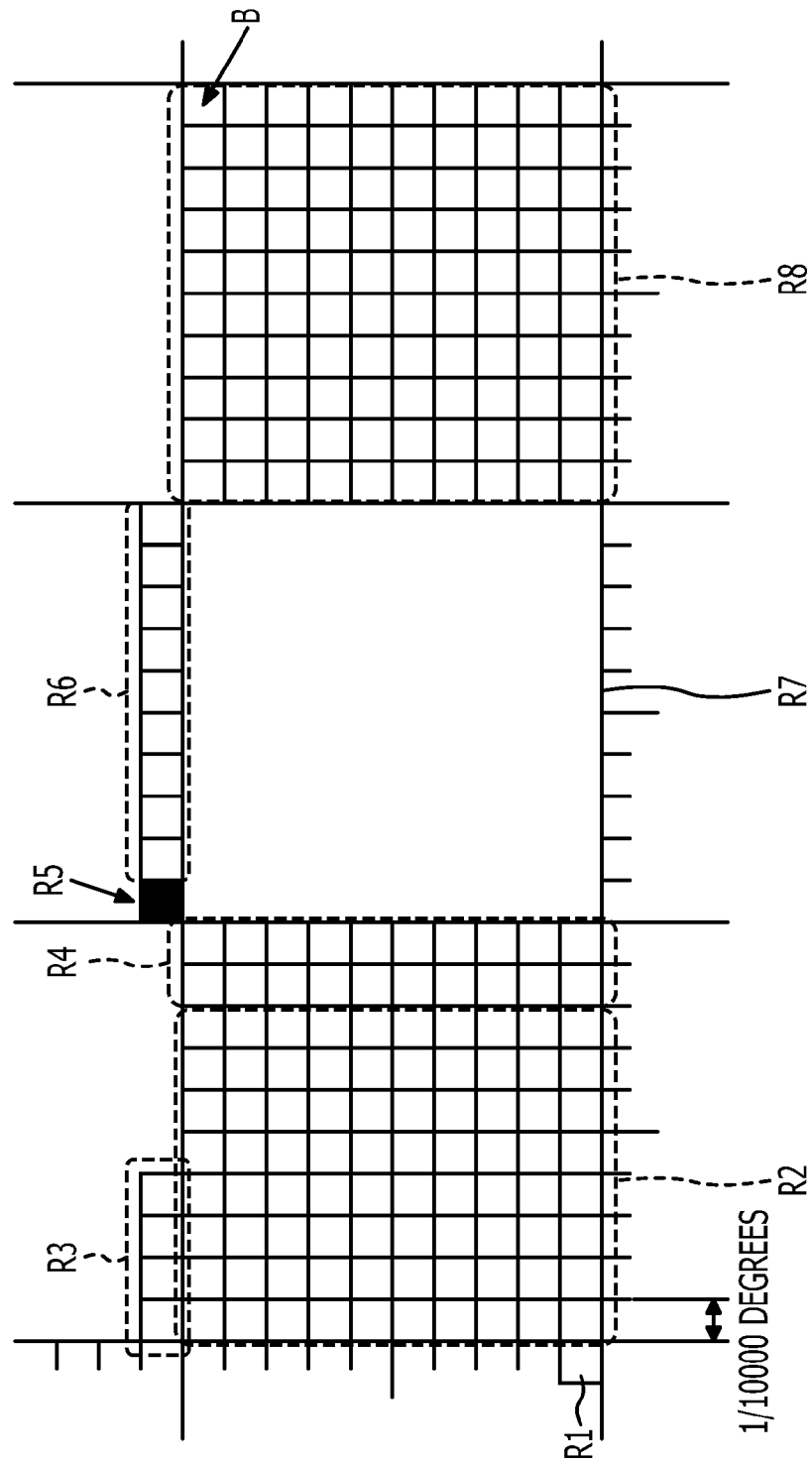

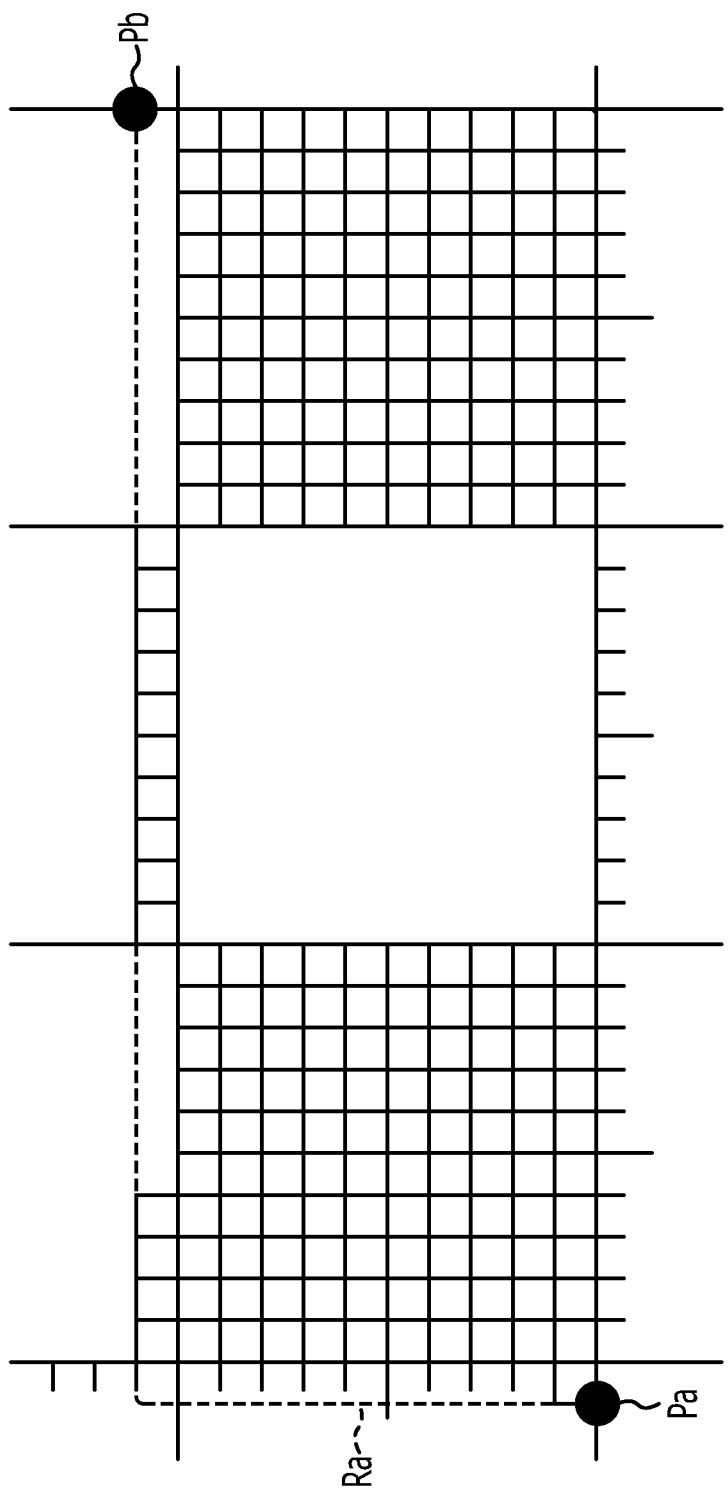

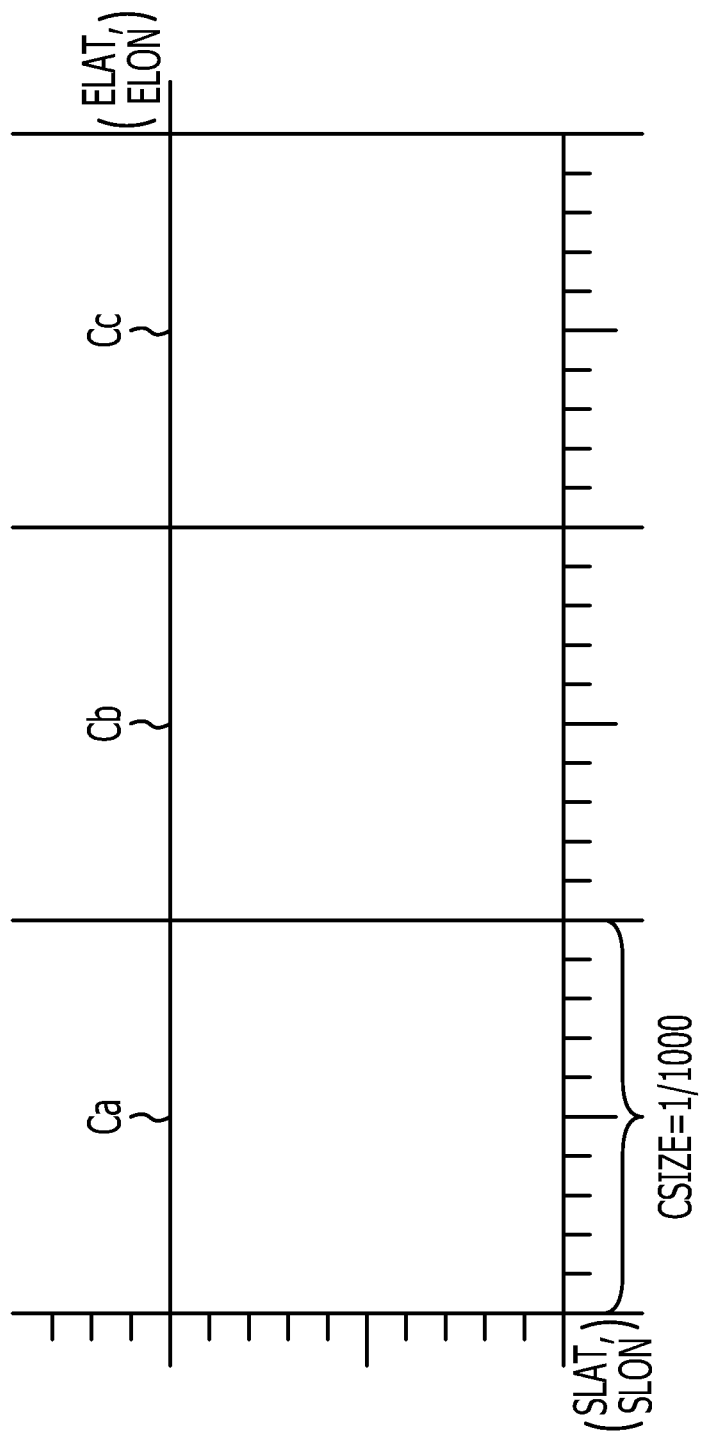

FIG. 24

| MOBILE DEVICE ID | COUNTER | ATTRIBUTE INFORMATION, ETC. |
|---|---|---|
| id2222 | 0 | ... |
|  |  |  |

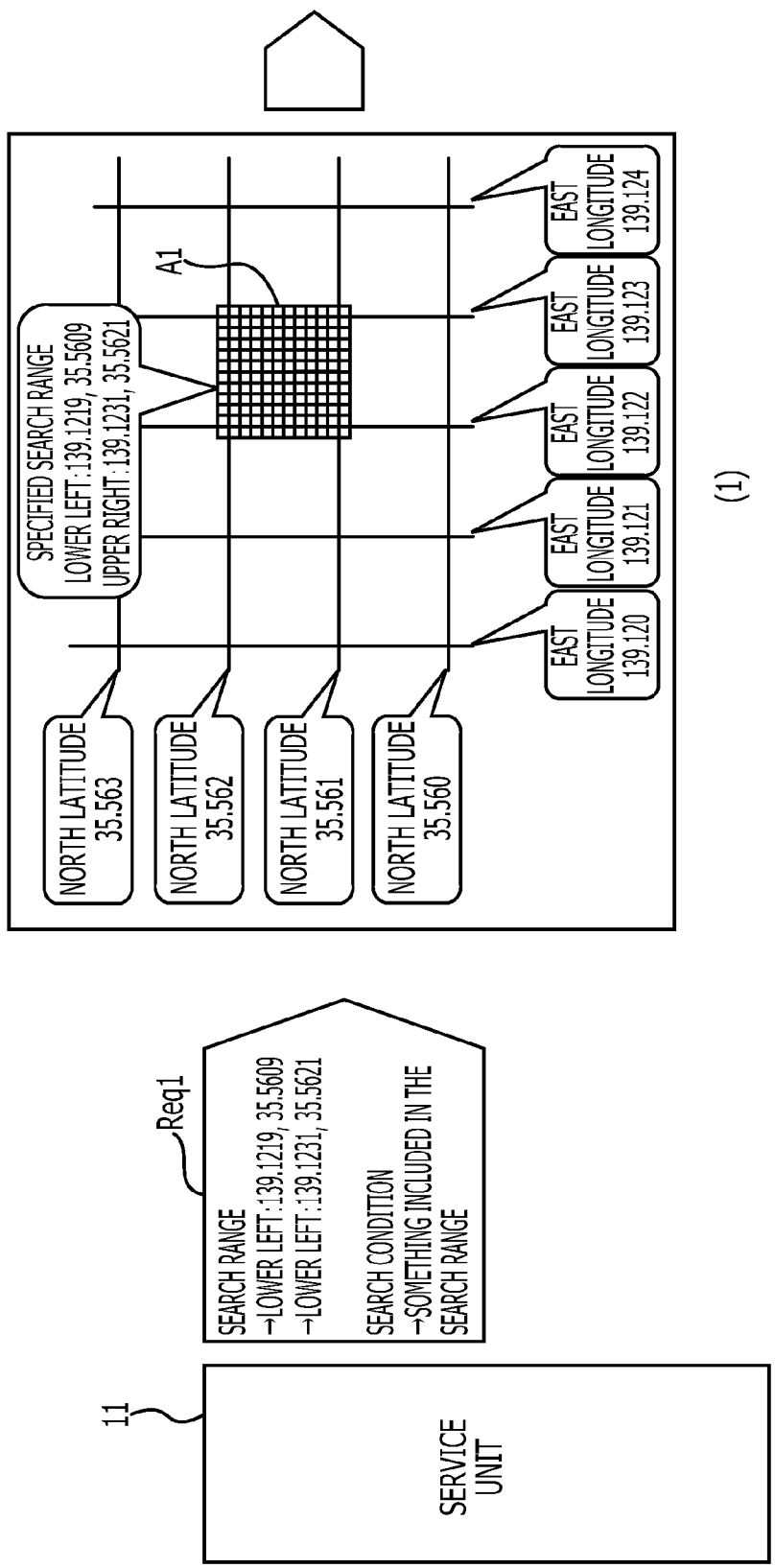

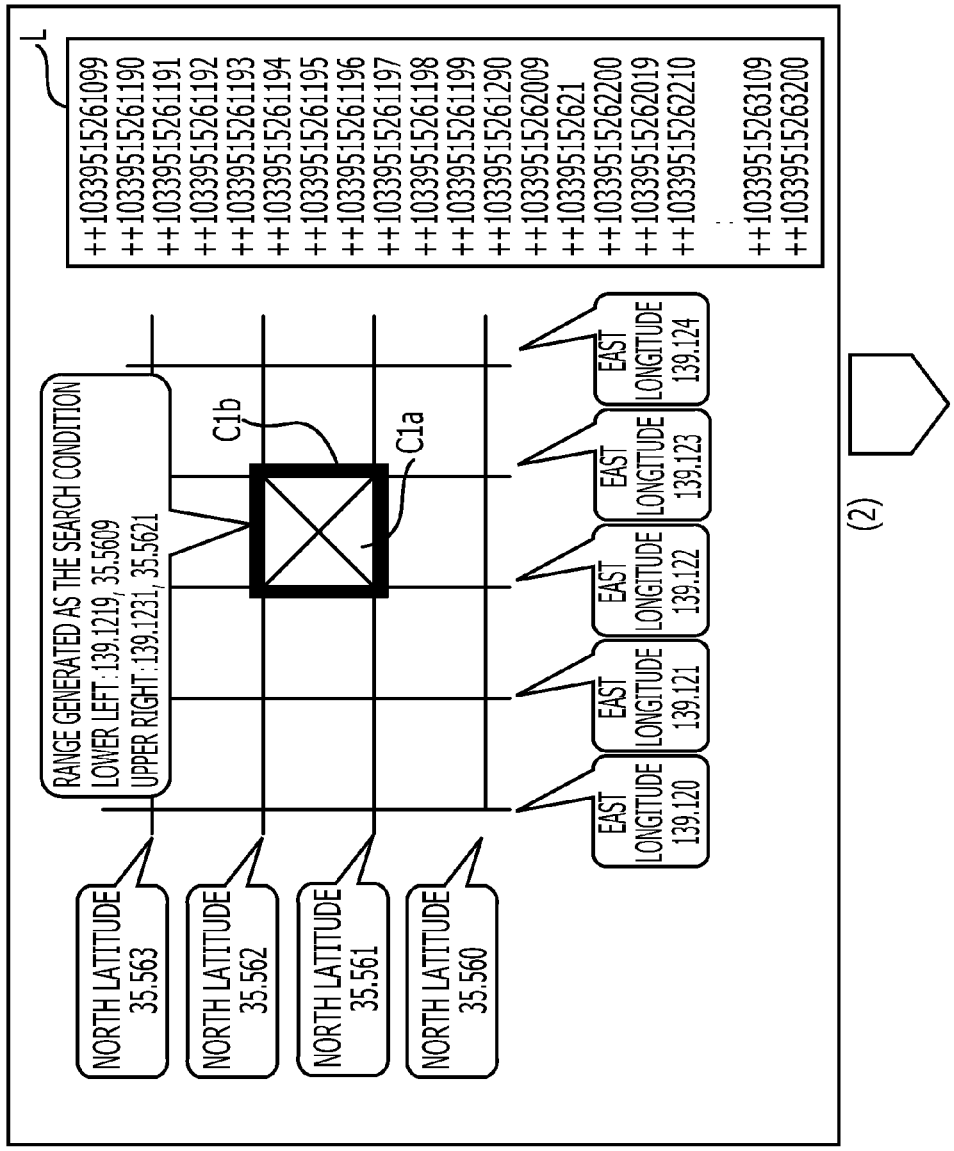

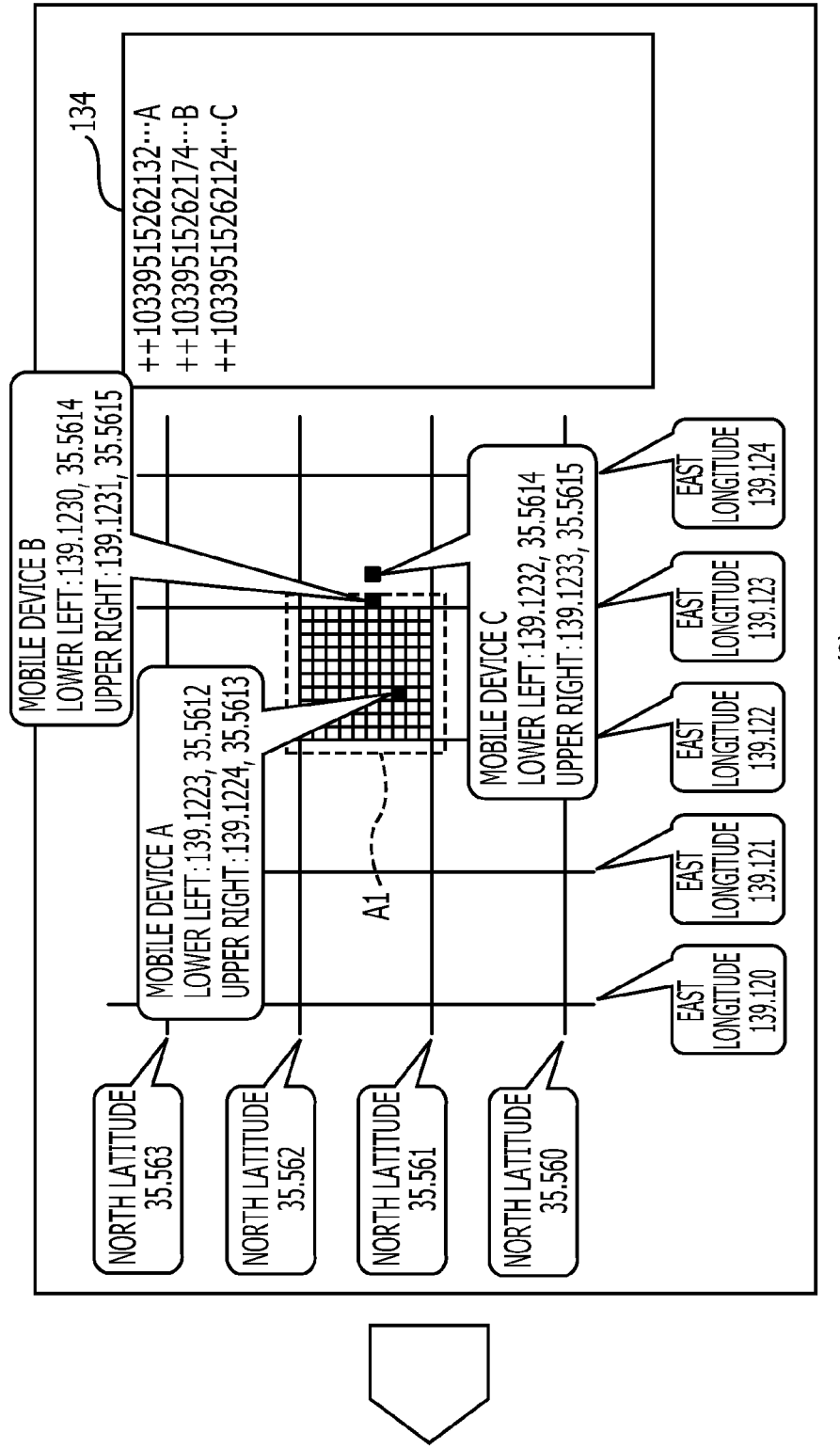

FIG. 27A
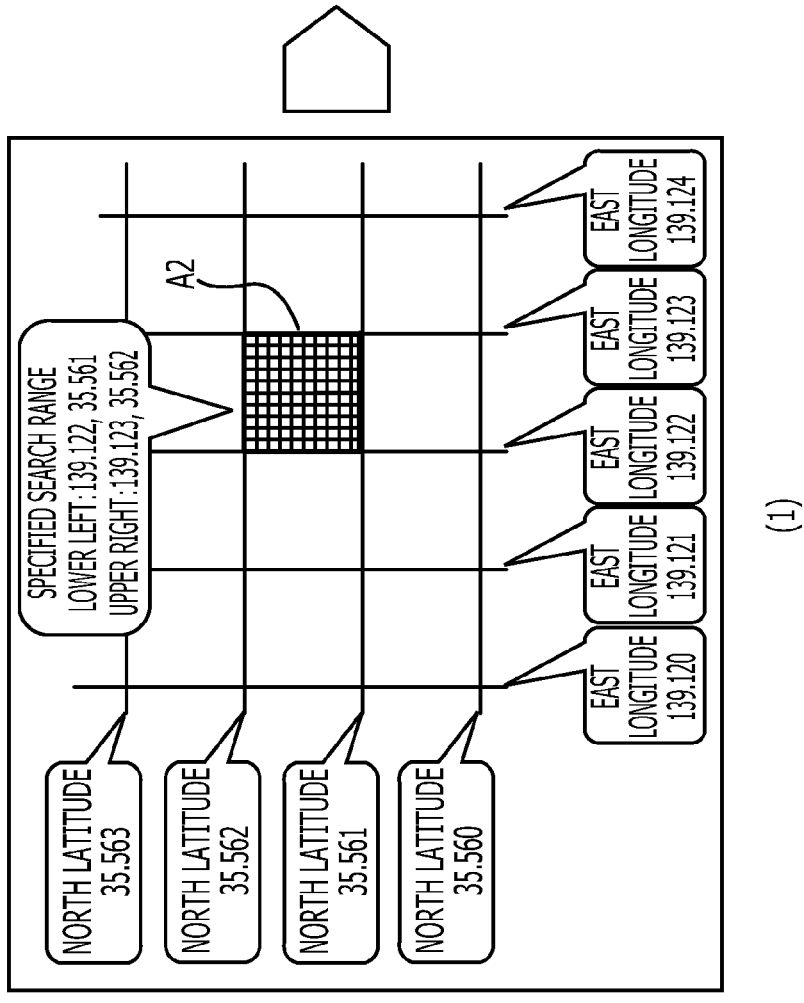
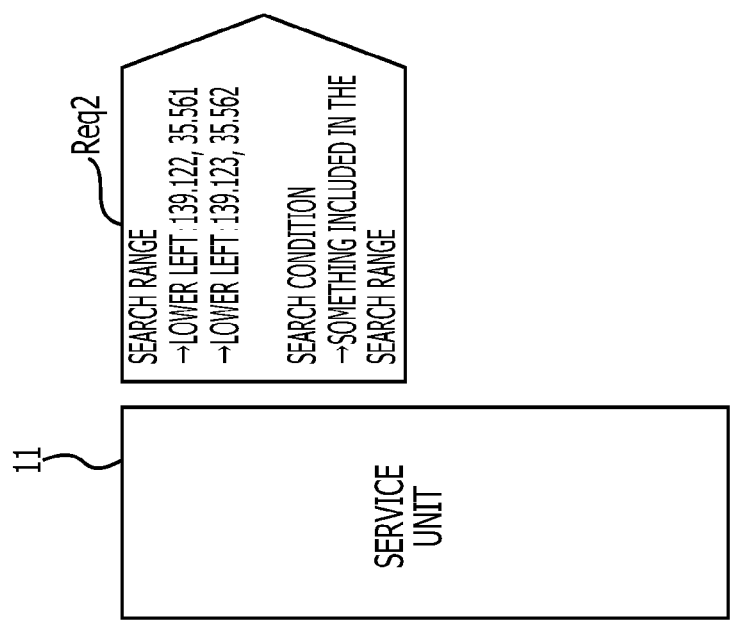

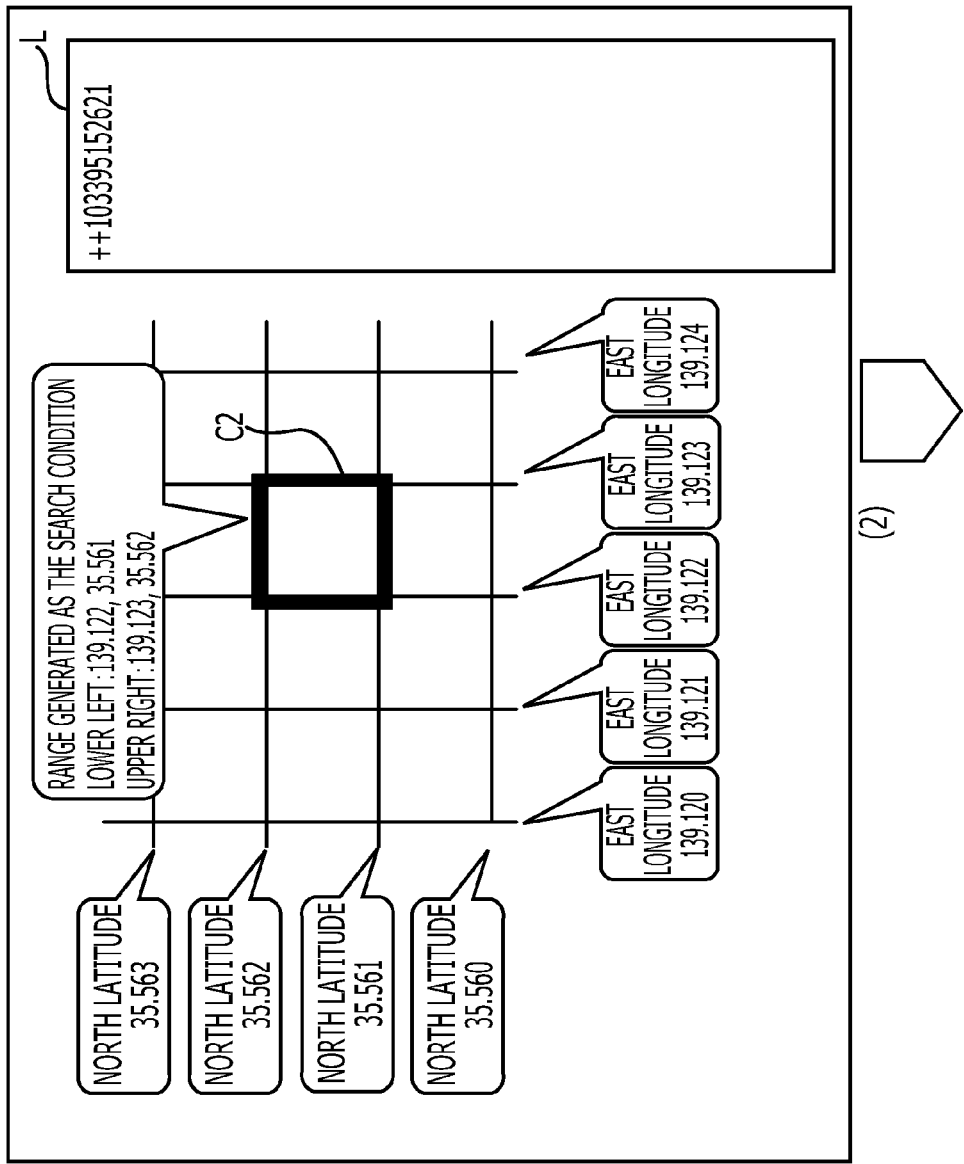

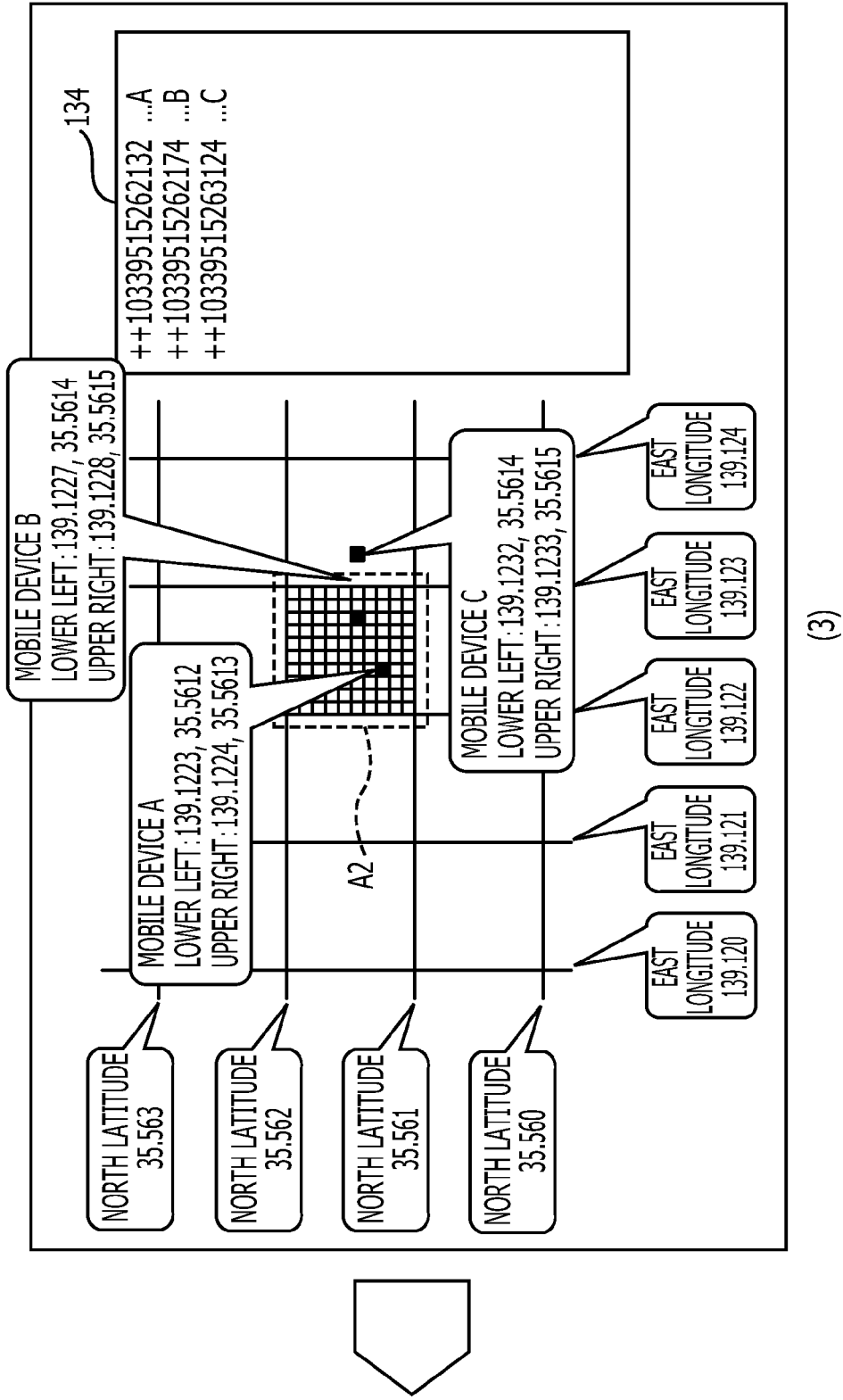

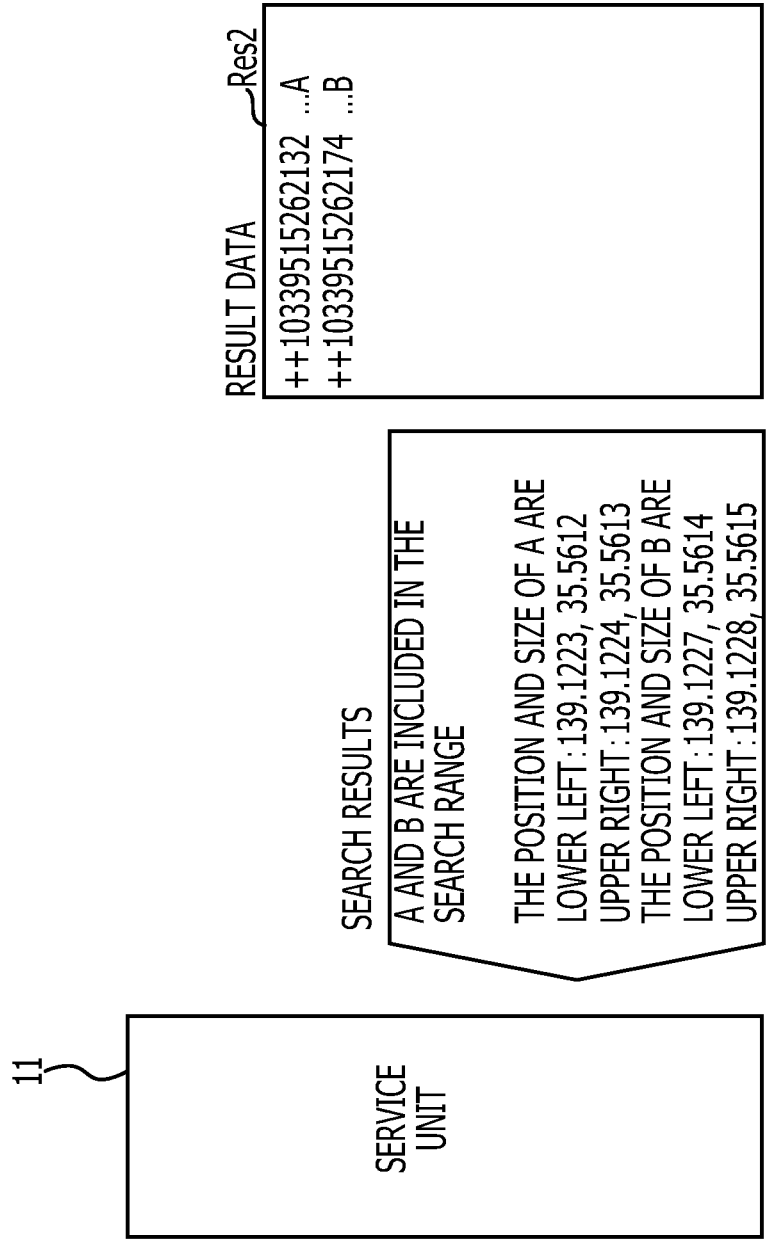

FIG. 28A
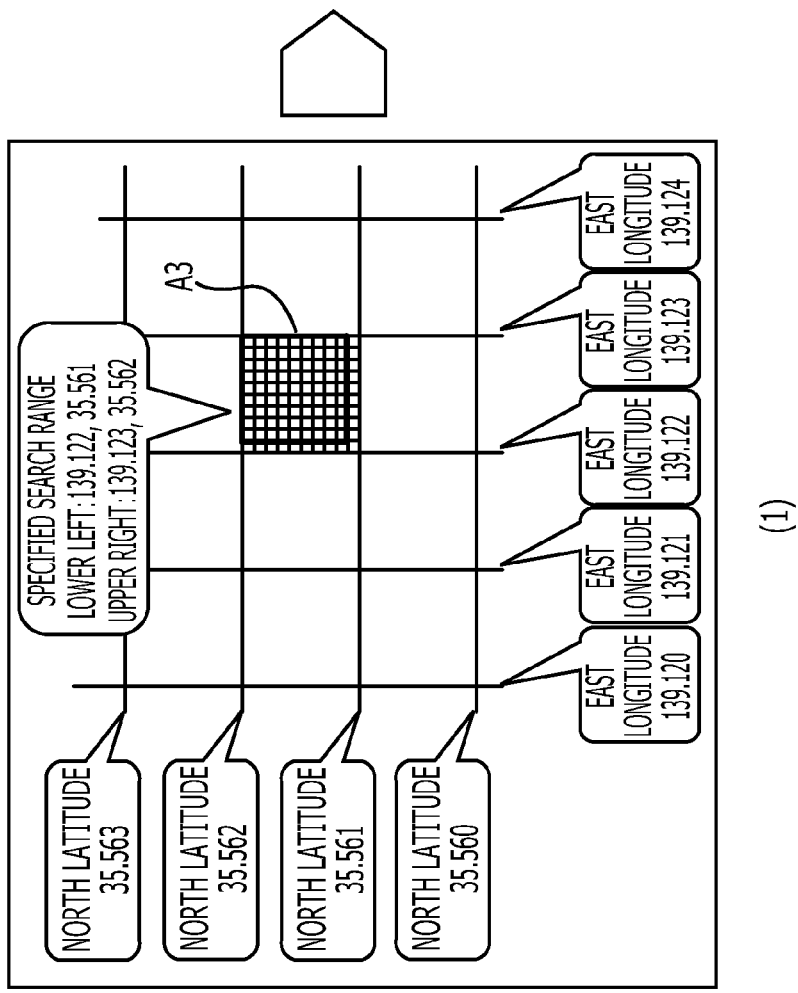
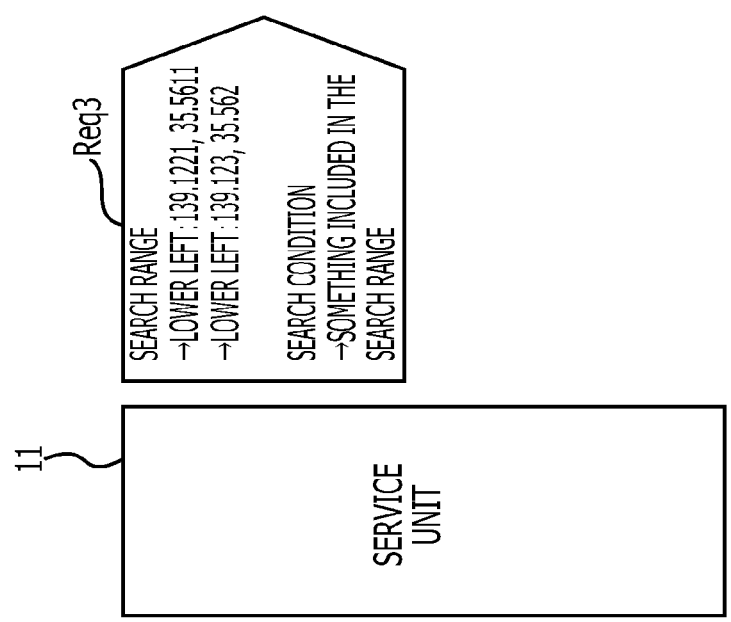

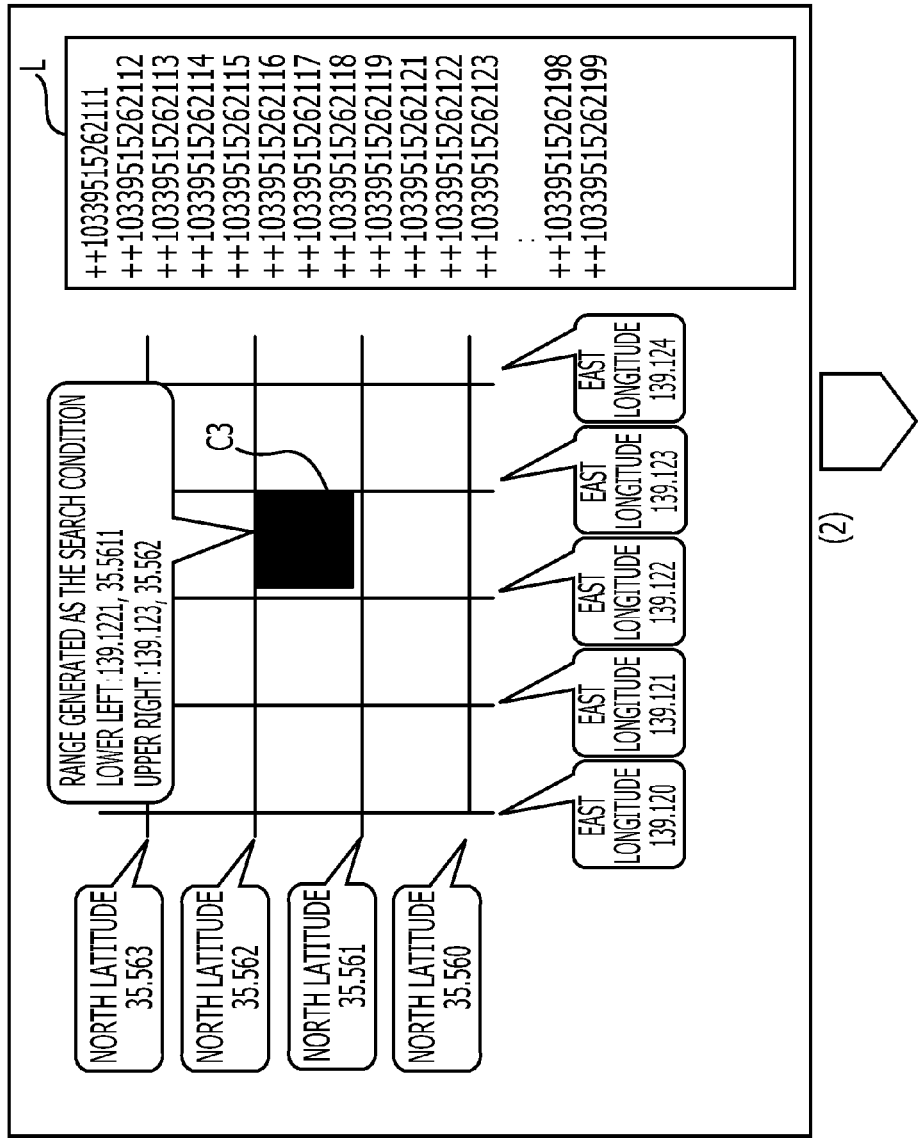

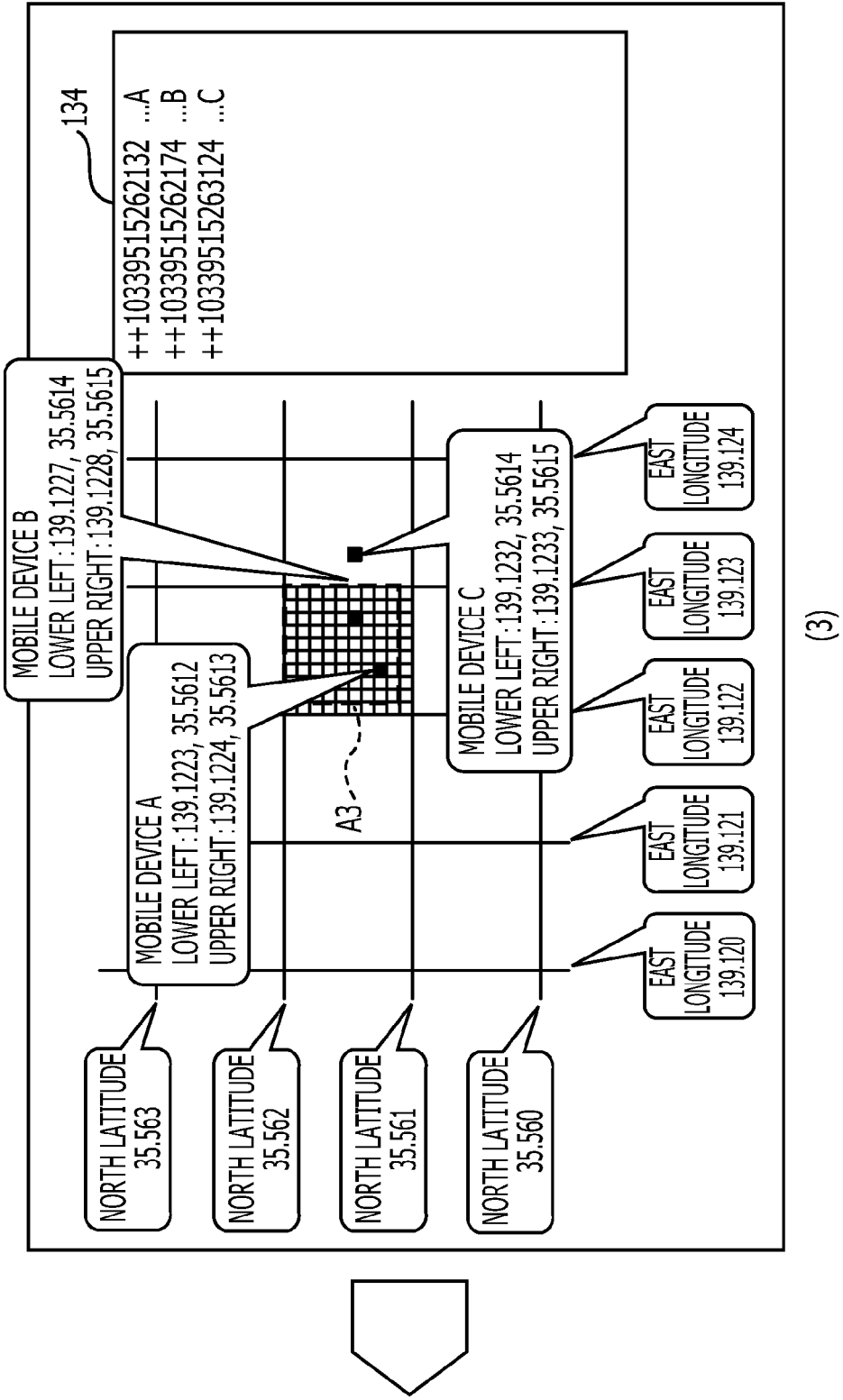

FIG. 29A
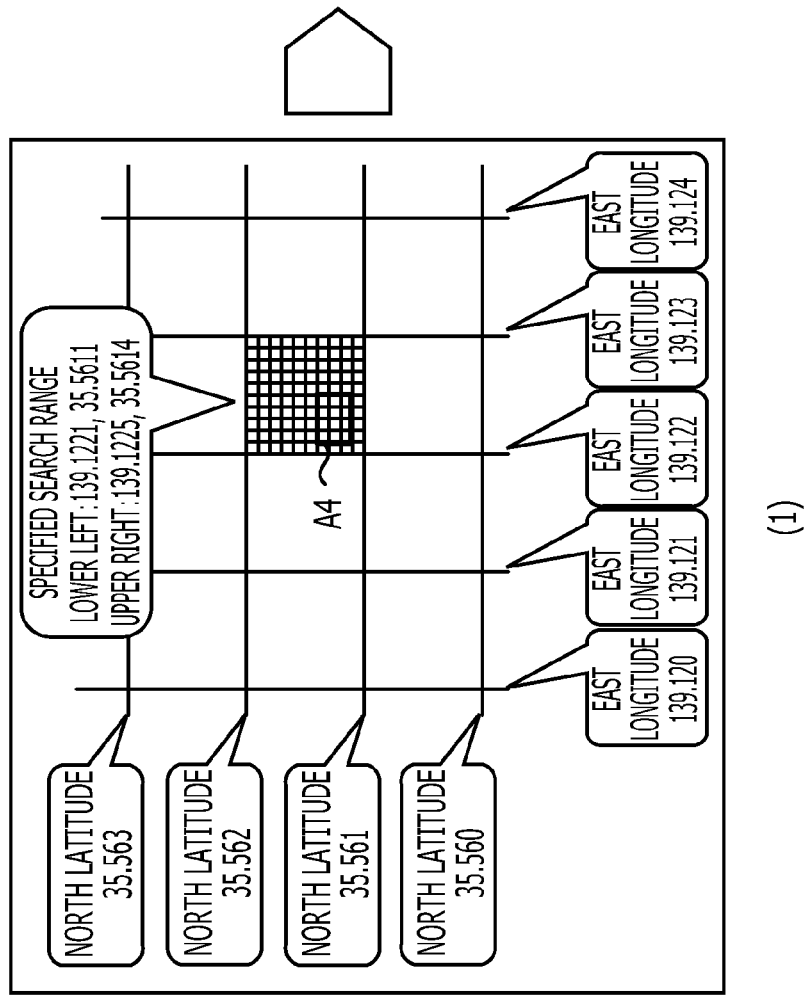
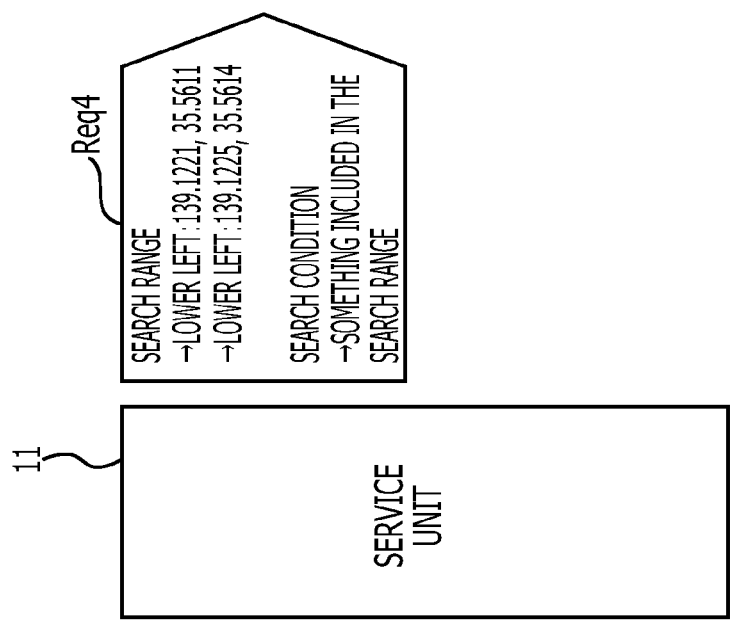

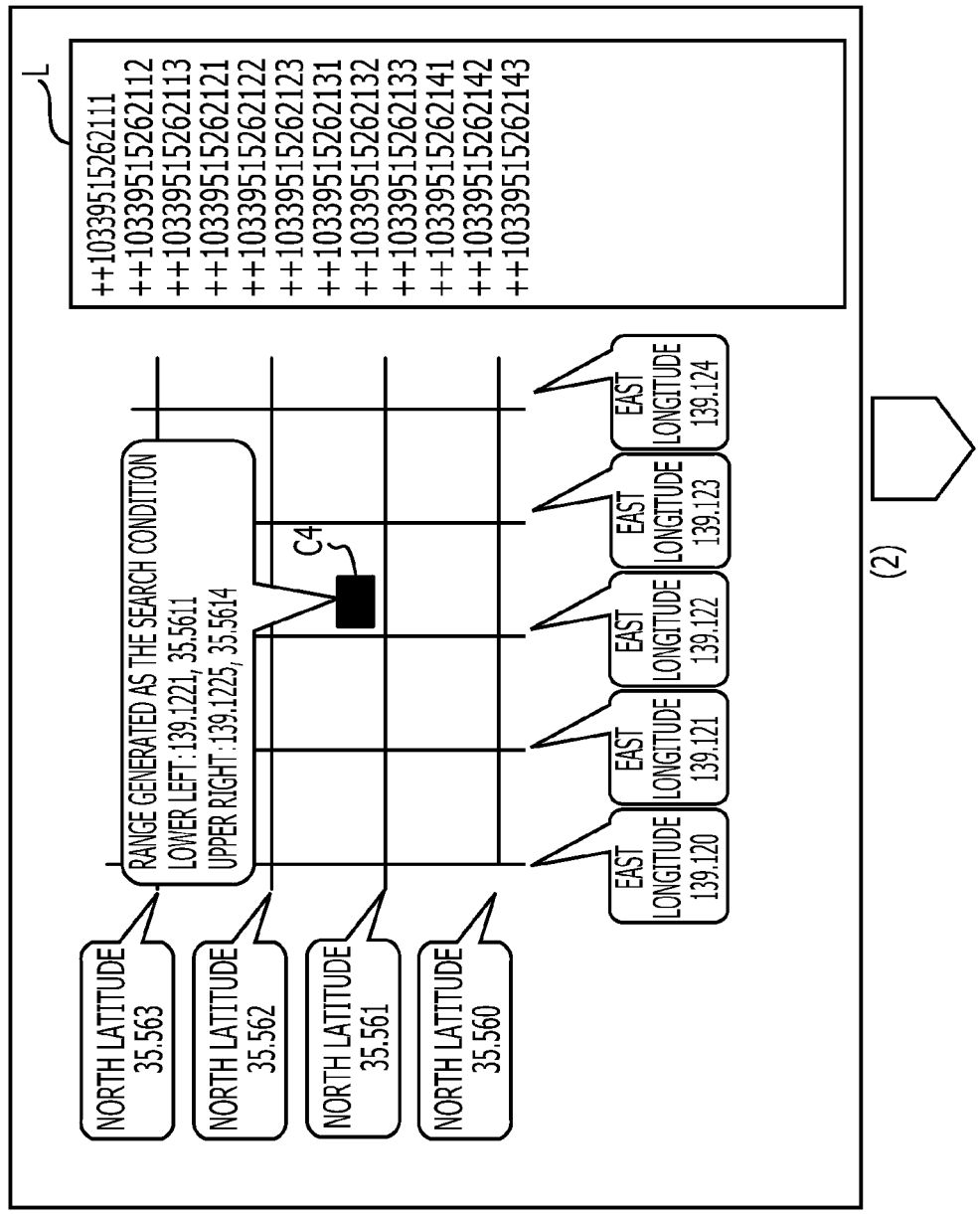

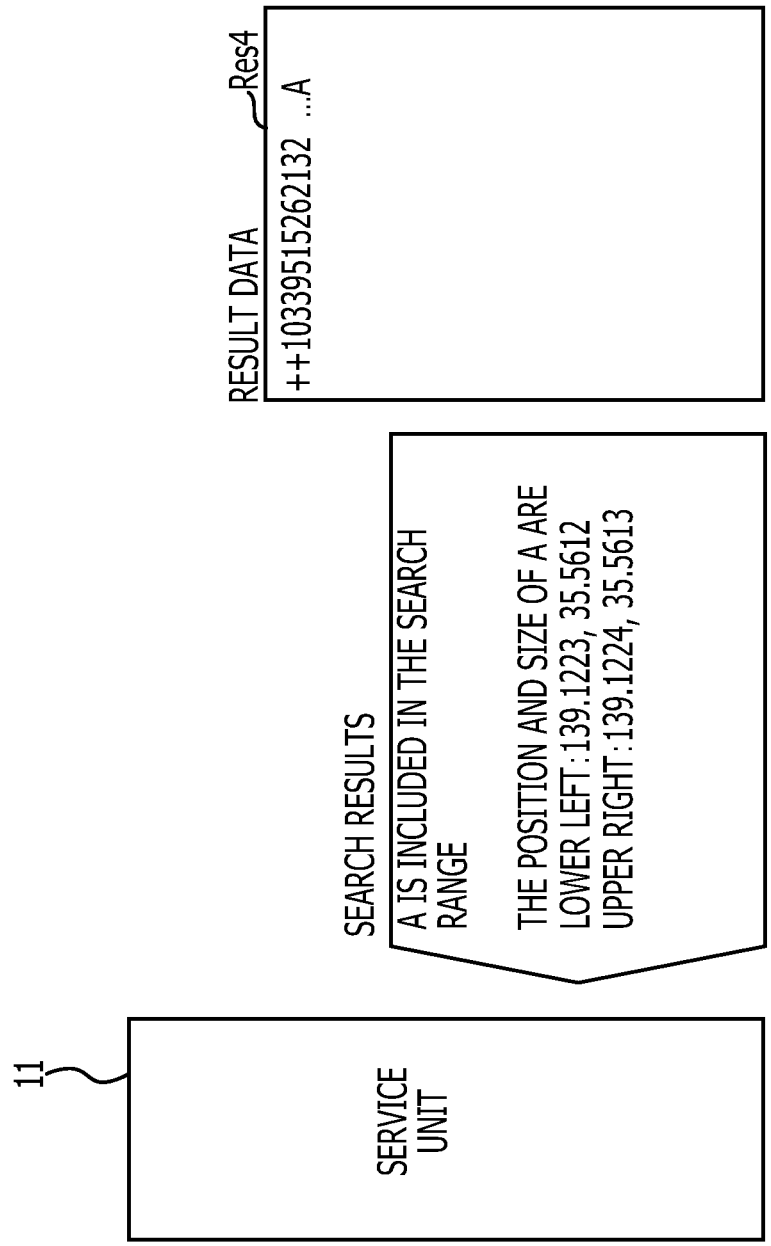

FIG. 30A
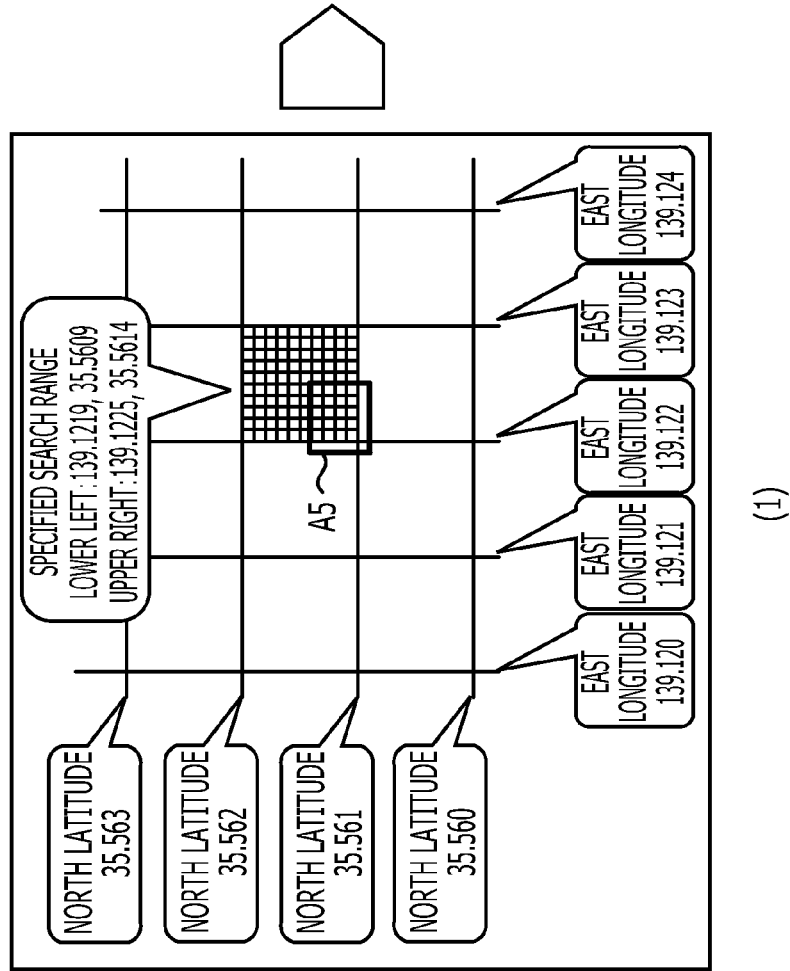
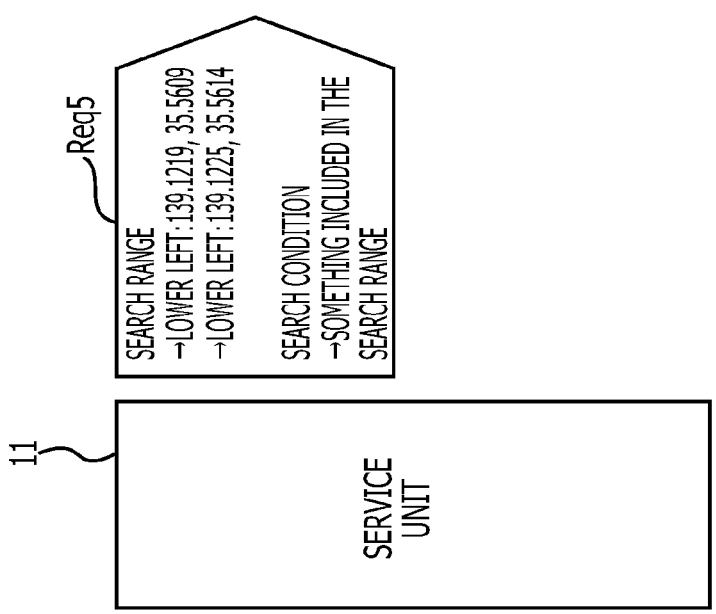

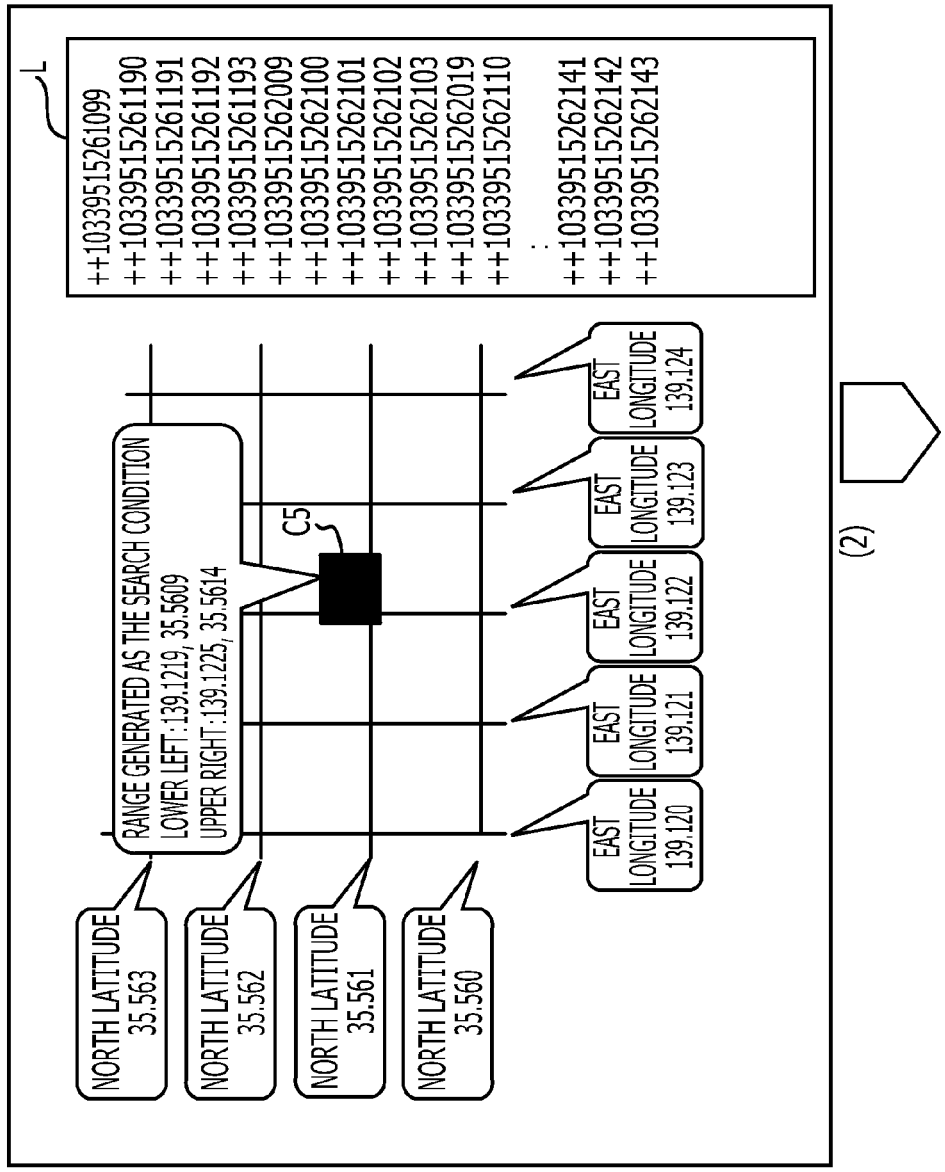

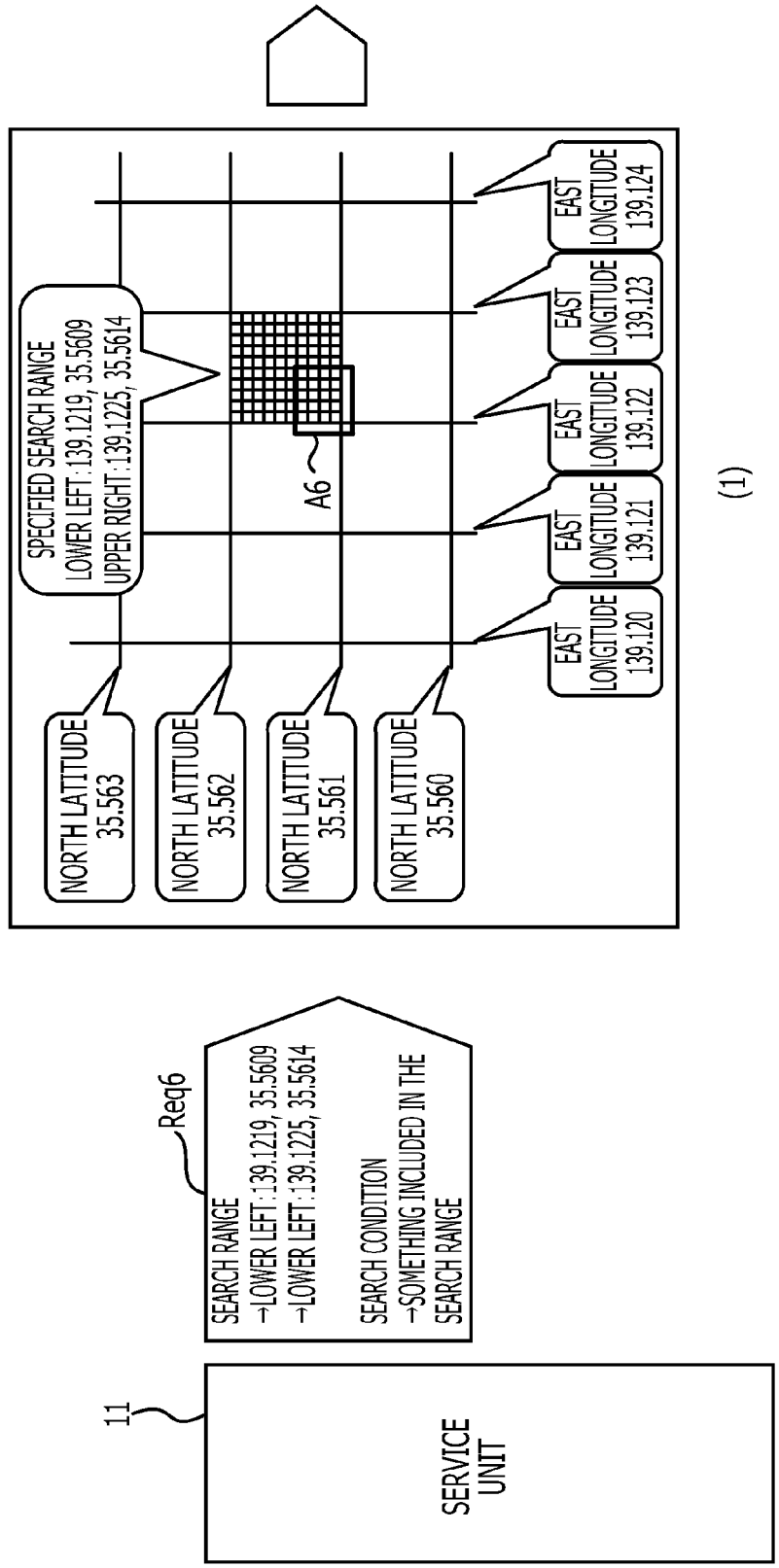

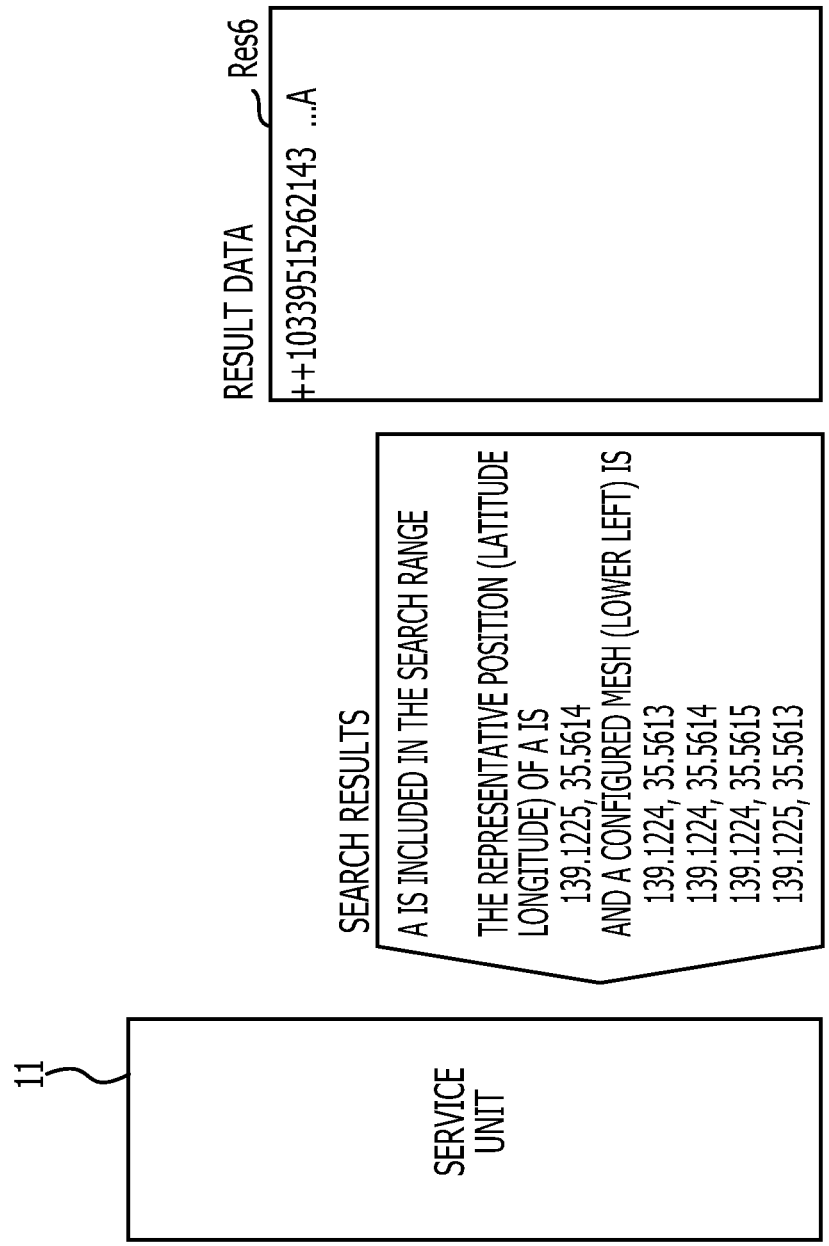

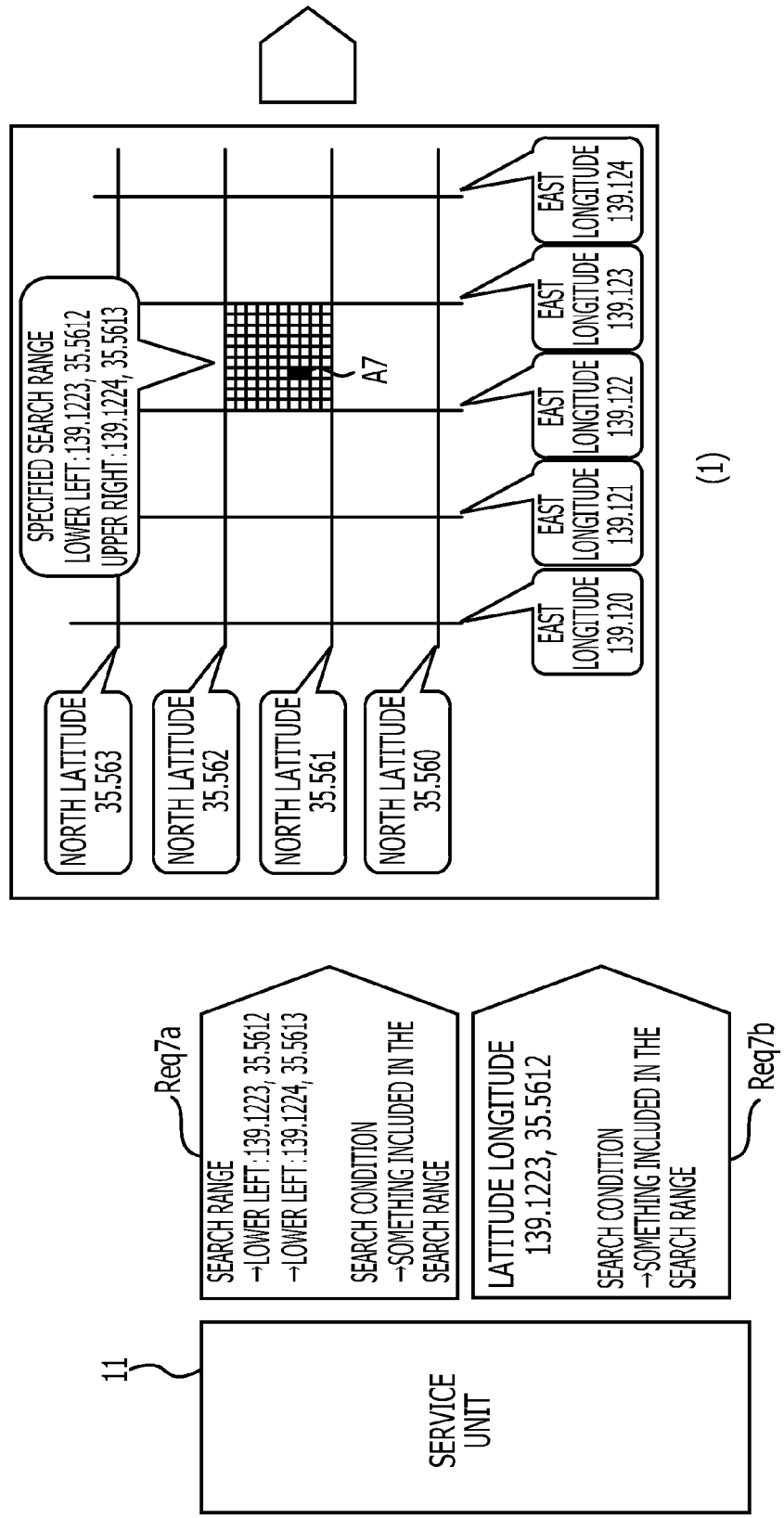

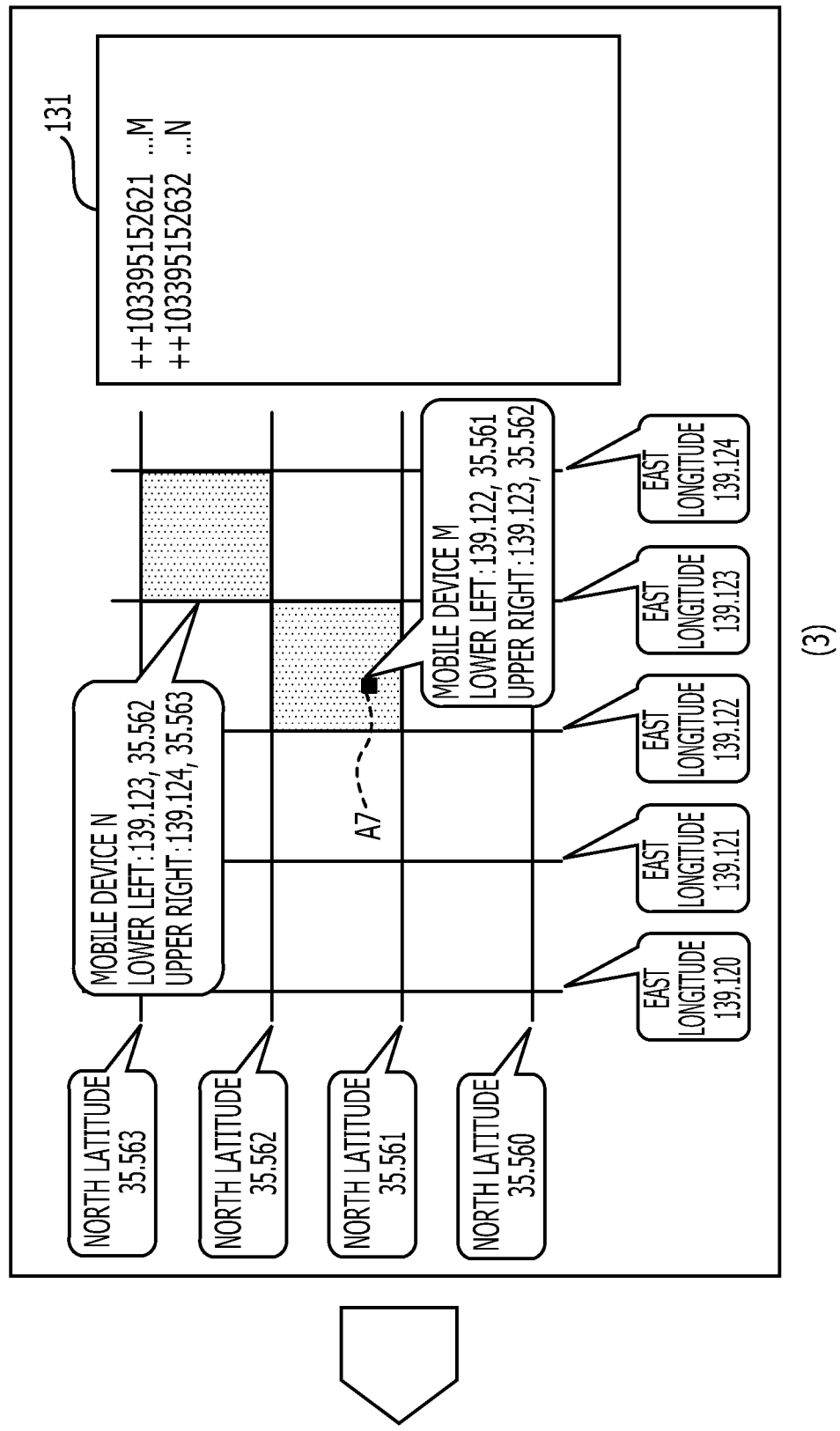

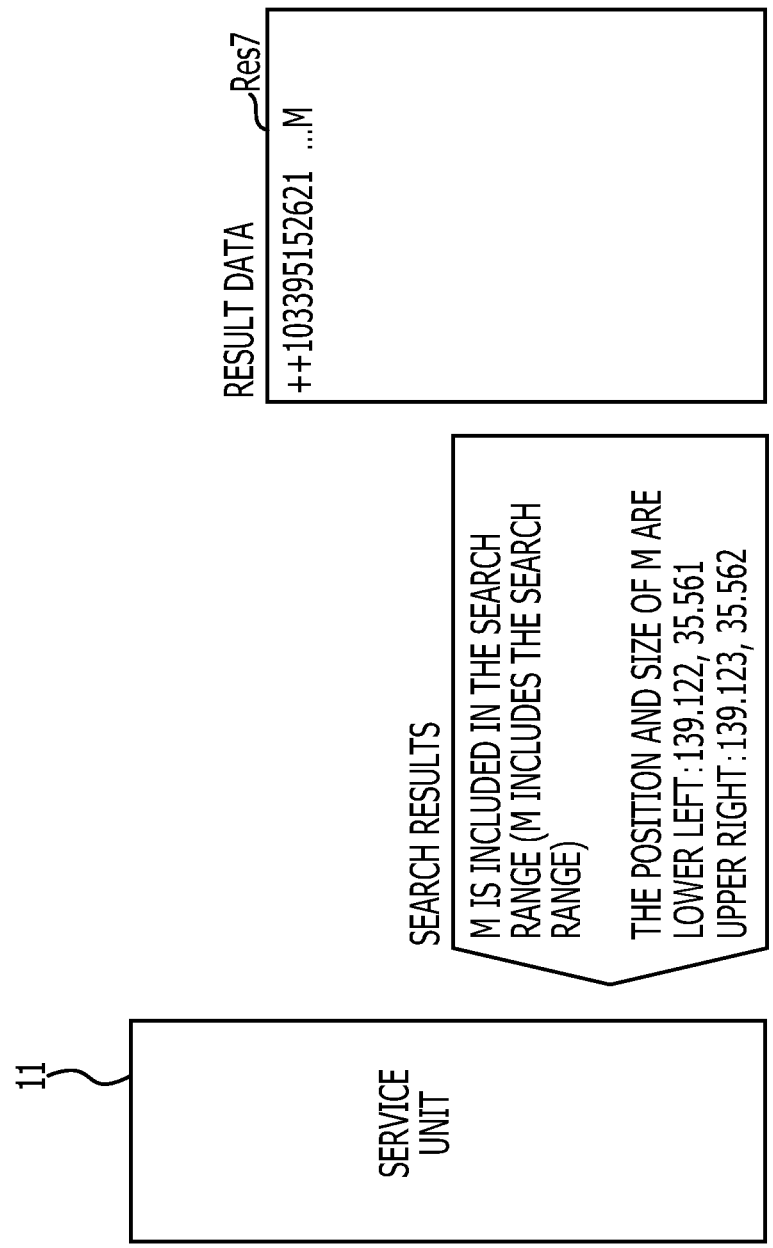

INFORMATION MANAGEMENT METHOD AND INFORMATION MANAGEMENT APPARATUS

CROSS-REFERENCE TO RELATED APPLICATION

This application is based upon and claims the benefit of priority of the prior Japanese Patent Application No. 2011-202442, filed on Sep. 15, 2011, the entire contents of which are incorporated herein by reference.

FIELD

The present disclosure relates to an information management method and an information management apparatus.

BACKGROUND

There is a search service wherein latitude and longitude are collected and managed as position information of mobile devices or facilities or the like to perform search as to the position information. The mobile devices mentioned here are in-vehicle devices, cellular phones, tablet-type terminals, or the like. The mobile devices are principally movable terminals having a communication function taking advantage of a mobile communication network, or devices or persons carrying such a terminal. Examples of the contents of the search service include a service such as search for a mobile group included in a certain range (e.g., within a facility) disclosed in Japanese Laid-open Patent Publication No. 2007-41189.

SUMMARY

According to an aspect of the invention, an information management method to be executed by a computer, the information management method includes: accepting a registration request including information in which latitude and longitude are included, and correspondence information corresponding to the position information; generating one character string by alternately arraying one character of the latitude and another one character of the longitude, each of the one character and the other one character is in a same digit regarding all of the digits of each of the latitude and the longitude, or some digits from the least significant digit of each of the latitude and the longitude; and storing the correspondence information in a storage unit in a manner correlated with the character string as a key.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a data structure of size information;

FIG. 8 is a diagram illustrating a configuration example of a mobile information storage unit;

FIG. 13 is a diagram illustrating an example of a rectangular region group;

FIG. 14 is a diagram illustrating an example of division to a cell group of a rectangular region;

FIG. 15 is a diagram for describing a minimal rectangular region including all of specified rectangular regions;

FIG. 16 is a diagram illustrating an example of cells in integrated grain-size CSIZE increments determined in an inclusion region;

FIG. 24 is a diagram illustrating a configuration example of a management table;

FIGS. 26A, 26B, 26C, and 26D are diagrams illustrating a first specific example of search processing of mobile information;

FIGS. 27A, 27B, 27C, and 27D are diagrams illustrating a second specific example of search processing of mobile information;

FIGS. 28A, 28B, 28C and 28D are diagrams illustrating a third specific example of search processing of mobile information;

FIGS. 29A, 29B, 29C and 29D are diagrams illustrating a fourth specific example of search processing of mobile information;

FIGS. 30A, 30B, 30C and 30D are diagrams illustrating a fifth specific example of search processing of mobile information;

FIGS. 31A, 31B, 31C and 31D are diagrams illustrating a sixth specific example of search processing of mobile information; and FIGS. 32A, 32B, 32C and 32D are diagrams illustrating a seventh specific example of search processing of mobile information.

DESCRIPTION OF EMBODIMENTS

The present inventor has studied collecting and managing latitude and longitude as position information such as mobile devices, facilities, and so forth, and providing a high-speed search service regarding the position information. It can be conceived to employ a RDB (Relational Database) as a management tool of position information such as mobile devices, facilities, and so forth. For example, it can be conceived to register an ID and position information of a mobile device, facility, or the like in the RDB as attributes of the mobile device, facility, or the like.

However, in this case, for example, when considering to search for a mobile group included in a certain range, this range has to be compared with position information of all of records. As described above, not only in-vehicle devices to installed in a vehicle but also terminals carried by people are also included in mobile devices to be managed. Accordingly, the number of records extends to several tens of millions, or may exceed several tens of millions. Therefore, it can be conceived that it is difficult to obtain practical search performance by comparing the position information of all of the records and a certain range.

However, in order to improve search performance, it can be conceived to create an index regarding position information. However, in this case, the position information of a mobile device changes every moment, and accordingly, it can be conceived that rearrangement of the index frequently may occur to increase processing load due to this rearrangement up to an unignorable extent.

Therefore, a technique disclosed in the present embodiment manage position information while securing practical search performance.

Figure 1:
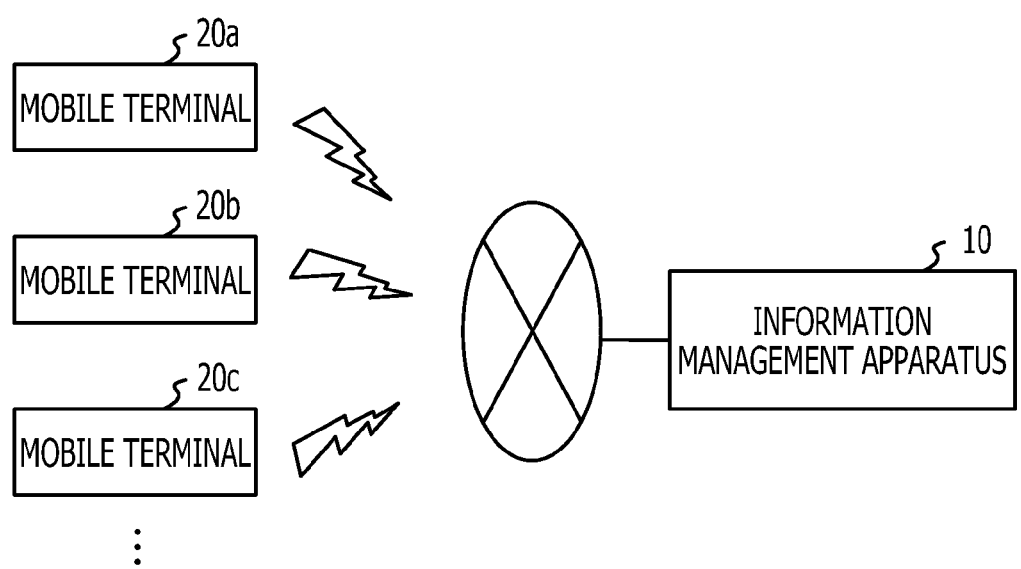
FIG. 1 is a diagram illustrating a configuration example of an information management system according to an embodiment of the present disclosure.

Hereafter, an embodiment of the present disclosure will be described based on the drawings. FIG. 1 is a diagram illustrating a configuration example of an information management system according to an embodiment of the present disclosure. With an information management system 1 in the drawing, multiple mobile terminals 20 such as mobile terminals 20a, 20b, and 20c and so forth, and an information management apparatus 10 are configured so as to communicate via a mobile communication network or the like, for example.

The mobile terminals 20 are employed for recognizing the position of a mobile device serving as an object to be managed. Accordingly, the mobile terminals 20 are suitably movable terminals having a communication function taking advantage of a mobile communication network, and a GPS (Global Positioning System) function such as in-vehicle devices, cellular phones, smart phones, tablet-type terminals, or the like. The mobile devices mentioned here are subjects for moving the mobile terminals 20, such as vehicles in which the mobile terminal 20 is installed, persons carrying the mobile terminal 20, and so forth. However, the mobile terminals 20 themselves may be recognized as mobile devices. Also, even objects to which a device for measuring a position is not installed, such as typhoons, rain clouds, thunderheads, fronts, or the like, can be comprehended as being mobile devices if the position thereof can externally be observed or measured.

The information management apparatus 10 is a computer for managing position information and so forth regarding the mobile devices, or facilities or areas which are not illustrated. The position information is information regarding latitude and longitude. Multiple computers may make up the information management apparatus 10. Information that the information management apparatus 10 manages may be searched using the mobile terminals 20. Alternatively, the information thereof may be searched from a fixed terminal, such as a PC (Personal Computer) or the like. Note that the areas may be certain ranges such as administrative districts, or may be ranges that are optionally defined.

Figure 2:
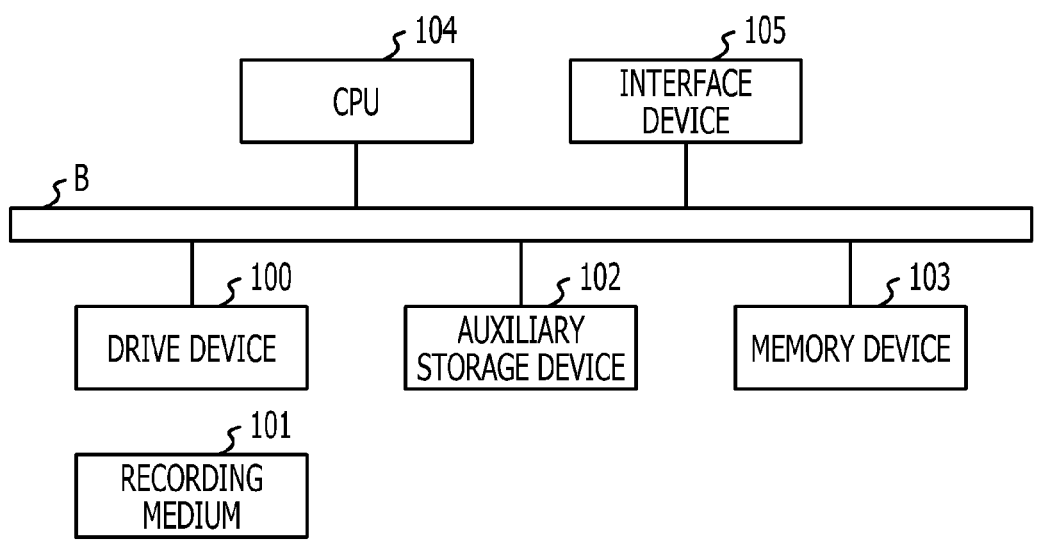
FIG. 2 is a diagram illustrating a hardware configuration example of an information management apparatus according to an embodiment of the present disclosure.

FIG. 2 is a diagram illustrating a hardware configuration example of an information management apparatus according to an embodiment of the present disclosure. The information management apparatus 10 in FIG. 2 includes a drive device 100, an auxiliary storage device 102, a memory device 103, a central processing unit (CPU) 104, an interface device 105, and so forth which are mutually connected by a bus B.

A program for realizing processing at the information management apparatus 10 is provided with a recording medium 101. Upon the recording medium 101 in which the program is recorded being set to the drive device 100, the program is installed in the auxiliary storage device 102 from the recording medium 101 via the drive device 100. However, installation of the program does not necessarily have to be performed from the recording medium 101, and the program may be downloaded from another computer via a network. The auxiliary storage device 102 stores the installed program, and also stores files, data, and so forth.

In the event of having received a program activation instruction, the memory device 103 reads out the program from the auxiliary storage device 102 and stores this. The CPU 104 executes a function according to the information management apparatus 10 in accordance with the program stored in the memory device 103. The CPU 104 is one example of a processor. The interface device 105 is employed as an interface for connecting to a network.

Note that examples of the recording medium 101 include portable-type recording media such as CD-ROM, DVD discs, USB memory, and so forth. Also, examples of the auxiliary storage device 102 include an HDD (Hard Disk Drive), flash memory, and so forth. Any of the recording medium 101 and auxiliary storage device 102 is equivalent to a computer-readable recording medium.

Figure 3:
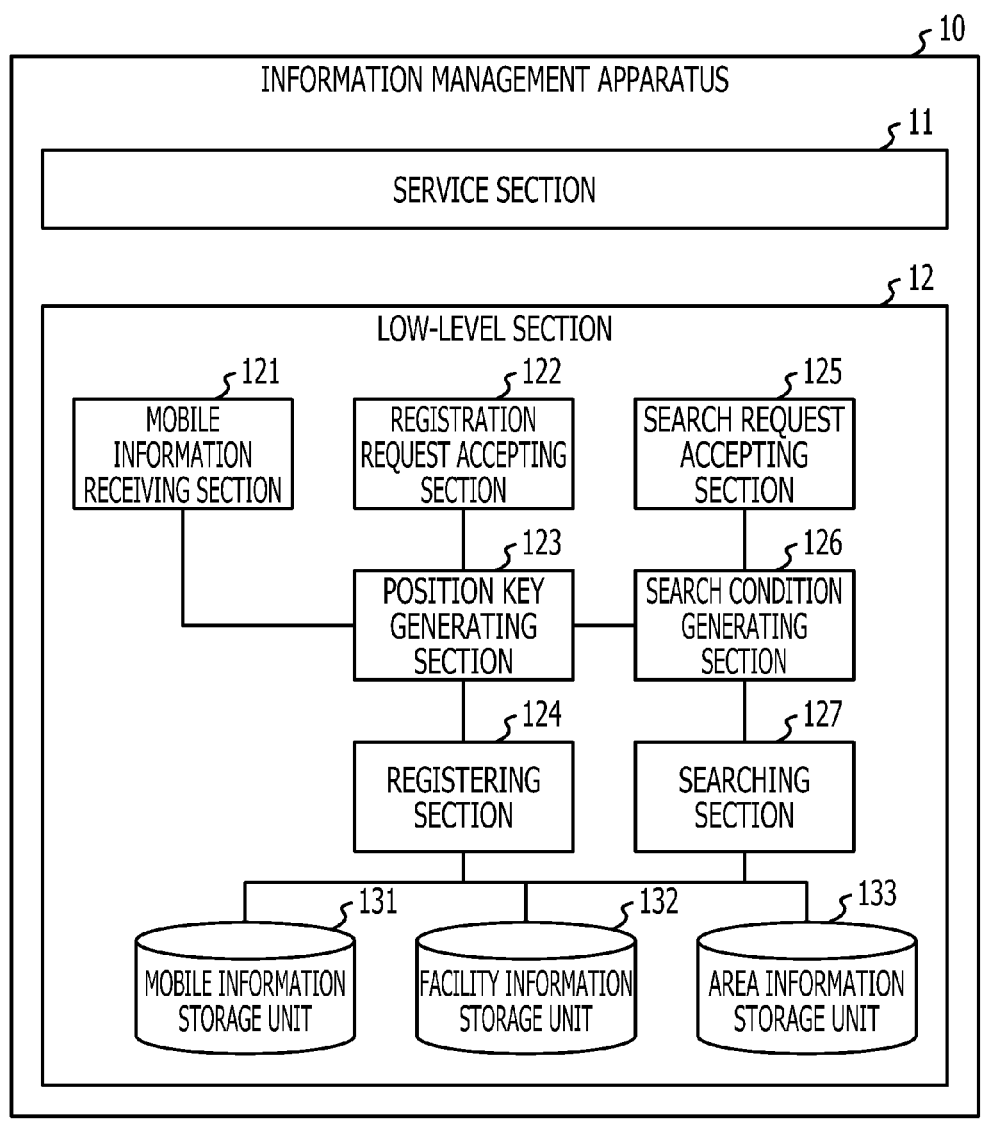
FIG. 3 is a diagram illustrating a function configuration example of an information management apparatus according to an embodiment of the present disclosure.

FIG. 3 is a diagram illustrating a function configuration example of the information management apparatus according to an embodiment of the present disclosure. In the drawing, the information management apparatus 10 includes a service section 11 and a low-level section 12.

The low-level section 12 provides, of an information management function at the information management apparatus 10, a substrate-like or basic function to the service section 11. Accordingly, basically, a client of the low-level section 12 is the service section 11. The service section 11 takes advantage of a function provided by the low-level section 12 to realize an applied function, thereby providing a service to the mobile terminals 20 and so forth. Accordingly, basically, clients of the service section 11 are the mobile terminals 20 and so forth. Note that the function of the low-level section 12 can be used via an API (Application Program Interface) that the low-level section 12 has.

The low-level section 12 includes a registration request receiving section 121, an ID time key generating section 122, a position key generating section 123, a registration section 124, a search request accepting section 125, a search condition generating section 126, a search request section 127, and so forth. These sections are realized by processing that a program installed in the information management apparatus 10 causes the CPU 104 to execute. The low-level section 12 also includes mobile information storage unit 131, a facility information storage unit 132, an area information storage unit 133, and so forth. These storage units can be realized by employing a storage device to be connected to the auxiliary storage device 102 or information management apparatus 10 via the network, or the like.

The mobile information receiving section 121 successively receives position information, attribute information, and so forth of a mobile device. Hereafter, the position information and attribute information and so forth of a mobile device will be referred to as mobile information. The mobile information is received at suitable timing for each of the mobile terminals 20. For example, the mobile information receiving section 121 receives mobile information for each certain cycle, or each time the position of a mobile terminal changes by certain amount. The mobile information may directly be received from the mobile terminals 20 via a mobile communication network, or may directly be obtained or received by another computer system for managing the mobile information. In the case of the latter, the other computer system does not have to be restricted to one type. Examples of the other computer system include a computer system which provides a telematics service.

Note that timing when the mobile information receiving section 121 obtains mobile information may differ for each of the mobile terminals 20. That is to say, with regard to all of the mobile terminals 20, mobile information at the same date and time does not have to be received.

The registration accepting section 122 accepts a registration request for facility information or a registration request for area information from the service section 11. The facility information includes the position information and attribute information of a facility. The area information includes the position information and attribute information of an area. That is to say, the registration request accepting section 122 makes up a portion of an API that the low-level section 12 provides. However, the registration request accepting section 122 may obtain facility information or area information or the like from another computer system.

The position key generating section 123 generates a key regarding the mobile information received by the mobile information receiving section 121, or the facility information or area information accepted by the registration request accepting section 122. The key mentioned here is a key in KVS (Key-Value Store). That is to say, with the present embodiment, mobile information, facility information, and area information are managed with KVS. Note that, with the present embodiment, a key is generated based on latitude and longitude of the position of a mobile device, facility, or area. This key will be referred to as "position key".

The registration section 124 registers mobile information, facility information, or area information, correlated by a position key generated by the position key generating section 123, in the mobile information storage unit 131, facility information storage unit 132, or area information storage unit 133.

The mobile information storage unit 131 is a KVS-type database in which mobile information is stored in a manner correlated with a position key. The facility information storage unit 132 is a KVS-type database in which facility information is stored in a manner correlated with a position key. The area information storage unit 133 is a KVS-type database in which area information is stored in a manner correlated with a position key.

The search request accepting section 125 accepts a search request for mobile information, facility information, or area information from the service section 11. The search condition generating section 126 generates a search condition adapted to search as to the mobile information storage unit 131, facility information storage unit 132, or area information storage unit 133 based on parameters specified in the search request. More specifically, one or more position keys are generated by the search condition generating section 126 based on the parameters specified in the search request. The searching section 127 performs search for mobile information, facility information, or area information using the position key generated by the search condition generating section 126.

Hereafter, a processing procedure that the information management apparatus 10 executes will be described. First, generation processing for a position key will be described.

Figure 4:
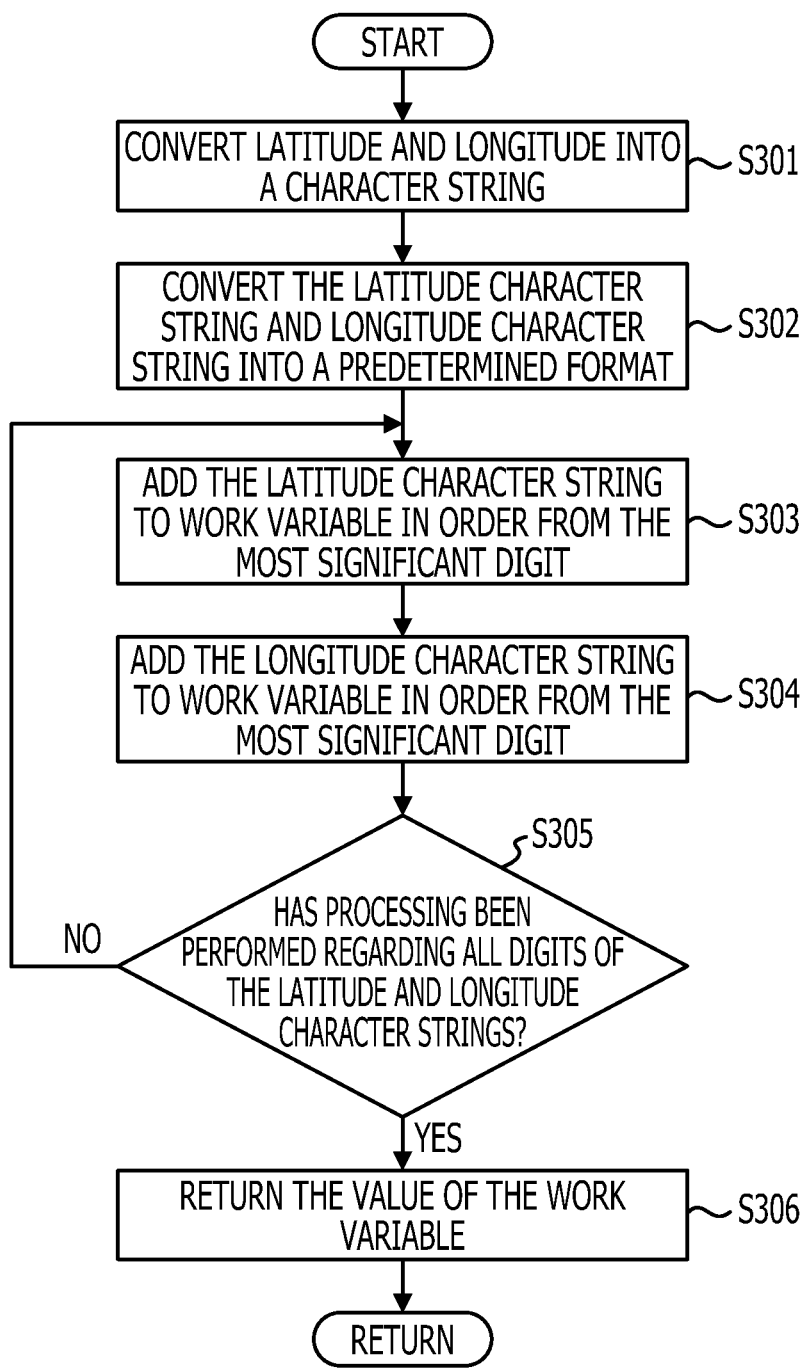
FIG. 4 is a flowchart for describing an example of a processing procedure of generation processing for a position key.

FIG. 4 is a flowchart for describing an example of a processing procedure of generation processing for a position key. Though this processing procedure is a processing procedure called up from an upper processing procedure at the time of generation or search of mobile information or the like, this processing procedure will be described prior to the upper processing procedure for convenience of description.

In step S301, the position key generating section 125 converts each of latitude and longitude to be processed from a numeric value to a character string. Accordingly, a latitude character string and a longitude character string are generated. The latitude character string mentioned here is a character string indicating latitude. The longitude character string mentioned here is a character string indicating longitude. For example, let us say that latitude and longitude to be processed are (35.5678, 139.1234). In this case, the latitude character string is "35.5678", and the longitude character string is "139.1234". Note that let us say that the range of latitude is +90 degrees (north latitude) through −90 degrees (south latitude). That is to say, let us say that south latitude is represented with minus (−). Also, let us say that the range of longitude is +180 degrees (east longitude) through −180 degrees (west longitude). That is to say, let us say that west longitude is represented with minus (−). Note that, though north latitude and east longitude are represented with plus (+), "+" does not have to be explicitly be added to north latitude and east longitude which are numeric values. Also, of latitude and longitude, which angular range is taken as "+", and which angular range is taken as "−" are not restricted to the above example.

Next, the position key generating section 125 converts the latitude character string and longitude character string into a certain format (S302). First, in the case that the integer portion is made up of one digit or two digits, "0(zero)" is inserted into the head thereof so as to have a 3-digit integer portion. Accordingly, the latitude character string becomes "035.5678". The longitude character string is still "139.1234" since the integer portion thereof is originally made up of three digits in this example. Also, "+" or "−" is added to the heads of the latitude character string and longitude character string based on the latitude and longitude serving as the original numeric values. Accordingly, the latitude character string becomes "+035.5678", and the longitude character string becomes "+139.1234". Also, a character "." indicating a decimal point is deleted from both. Consequently, the latitude character string becomes "+0355678", and the longitude character string becomes "+1391234".

This is the end of conversion to a certain format.

Next, the position key generating section 125 obtains one character from the most significant digit of the longitude character string, and adds to the head of the work variable (S303). The work variable is a character string variable for work. Accordingly, when step S303 is first executed, "+" is obtained from "+1391234", and added to the head of the work variable.

Next, the position key generating section 125 obtains one character from the most significant digit of the latitude character string, and adds this character to the head of the work variable (S304). Accordingly, when step S304 is first executed, "+" is obtained from "+0355678", and added to the work variable. Note that the work variable in step S304 is the same as the work variable in step S303. Accordingly, at the instant of steps S303 and S304 being first completed, the contents of the work variable becomes "++". Note that execution sequence of steps S303 and S304 may be changed.

Steps S303 and S304 are repeatedly executed until all of the digits of the latitude character string and longitude character string are processed (S305). As a result thereof, one character string wherein the same digit character is alternately arrayed one digit at a time in order from the most significant digit of each of the latitude character string and longitude character string is obtained as the work variable. With the above example, a character string of "++10339515263748" is obtained as the work variable. This character string is a character string serving as a position key. Accordingly, the position key generating section 125 returns a value stored in the work variable, i.e., a position key to a processing section for executing the upper processing procedure (S306). The position key is returned to a processing section for executing the upper processing procedure at the time of registration or search for mobile information or the like.

With the position key to be generated as described above, in the case of another position key forward-agreeing with one position key, this means that a range according to the other position key is included in a range according to the one position key. This point will be described later. Note that the range according to a position key mentioned here is a rectangular region with increments according the precision of latitude and longitude of this position key serving as one side.

Figure 5:
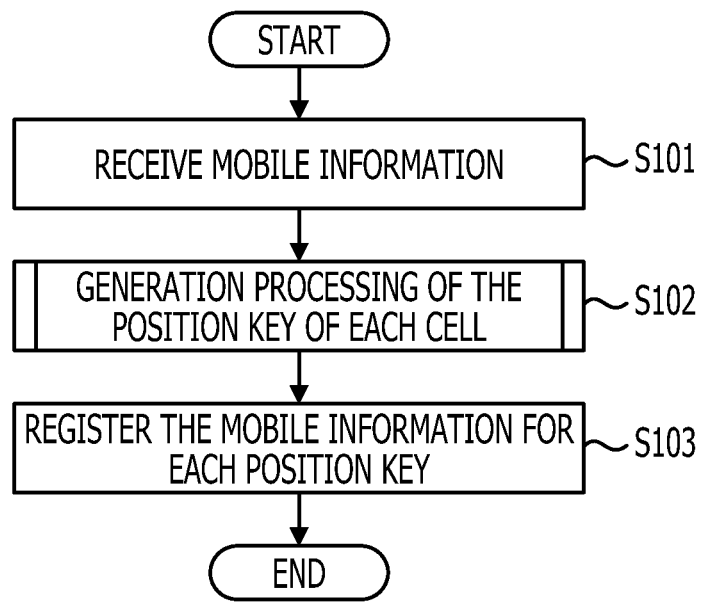
FIG. 5 is a flowchart for describing an example of a processing procedure of registration processing of mobile information.

Next, description will be made regarding a processing procedure of registration processing for mobile information. FIG. 5 is a flowchart for describing an example of a processing procedure of registration processing for mobile information.

In step S101, the mobile information receiving section 121 receives a registration request for mobile information (S101). The mobile information includes position information and attribute information. The attribute information includes, for example, a mobile device ID, position information of a representative position, size information of a mobile device, and so forth. Other attribute information regarding a mobile device may be included in mobile information. The mobile device ID is identification information.

The size information is information wherein a range occupied by a mobile device as to a two-dimensional coordinate system of latitude and longitude is represented with a group of one or more rectangular regions. Examples of a method for specifying the rectangular regions making up the range of a mobile device include three methods such as illustrated in FIG. 6.

Figure 6:
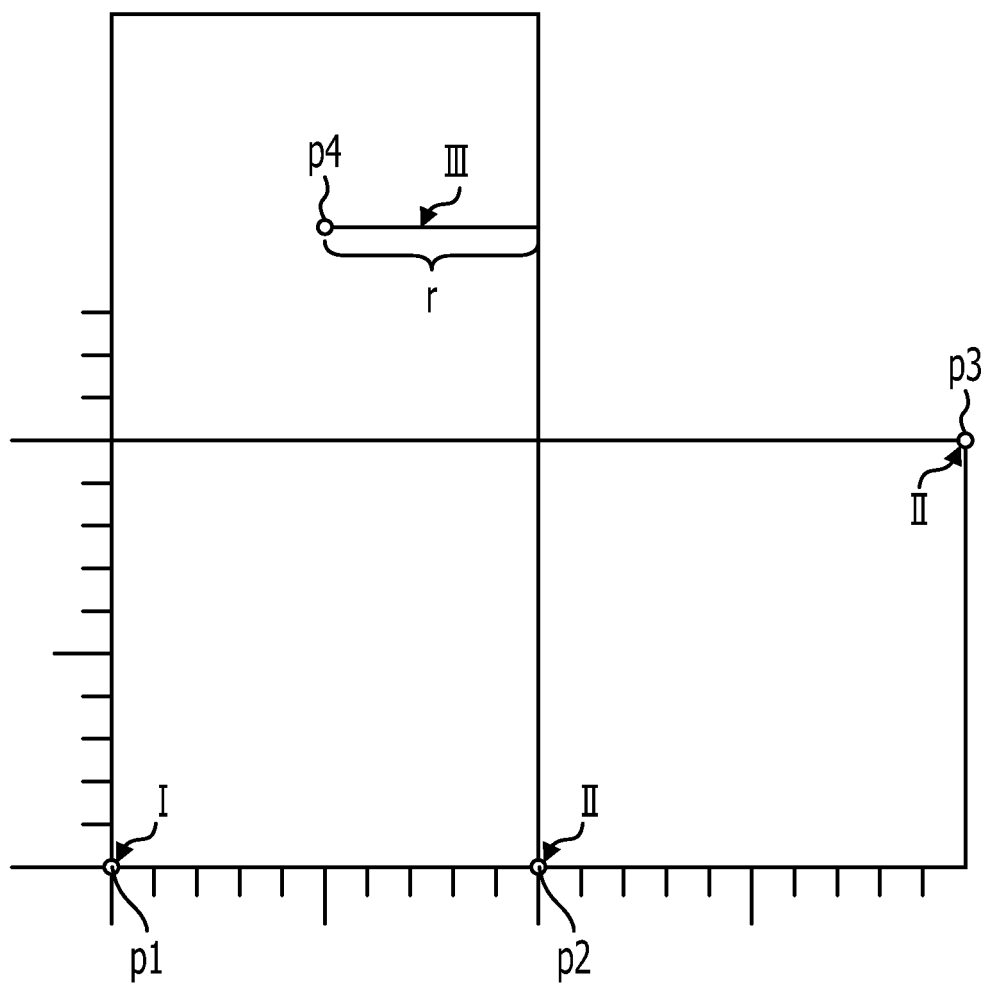
FIG. 6 is a diagram illustrating an example of a specifying method of the rectangular regions making up a range of a mobile device.

FIG. 6 is a diagram illustrating an example of a method for specifying the rectangular regions making up the range of a mobile device. In FIG. 6, the horizontal direction in the drawing represents longitude, and the vertical direction in the drawing represents latitude in a proper manner. In the drawing, three methods of I through III are exemplified.

The method in I is a method for specifying one set of latitude and longitude. In this case, a rectangular region with this latitude and longitude being taken as a lower left apex p1, and increments according to the precision of this latitude and longitude (effective digit number below a decimal point) being taken as one side is specified. For example, in the event that the precision of latitude and longitude is $1/1000$, a rectangular region with one side being $1/1000$ degree is specified. Also, in the event that the precision of latitude and longitude is $1/10000$, a rectangular region with one side being $1/10000$ degree is specified. Note that, with the present embodiment, the lower left apex regarding a certain range mentioned here is a position that the minimum value of latitude and the minimum value of longitude indicate in this range. Also, the upper right apex regarding a certain range mentioned here is a position that the maximum value of latitude and the maximum value of longitude indicate in this range.

The method in II is a method for specifying two sets of latitude and longitude. In this case, a rectangular region with the first set of latitude and longitude being taken as a lower left apex p2, and the second set of latitude and longitude being taken as an upper right apex p3 is specified.

The method in III is a method for specifying one set of latitude and longitude, and a half side. In this case, a rectangular region with this set of latitude and longitude being taken as a central point p4 (an intersecting point of diagonal lines), and this half side r being taken as distance from the central point to four directions is specified. For example, meter is conceived as increments of distance specified as a half side.

Note that a rectangular region may be specified by a method other than the above I through III. Also, in the event that multiple rectangular regions are specified in size information (i.e., in the event that the range of a mobile device is a group of multiple rectangular regions), the specifying methods in the above I through III may be combined. Accordingly, size information has a data structure as illustrated in FIG. 7, for example.

FIG. 7 is a diagram illustrating an example of the date structure of size information. As illustrated in the drawing, with size information, a position and size are managed for each rectangular region. The size is the position of a representative position. A specifying method for the size and a value are managed as the size. Note that the specifying method of the size is a specifying method equivalent to one of the above I through III, for example. The value is a value corresponding to the above I through III, for example.

The position information of a representative position is the latitude and longitude of a representative position of a mobile device. The representative position mentioned here is, in the case of a mobile device being represented with one point, the position of this one point.

Next, the position key generating section 123 executes generation processing of the position key of each cell (S102). The cells are normalized regions making up a rectangular region group that size information indicates. Also, with the present embodiment, the cells are increment regions used for representing a certain range. The cells are squares formed with a mesh or grid or intersection of latitude and longitude of the same digit (precision) in a two-dimensional coordinate system between latitude and longitude. The length of one side of a cell is determined based on precision of latitude and longitude of the lower left apex of the cell. For example, in the event that the precision of latitude and longitude of the lower left apex is specified with $1/1000$ degree, a rectangular region with one side of $1/1000$ degree is specified. Also, in the event that the precision of latitude and longitude of the lower left apex is specified with $1/10000$ degree, a rectangular region with one side of $1/10000$ degree is specified. Also, normalization of cell groups is to perform integration in the event that there are cell groups that can be integrated into an upper digit regarding cell groups with certain precision. Cell groups that can be integrated into an upper digit are, for example, in the event that there are cell groups with $1/10000$, 100 cell groups included in cells in increments of $1/1000$. Also, the position key of a cell, or a position key corresponding to a cell means a position key to be generated based on the latitude and longitude of the lower left apex of a cell.

Accordingly, in step S102, a rectangular region making up a range that size information indicates is converted into one or more cells, and a position key of the lower left apex is generated for every of the cells. Note that, in the case that the number of the cells is more than one, the precision (increments or size) of the cells is not necessarily common. As described above, this is because normalization of the cell groups may be performed.

Next, the registering section 124 registers a mobile device ID, a representative position, size information, attribute information, and so forth in the mobile information storage unit 131 in a correlated manner for each generated position key (S103).

FIG. 8 is a diagram illustrating a configuration example of the mobile information storage unit. As illustrated in the drawing, the mobile information storage unit 131 stores a value in a manner correlated with a key. A position key generated based on a latitude character string and a longitude character string is stored in the key. A position key generating method will be described later. The value includes one or more rows. Each row corresponds to one mobile device, and includes three items (columns) of an id, data, and registration date and time. A mobile device ID whereby each mobile device can be uniquely be identified is stored in the id. Latitude and longitude that indicate a representative position, size information, other attribute information, and so forth are stored in the data. The registration date and time is date and time when a row was registered. The size information may include a data structure exemplified in FIG. 7. Note that the reason why multiple rows can be correlated with one position key is because multiple mobile devices can be positioned as to the same latitude and longitude.

Also, with regard to a mobile device of which the range straddles multiple cells, a value is stored for each cell in a manner correlated with a position key corresponding to the lower left apex of this cell. In the drawing, an example is illustrated wherein, with regard to a mobile device of which the mobile device ID is "id6666", three position keys are assigned.

Note that the configuration illustrated in FIG. 8 is an example, the configuration of values may be changed as appropriate.

The processing in FIG. 5 is executed each time mobile information is received. Accordingly, with regard to each of multiple mobile devices, mobile information is received every second, and is registered in the mobile information storage unit 131 in a form illustrated in FIG. 8.

On the other hand, the mobile information storage unit 131 is set so as to delete data with certain time having elapsed after registration as a function of the KVS engine. Accordingly, data registered in the mobile information storage unit 131 will be deleted after certain elapsed time. This means that the latest received position information is basically managed at the mobile information storage unit 131 regarding each of the mobile devices.

Note that, though registration processing for mobile information has been described in FIG. 5, in the event that the registration request accepting section 122 has accepted a registration request for facility information or area information as well, the same processing procedure is basically executed. However, with regard to facility information, the mobile device ID is replaced with the identification information for a facility (facility ID). Also, a registration destination for facility information is the facility information storage unit 132. Also, with regard to area information, the mobile device ID is replaced with the identification information of an area (area ID). A registration destination for area information is the area information storage unit 133. Further, the facility information storage unit 132 and area information storage unit 133 are set so as not to perform automatic deletion of data with certain elapsed time after registration. This is because, with a facility and an area are, basically, position information thereof does not change every second unlike mobile devices.

Next, the details of step S102 will be described. FIG. 9 through FIG. 12 are flowcharts for describing an example of a processing procedure of generation processing of the position key of each normalized cell making up a rectangular region group.

In step S201, the position key generating section takes one rectangular region out of the rectangular region group specified with a data structure as illustrated in FIG. 7 as the object to be processed. A rectangular region to be processed will be referred to as "object rectangular region".

Now, let us say that a rectangular region group as illustrated in FIG. 13 has been specified. FIG. 13 is a diagram illustrating an example of a rectangular region group. In the drawing, let us say that the minimum scale is $1/10000$ degrees in both of the latitude direction and longitude direction. In the drawing, a rectangular region R1, a rectangular region R2, a rectangular region group R3, a rectangular region group R4, a rectangular region R5, a rectangular region group R6, a rectangular region R7, and a rectangular region group R8 make up the specified rectangular region group.

The rectangular region R1 is a rectangular region with $1/10000$ degrees being taken as one side. With the R1, the rectangular region is specified with two sets of latitude and longitude of precision of $1/10000$ degrees. The rectangular region R2 is a rectangular region wherein the length in the latitude direction is taken as $1/1000$ degrees, and the length of the longitude direction is taken as $8/10000$ degrees. With the R2, one set of latitude and longitude is specified with $1/1000$ degrees, and two sets of latitude and longitude is specified with $1/10000$ degrees. The rectangular region group R3 is a group of four rectangular regions. With the R3, each of the rectangular regions is specified with one set of latitude and longitude of precision of $1/10000$ degrees. The rectangular region group R4 is a group of 20 rectangular regions. With the R4, each of the rectangular regions is specified with one set of latitude and longitude of precision $1/10000$ degrees. The rectangular region R5 is one rectangular region. With the R5, the rectangular region is specified with one set of latitude and longitude of precision $1/10000$ degrees. The rectangular region group R6 is a group of nine rectangular regions. With the R6, each of the rectangular regions is specified with one set of latitude and longitude of precision of ¹⁄₁₀₀₀₀ degrees. The rectangular region R7 is a rectangular region specified with one side being taken as ¹⁄₁₀₀₀ degrees. The R7 is specified with the central point p5 and the half side r5. The rectangular region group R8 is a group of 99 rectangular regions. That is to say, a portion indicated with B is not included in the rectangular region group R8. With the R8, each of the rectangular regions is specified with one set of latitude and longitude of precision of ¹⁄₁₀₀₀₀ degrees.

In step S201, one of such rectangular regions is taken as an object rectangular region. With regard to multiple rectangular regions included in the rectangular region groups R3, R4, R6, and R8 as well, each thereof is taken as the object to be processed one at a time.

Next, the position key generating section 123 determines whether or not the object rectangular region has been specified with a central point and a half side (S202). In the case that the object rectangular region has been specified with a central point and a half side (Yes in S202), the position key generating section 123 calculates the latitude and longitude of the lower left apex, and the latitude and longitude of the upper right apex regarding a range determined with the latitude of the central point, the longitude of the central point, and a half side (meter) (S203). It is sufficient for a calculation method thereof to follow a known method.

On the other hand, in the case that the object rectangular region has not been specified with a central point and a half side (No in S202), the position key generating section 123 determines whether or not the object rectangular region has been specified with one set of latitude and longitude (S204). In the case that the object rectangular region has been specified with one set of latitude and longitude (Yes in S204), the position key generating section 123 takes this latitude and longitude as the lower left apex. Further, the position key generating section 123 obtains latitude and longitude serving as the upper right apex of a cell with length according to the precision of the latitude and longitude of the lower left apex being taken as one side (S205).

In the case that the object rectangular region has not specified with one set of latitude and longitude (No in S204), in this case, the position key generating section 123 does not perform particular processing. With the present embodiment, the object rectangular region has been specified with two sets of latitude and longitude.

That is to say, in step S206 and thereafter, the object rectangular region is determined with the latitude and longitude of each of the lower left apex and upper right apex.

Next, the position key generating section 123 substitutes a value obtained by subtracting the latitude of the lower left apex from the latitude of the upper right apex of the object rectangular region for a variable WLAT (hereafter, referred to as "latitude width WLAT"). Next, the position key generating section 123 substitutes a value obtained by subtracting the longitude of the lower left apex from the longitude of the upper right apex of the object rectangular region for a variable WLON (hereafter, referred to as "longitude width WLON") (S207). Next, the position key generating section 123 substitutes the digit number below a decimal point of the latitude WLAT for a variable KLAT (S208). Next, the position key generating section 123 substitutes the digit number below a decimal point of the longitude WLON for a variable KLON (S209). Next, the position key generating section 123 substitutes the maximum value of the value of the variable KLAT, and the value of the KLON for a variable KMAX (hereafter, referred to as "effective digit number KMAX") (S210 through S212).

Next, in the case that the effective digit number KMAX is greater than the limit value of the digit number below a decimal point (e.g., "5" or the like) (Yes in S213), the position key generating section 123 corrects the value of the effective digit number KMAX to reflect this limit value (S214).

Next, in step S215 through S222, the position key generating section 123 divides the object rectangular region into cell groups having a size according to the precision of the effective digit number KMAX, and executes generation of the position key as to each cell. With regard to this point, description will be made with reference to the drawings.

FIG. 14 is a diagram illustrating an example wherein a rectangular region is divided into cell groups. For example, in the case that the rectangular region R2 is the object rectangular region, the effective digit number KMAX is 4 (i.e., ¹⁄₁₀₀₀₀). Accordingly, the rectangular region R2 is divided into 80 cell groups with a grain size of ¹⁄₁₀₀₀₀ degrees. Also, in the case that the rectangular region R5 is the object rectangular region, the effective digit number KMAX is 5 (i.e., ¹⁄₁₀₀₀₀₀). Accordingly, the rectangular region R5 is divided into 100 cell groups with a grain size of ¹⁄₁₀₀₀₀₀ degrees. Such division processing is performed in steps S215 through S222.

In step S215, the position key generating section 123 substitutes the longitude of the lower left apex of the object rectangular region for a variable LLON (hereafter, referred to as "object longitude LLON"). Next, the position key generating section 123 substitutes the latitude of the lower left apex for a variable LLAT (hereafter, referred to as "object latitude LLAT") (S216). Next, the position key generating section 123 executes generation processing (FIG. 4) of a position key based on the object latitude LLAT and object longitude LLON (S217).

Next, the position key generating section 123 adds the generated position key to a list L (S218). The list L is a temporal storage region where a position key is stored. The list L may be realized with the memory device 103 or auxiliary storage device 102 or the like, for example. Next, the position key generating section 123 adds a value multiplied by the effective digit number KMAX power of 0.1 to the object latitude LLAT (S219). For example, with the rectangular region R2 in FIG. 14, the fourth power of 0.1=0.0001 is added. Next, the position key generating section 123 determines whether or not the value of the object latitude LLAT reaches the latitude of the upper right apex of the object rectangular region (S220). In the event that the value of the object latitude LLAT does not reach the latitude of the upper right apex of the object rectangular region (No in S220), the position key generating section 123 repeats step S217 and thereafter.

Next, in the event that the value of the object latitude LLAT reaches the latitude of the upper right apex of the object rectangular region (Yes in S220), the position key generating section 123 adds the effective digit number KMAX power of 0.1 to the object longitude LLOT (S221). With the rectangular region R2 in FIG. 14, the effective digit number KMAX power of 0.1 is 0.0001. Next, the position key generating section 123 determines whether or not the value of the object longitude LLON reaches the longitude of the upper right apex of the object rectangular region (S222). In the event that the value of the object longitude LLON does not reach the longitude of the upper right apex of the object rectangular region (No in S222), the position key generating section 123 repeats step S216 and thereafter.

In the event that the value of the object longitude LLON reaches the longitude of the upper right apex of the object rectangular region (Yes in S222), the object rectangular region is, such as with the rectangular region R2 in FIG. 14, divided into cells having a size according to the precision of the effective digit number KMAX, and is in a state in which the position key corresponding to the lower left apex of each cell is recorded in the list L.

Figure 10A:
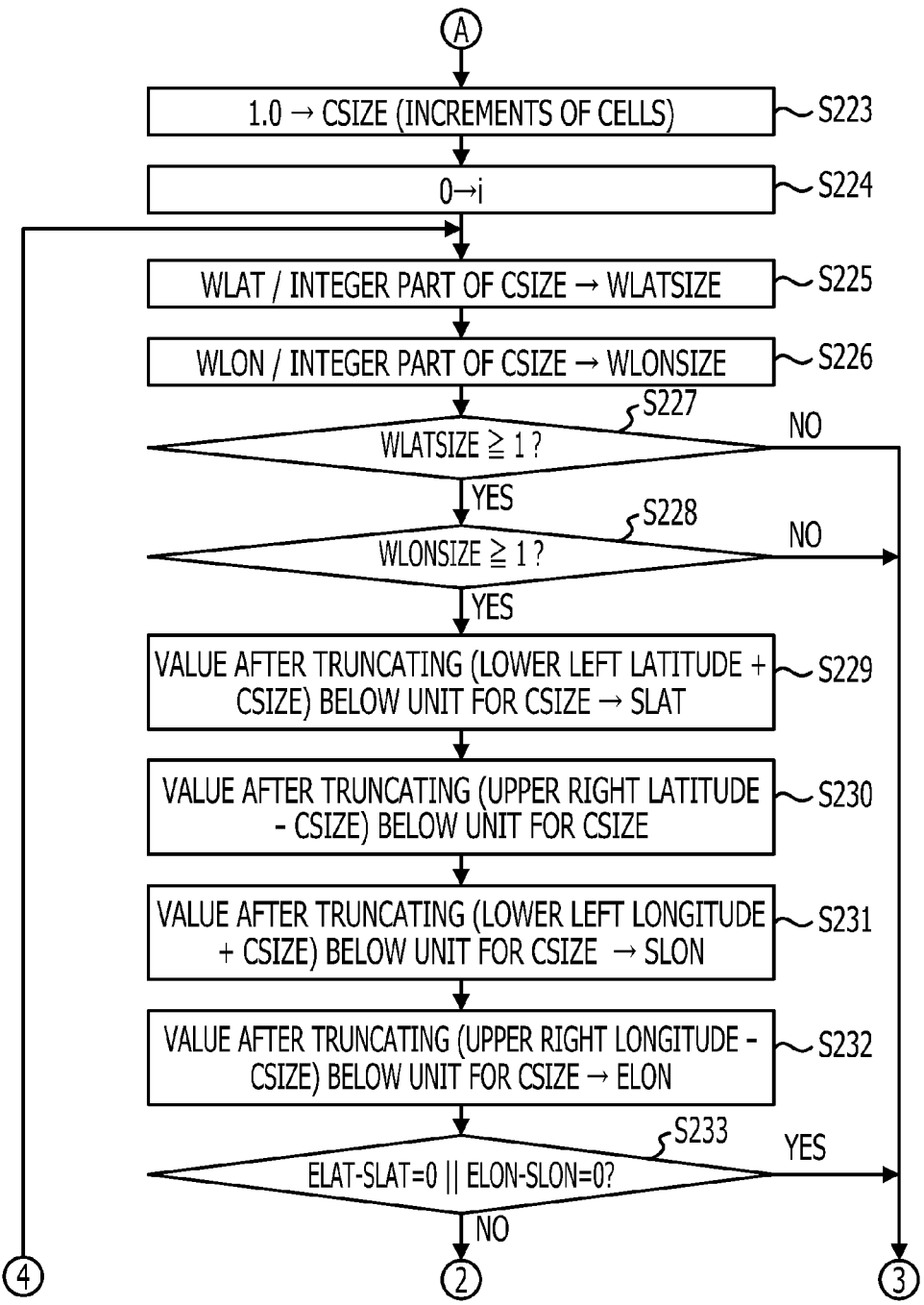
FIGS. 10A and 10B are flowcharts for describing an example of a processing procedure of generation processing for the position key of each normalized cell making up a rectangular region group.

Next, in steps S223 through S245 in FIG. 10A, the position key generating section 123 executes processing for integrating, of the cell groups generated above, cells that can be integrated into a cell with precision of an upper digit. For example, in the case that the rectangular region R5 is the object rectangular region, 100 cell groups included in the rectangular region R5 in FIG. 14 are integrated into one cell with 1/10000 degrees. Consequently, the rectangular region R5 originally specified with precision of 1/100000 degrees is converted into a cell with precision of 1/10000 degrees. Such processing is executed in steps S223 through S245.

In step S223, the position key generating section 123 substitutes 1.0 for a variable CSIZE (S223). The variable CSIZE has a grain size of a cell to be integrated (length of one side). Specifically, first, attempt is made regarding whether or not one side can be integrated into a cell with 1.0 degree. Hereafter, the variable CSIZE will be referred to as "integral grain size CSIZE". Next, the position key generating section 123 substitutes 0 for a variable i (S224). The variable i is a variable for holding the number of times of execution in steps S225 through S244. Note that steps S225 through S244 are repeated the number of times that the effective digit number KMAX indicates.

Next, the position key generating section 123 substitutes the integer portion of a value obtained by dividing the latitude width WLAT by the integral grain size CSIZE for a variable WLATSIZE (S225). That is to say, with regard to the latitude width WLAT, a size with the integral grain size CSIZE as increments is substituted for the variable WLATSIZE. Next, the position key generating section 123 substitutes the integer portion of a value obtained by dividing the longitude width WLON by the integral grain size CSIZE for a variable WLONSIZE (S226). That is to say, with regard to the longitude with WLON, a size with the integral grain size CSIZE as increments is substituted for the variable WLONSIZE.

Next, the position key generating section 123 determines whether or not each of the value of the variable WLATSIZE, and the value of the variable WLONSIZE is equal to or greater than 1 (S227, S228). That is to say, determination is made regarding whether or not the object rectangular region has a size including a cell of the integral grain size CSIZE. In the event that any one of the value of the variable WLATSIZE, and the value of the variable WLONSIZE is less than 1 (No in S227 or No in S228), the processing proceeds to step S243, where the position key generating section 123 divides the value of the integral grain size CSIZE by 10.0. Next, the position key generating section 123 adds 1 to the variable i (S244). Next, the position key generating section 123 determines whether or not the value of the variable i reaches the effective digit number KMAX (S245). In the event that the value of the variable i does not reach the effective digit number KMAX (No in S245), the position key generating section 123 repeats step S225 and thereafter. Accordingly, the value of the integral grain size CSIZE becomes 1/10 each time step S225 and thereafter are repeated.

With a process wherein step S225 and thereafter are repeated, in the event that the values of both of the variable WLATSIZE and variable WLONSIZE become equal to or greater than 1 (Yes in S227 and also Yes in S228), with regard to a result wherein the integral grain size CSIZE is added to the latitude of the lower left apex of the object rectangular region, the position key generating section 123 substitutes a value obtained by truncating below increments of the integral grain size CSIZE (below effective digits of integral grain size) for a variable SLAT (S229). That is to say, the minimum value of the increments (precision) of the integral grain size CSIZE, which is a value equal to or greater than the latitude of the lower left apex of the object rectangular region, is stored in the variable SLAT (hereafter, referred to as "integral lower left latitude SLAT"). For example, in the event that the value of the integral grain size CSIZE is "0.001", and the latitude of the lower left apex of the object rectangular region is "139.1219", "139.122" is substituted for the integral lower left latitude SLAT.

Next, the position key generating section 123 substitutes, regarding the result of having added the integral grain size CSIZE to the latitude of the upper right apex of the object rectangular region, a value obtained by truncating below the increments of the integral grain size CSIZE (below the effective digits of integral grain size) for a variable ELAT (S230). That is to say, the maximum value of the increments (precision) of the integral grain size CSIZE, which is a value equal to or smaller than the latitude of the upper right apex of the object rectangular region, is stored in the variable ELAT (hereafter, referred to as "integral upper right latitude ELAT"). For example, in the event that the value of the integral grain size CSIZE is "0.001", and the latitude of the upper right apex of the object rectangular region is "139.1231", "139.123" is substituted for the integral upper right latitude ELAT.

Next, the position key generating section 123 substitutes, regarding the longitude of the lower left apex of the object rectangular region, a value obtained by truncating below the increments of the integral grain size CSIZE (below the effective digits of integral grain size) for a variable SLON (S231). That is to say, the minimum value of the increments (precision) of the integral grain size CSIZE, which is a value greater than the longitude of the lower left apex of the object rectangular region, is stored in the variable SLON (hereafter, referred to as "integral lower left longitude SLON"). For example, in the event that the value of the integral grain size CSIZE is "0.001", and the longitude of the lower left apex of the object rectangular region is "35.5609", "35.561" is substituted for the integral lower left longitude SLON.

Next, the position key generating section 123 substitutes, regarding the longitude of the upper right apex of the object rectangular region, a value obtained by truncating below the increments of the integral grain size CSIZE (below the effective digits of integral grain size) for a variable ELON (S232). That is to say, the maximum value of the increments of the integral grain size CSIZE, which is a value equal to or smaller than the longitude of the upper right apex of the object rectangular region, is stored in the variable ELON (hereafter, referred to as "integral upper right longitude ELON"). For example, in the event that the value of the integral grain size CSIZE is "0.001", and the longitude of the upper right apex of the object rectangular region is "35.5621", "35.562" is substituted for the integral upper right longitude ELON.

Next, the position key generating section 123 determines whether or not the value of the integral upper right latitude ELAT−integral lower left latitude SLAT is 0, or whether or not the value of the integral upper right longitude ELON−integral lower left longitude SLON is 0 (S233). In the case that this determination is positive (Yes in S233), the processing proceeds to step S243. In the case that this determination is negative (No in S233), a rectangular region with (integral lower left latitude SLAT, integral lower left longitude SLON) being taken as the lower left apex, and with (integral upper right latitude ELAT, integral upper right longitude ELON) being taken as the upper right apex includes one or more cells in increments of the integral grain size CSIZE. Therefore, in step S234 and thereafter, the position key generating section 123 integrates cell groups included in this rectangular region to a cell in increments of the integral grain size CSIZE.

In step S234, the position key generating section 123 substitutes the integral lower left longitude SLON for a variable K1 (hereafter, referred to as "object lower left longitude K1"). Next, the position key generating section 123 substitutes the integral lower left latitude SLAT for a variable K2 (hereafter, referred to as "object lower left latitude K2") (S235). Next, the position key generating section 123 executes generation processing (FIG. 4) of a position key based on the object latitude K2 and object longitude K1 (S236). Next, the position key generating section 123 deletes a position key group forward-agreeing with the generated position key from the list L (S237). That is to say, the position keys of a cell group included in a cell that the generated position key indicates are deleted from the list L. Next, the position key generating section 123 adds the generated position key to the list L (S238).

Next, the position key generating section 123 adds the integral grain size CSIZE to the object lower left latitude K2 (S239). Next, the position key generating section 123 determines whether or not the object lower left latitude K2 reaches the integral upper right latitude ELAT (S240). In the case that the object lower left latitude K2 does not reach the integral upper right latitude ELAT (No in S240), the position key generating section 123 repeats step S236 and thereafter.

In the case that the object lower left latitude K2 reaches the integral upper right latitude ELAT (Yes in S240), the position key generating section 123 adds the integral grain size CSIZE to the object lower left longitude K1 (S241). Next, the position key generating section 123 determines whether or not the object lower left longitude K1 reaches the integral upper right longitude ELON (S242). In the case that the object lower left longitude K1 does not reach the integral upper right longitude ELON (No in S242), the position key generating section 123 repeats step S235 and thereafter.

In the case that the object lower left longitude K1 reaches the integral upper right longitude ELON (Yes in S242), the position key generating section 123 executes the above steps S243 through S245. Integration into a cell of the integral grain size CSIZE is performed while changing the integral grain size CSIZE up to one digit upper than the precision of the latitude and longitude of the object rectangular region.

Upon steps S201 through S246 being executed regarding all of the rectangular regions to be processed (Yes in S246), of cell groups included in the object rectangular region, cell groups that can be integrated into an upper digit become a state integrated into the upper digit cell group.

However, for example, though a rectangular region where the rectangular regions R2 and R4 in FIG. 14 are combined can be integrated into one rectangular region in increments of 1/1000 degrees, these regions are not integrated in steps S201 through S246. This is because in steps S201 through S246, processing is performed for each specified rectangular region, and accordingly, integration of cell groups straddling a rectangular region, in other words, exceeding a rectangular region is not performed.

Figure 11:
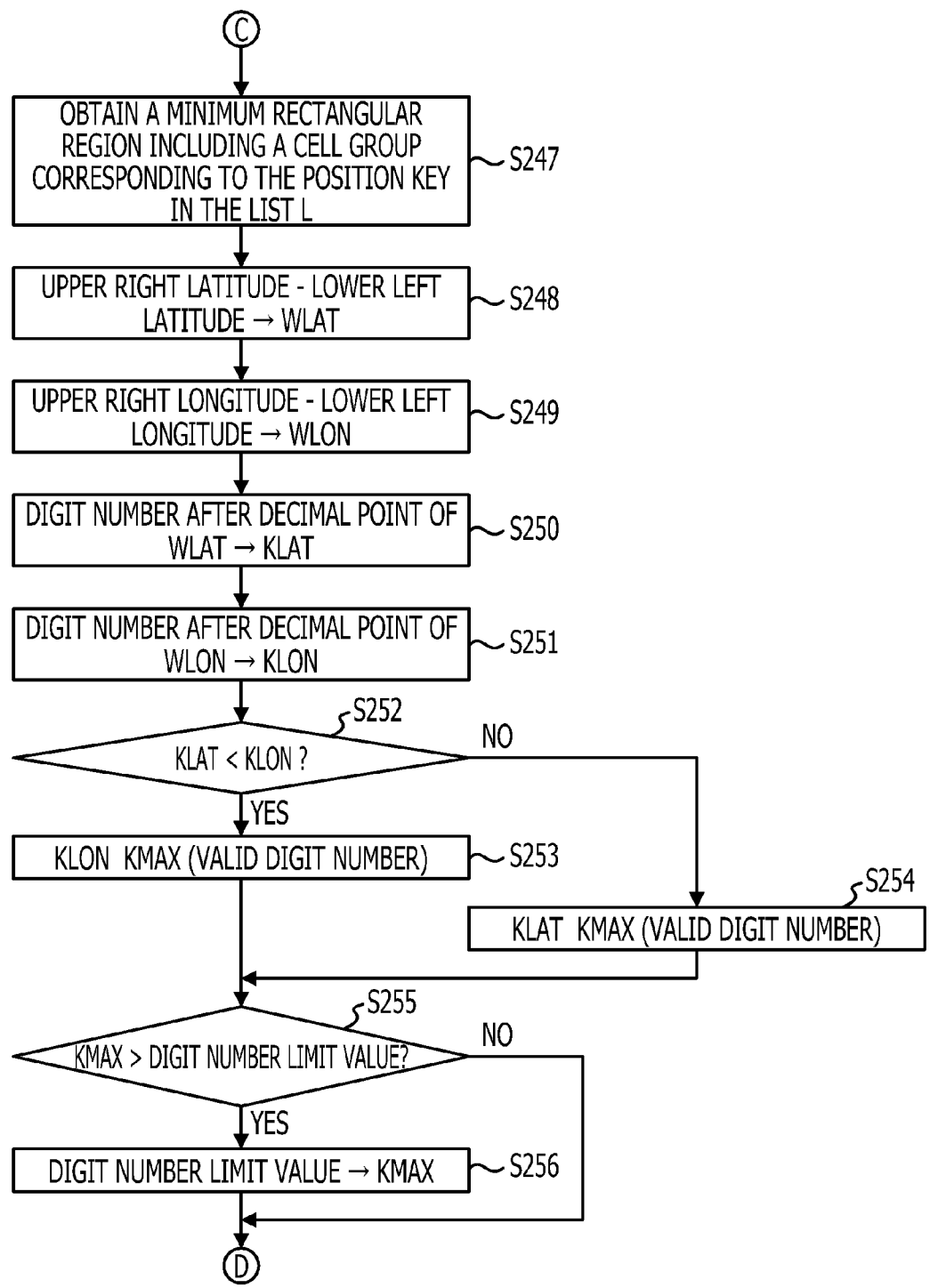
FIG. 11 is a flowchart for describing an example of a processing procedure of generation processing for the position key of each normalized cell making up a rectangular region group.

Therefore, the position key generating section 123 executes integration processing of cell groups straddling a specified rectangular region in step S247 and thereafter in FIG. 11.

In step S247, the position key generating section 123 obtains the minimum rectangular region including all of the cell groups corresponding to the position keys included in the list L. That is to say, the minimum rectangular region including all of the specified rectangular regions is obtained.

FIG. 15 is a diagram for describing the minimum rectangular region including all of the specified rectangular regions. As illustrated in the drawing, the minimum rectangular region including specified rectangular regions is a rectangular region with the minimum latitude and longitude of the lower left apex of the specified rectangular regions being taken as a lower left apex Pa. Also, the minimum rectangular region is a rectangular region Ra with the maximum latitude and longitude of the upper right apexes of the specified rectangular regions (hereafter, referred to as "inclusion region Ra") being taken as an upper right apex Pb. In step S247, the latitude and longitude of the lower left apex Pa, and the latitude and longitude of the upper right apex Pb are obtained.

Figure 9A:
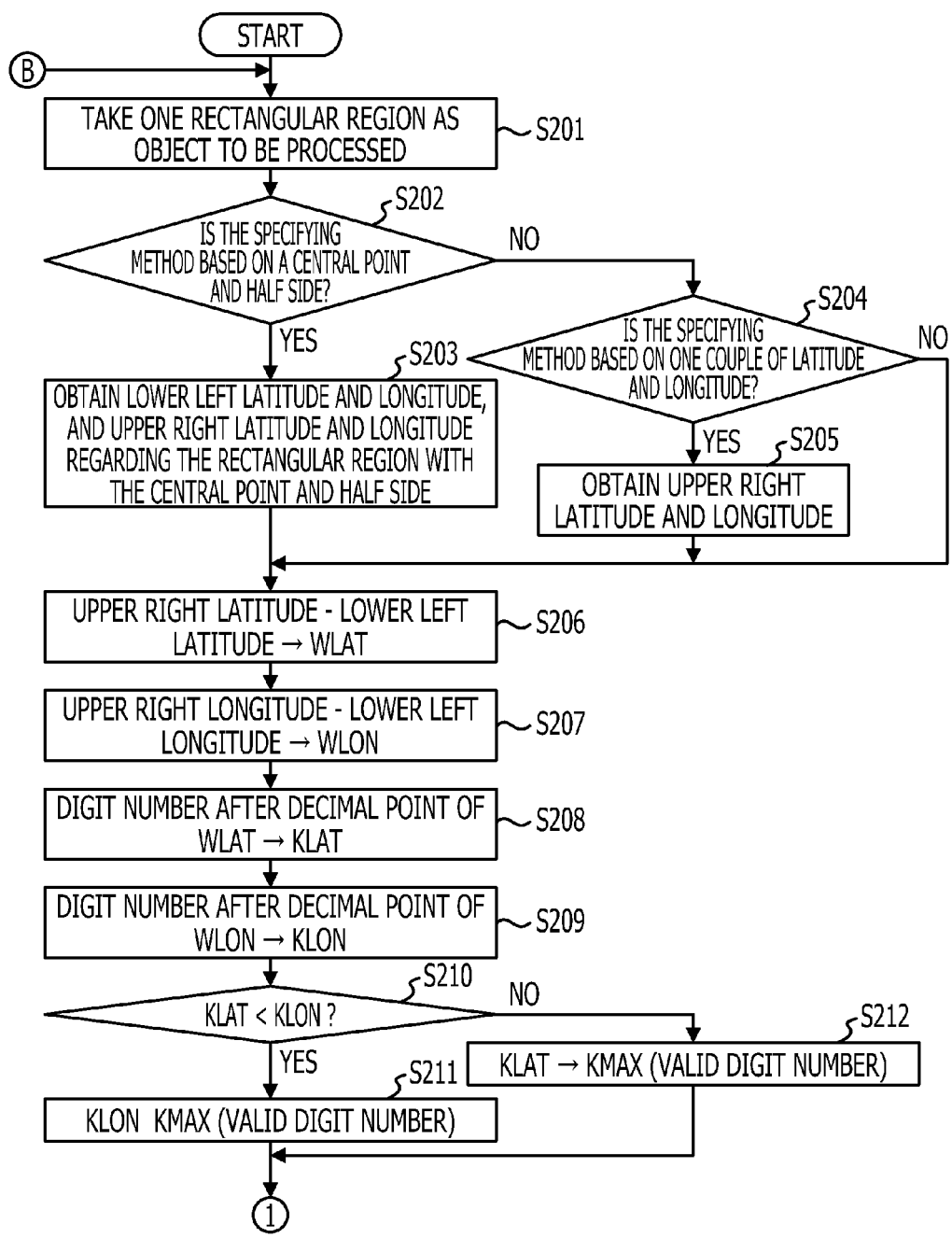
FIGS. 9A and 9B are flowcharts for describing an example of a processing procedure of generation processing for the position key of each normalized cell making up a rectangular region group.
Figure 9B:
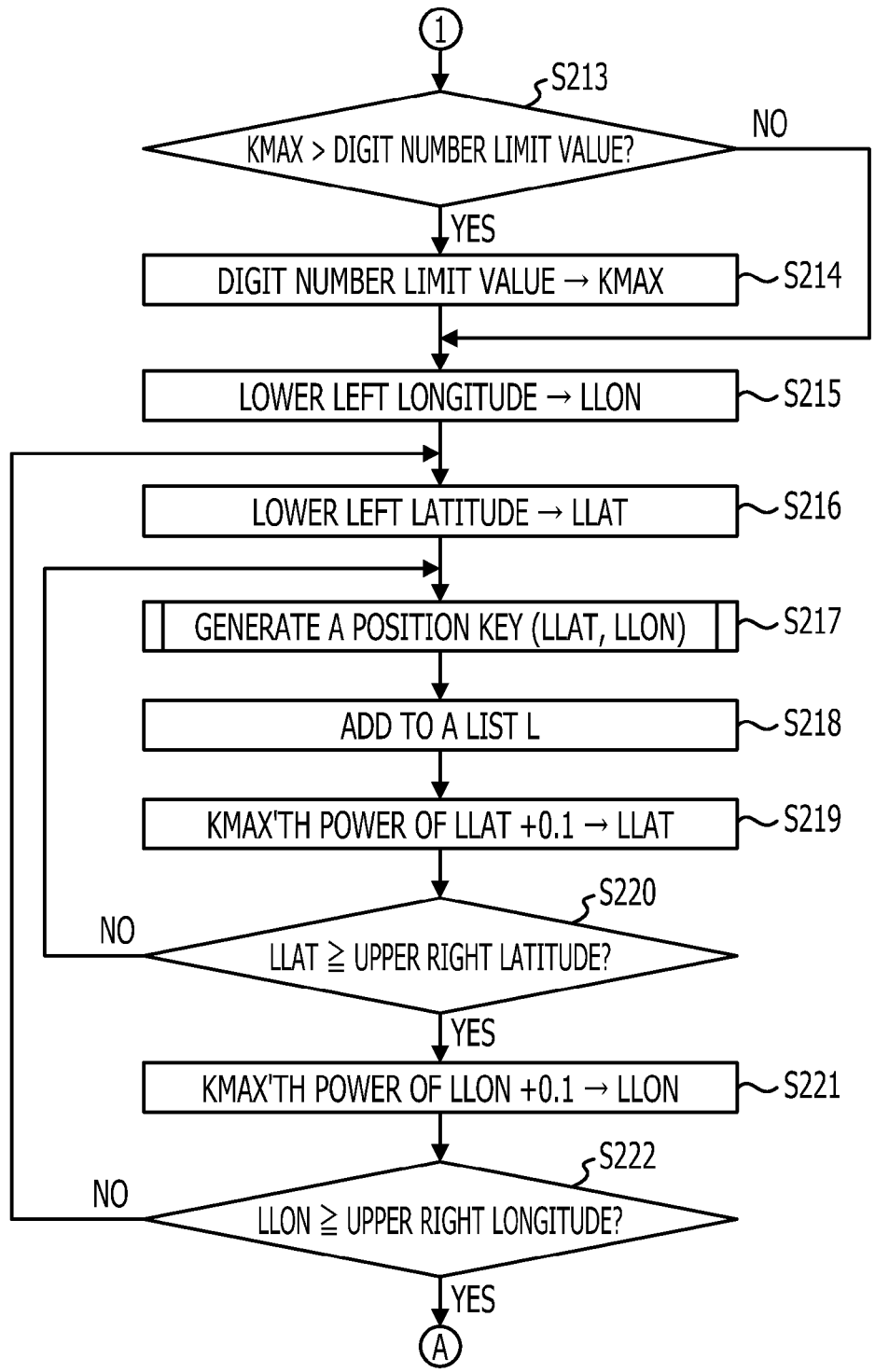
Figure 10B:
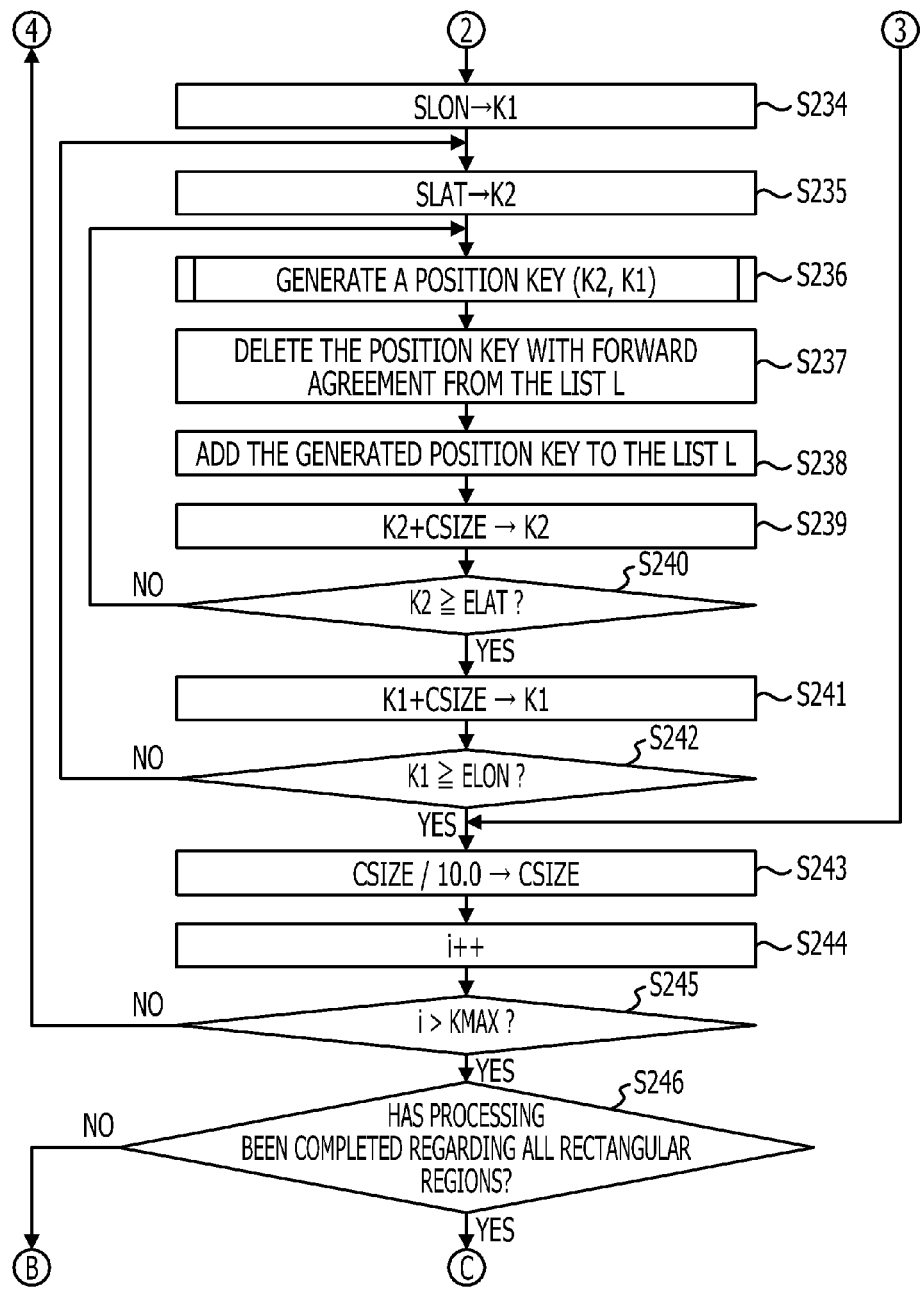
Figure 12A:
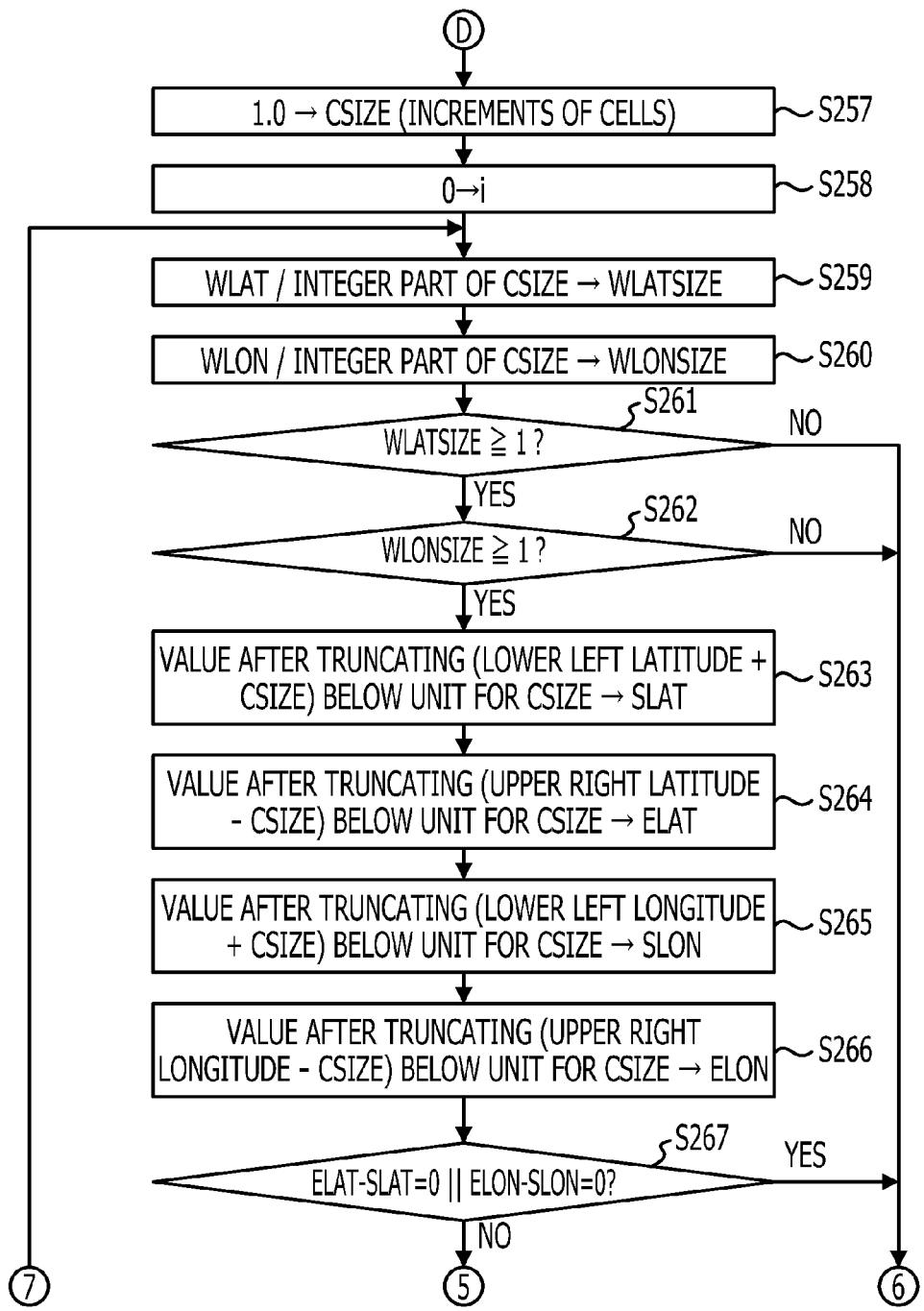
FIGS. 12A and 12B are flowcharts for describing an example of a processing procedure of generation processing for the position key of each normalized cell making up a rectangular region group.
Figure 12B:
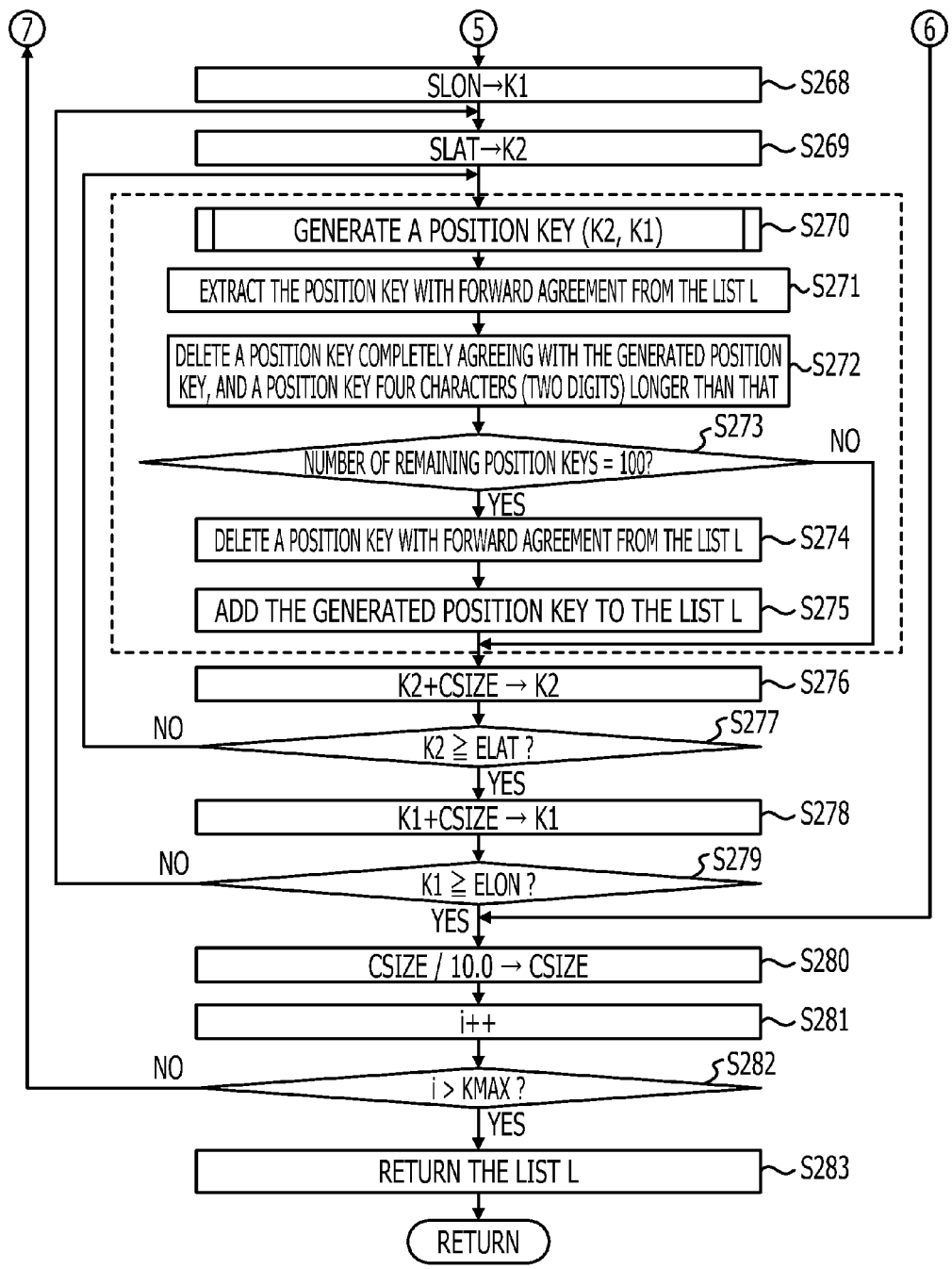

In subsequent steps S248 in FIG. 11 through S282 in FIG. 12B, the same processing as with step S206 in FIG. 9A through step S245 in FIG. 10B is executed regarding the inclusion region Ra except for the steps surrounded with dashed lines in FIG. 12B. Accordingly, in the event that No (corresponding to No in step S233 in FIG. 10A) has been determined in step S267 in FIG. 12A, a state as illustrated in FIG. 16 has been determined.

FIG. 16 is a diagram illustrating an example of cells in increments of the integral grain size CSIZE determined in an inclusion region. As illustrated in the drawing, it is determined that three cells Ca, Cb, and Cc in increments of 1/1000 degrees are included in a rectangular region with (integral lower left latitude SLAT, integral lower left longitude SLON) being taken as the lower left apex, and with (integral upper right latitude ELAT, integral upper right longitude ELON) being taken as the upper right apex.

Accordingly, determination is made for every these three cells regarding whether or not integration into the cells can be performed regarding cell groups included in the cells. Now, the steps surrounded with dashed lines in FIG. 12B will be described.

In step S270, the position key generating section 123 executes generation of a position key based on the object latitude K2 and object longitude K1 (FIG. 4). With the example in FIG. 16, the value of the object latitude K2 at the time of step S270 being first executed is the value of the integral lower left latitude SLAT, and the value of the object longitude K1 is the value of the integral lower left longitude SLON. That is to say, the object latitude K2 and object longitude K1 are the latitude and longitude of the lower left apex of the cell Ca.

Next, the position key generating section 123 extracts a position key group forward-agreeing with the generated position key from the list L (S271). With the present embodiment, in the case of another position key forward-agreeing with one position key, this means that a cell according to the other position key is included in a cell according to the one position key. Accordingly, a position key group of a cell group included in the cell Ca is extracted. Next, the position key generating section 123 removes a position key completely agreeing with the generated position key, and a position key four characters longer than the generated position key from the position key group extracted in step S271 (S272). Next, the position key generating section 123 determines whether or not the number of remaining position key groups is 100 (S273). That is to say, in the case of integrating a cell group one digit higher in precision (one digit grain size lower) than the cell Ca into the cell Ca, 10×10=100 cells one digit precision higher than the cell Ca have to be included in the cell Ca after integration. Accordingly, determination is made regarding whether or not there are 100 cell groups within the cell Ca.

Note that the position key four characters longer than the generated position key in step S272 is a position key at least two digits higher than a cell corresponding to the generated position key, in other words a position key of a cell having a grain size smaller at least two digits. The reason to remove a cell at least two digits higher is, for example, in the light of a case where there are 99 cells one digit higher in precision, and there is at least one cell two digits higher in precision in the region of the remaining one cell. Tentatively, in the case that there is one cell at least two digits higher in precision, determination is made that 100 cells are included in the cell to be integrated. That is to say, in order to obtain the number of cell groups one digit higher in precision as to the cell to be integrated, a position key four characters longer than the generated position key is removed. Also, a cell according to a position key completely agreeing with the generated position key is also not a cell one digit higher in precision as to the cell to be integrated. Accordingly, a position key completely agreeing with the generated position key is also removed.

In the case that the number of the remaining position key groups is 100 (Yes in S273), the position key generating section 123 deletes a position key forward-agreeing with the generated position key from the list L (S274). Next, the position key generating section 123 adds the generated position key to the list L (S275). On the other hand, in the case that the number of the remaining position key groups is not 100 (No in S273), steps S274 and S275 are not executed.

Figure 17:
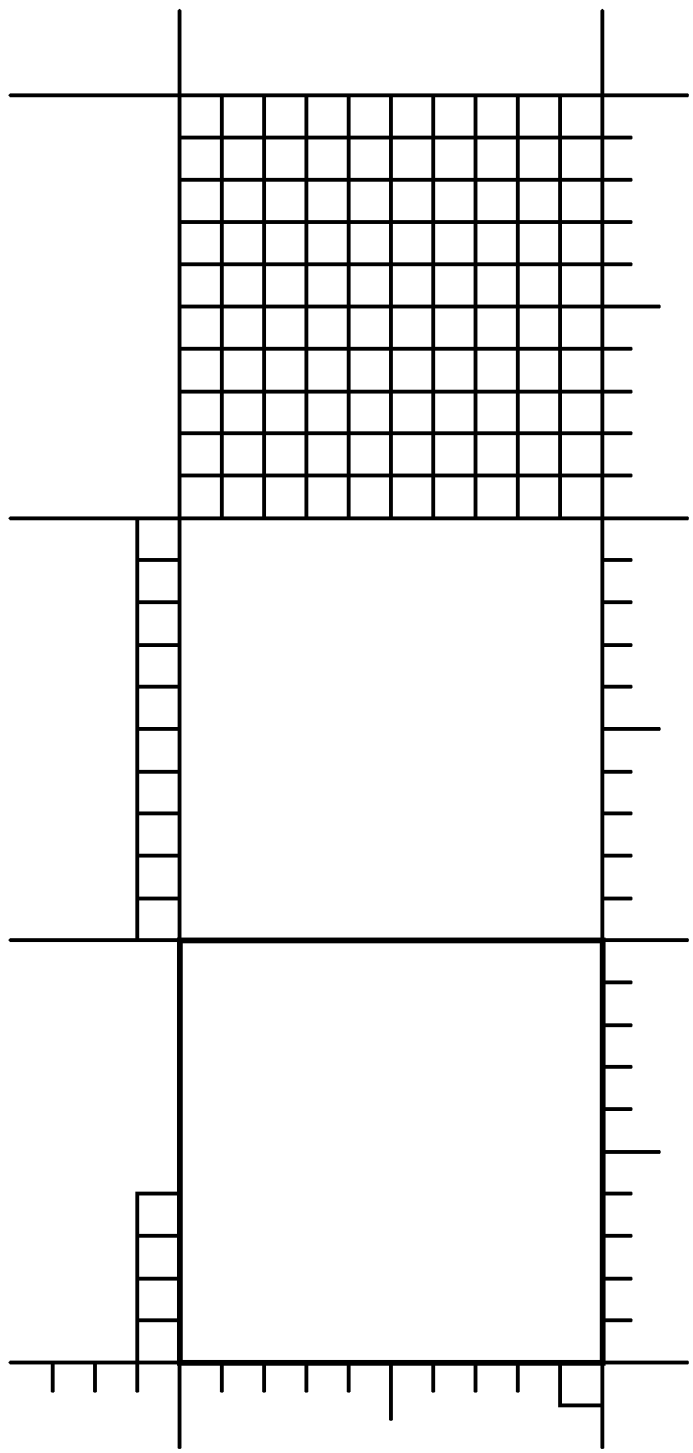
FIG. 17 is a diagram illustrating an example of integration results of cell groups straddling a specified rectangular region.

According to processing as described above, the cell groups illustrated in FIG. 15 are integrated such as illustrated in FIG. 17.

FIG. 17 is a diagram illustrating an example of integration results of cell groups straddling the specified rectangular region. As illustrated in the drawing, 100 cell groups with $\frac{1}{10000}$ degrees included in the cell Ca in FIG. 16 are integrated into the one cell Ca. On the other hand, the number of cell groups with $\frac{1}{10000}$ degrees included in the cell Cc is 99, and accordingly, the cell groups are not integrated into the cell Cc.

In this way, according to the processing in FIG. 9 through FIG. 12, the rectangular region group illustrated in FIG. 13 is divided into cell groups such as illustrated in FIG. 17.

Note that, in step S283, the position key generating section 123 returns the list L including the position key groups serving as the processing results.

Figure 18:
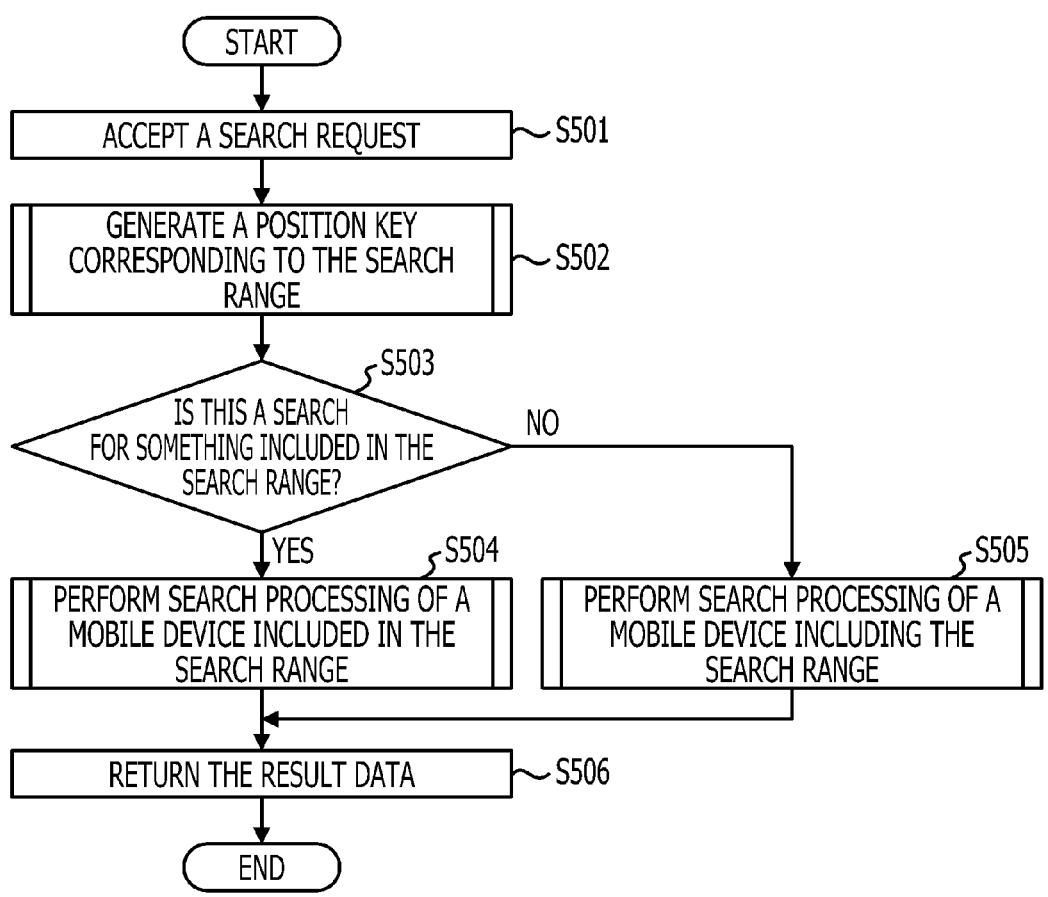
FIG. 18 is a flowchart for describing an example of a processing procedure of search processing for mobile information.

Next, mobile information search processing will be described. FIG. 18 is a flowchart for describing an example of a processing procedure of mobile information search processing.

In step S501, the search request accepting unit 125 accepts a mobile information search request from the service section 11. Note that for example, in response to a search request from the mobile terminal 20 or a fixed terminal which is not illustrated, the service section 11 inputs the search request to the search request accepting unit 125.

With the search request, information indicating the search range of mobile information, and meaning of this search range are specified. The search range is specified with the same format as with the size information of a mobile device. That is to say, the search range is specified with a group of rectangular regions. A specifying method of each of the rectangular regions is also the same as with the case of size information. Accordingly, the search range is represented with a data structure such as illustrated in FIG. 7.

The meaning of a search range is something that this search range includes, i.e., information indicating whether to search for something included in the search range, or something including this search range, i.e., information indicating whether to search for something including the search range. Note that the latter is effective at the time of searching regarding facility information or area information. For example, in the case of searching for information of another mobile device included in the range of a certain mobile device, this case corresponds to the former search. Also, for example, in the case of performing search such as which is a mobile device within a certain XX area, this case corresponds to the latter search.

Next, the search condition generating section 126 generates one or more position keys corresponding to a search range specified in the search request (S502). Specifically, there is generated a group of latitude and longitude of the lower left apex of each cell in the case of dividing the search range into cells according to the precision of latitude and longitude specified in the search request. Also, in the case that a cell having an upper digit than the precision of latitude and longitude specified in the search request is included in the search range, cell groups of lower digits are replaced with this upper digit cell. That is to say, normalization of cell groups is performed. Accordingly, the precision of each position key after conversion, i.e., effective digit numbers below a decimal point are not necessarily common.

The generated position key is a key used for search. In order to avoid confusion between this position key and a position key serving as searched information registered in the mobile information storage unit 131, the generated position key will hereafter be referred to as "search key". Note that, as will be described later, search keys included in a group of search keys to be generated differ according to the meaning of a search range specified in the search request.

Next, the search condition generating section 126 determines based on the meaning of a search range specified in the search request whether the search range is search for a mobile device that the search range includes, or search for a mobile device in which the search range is included (S503). In the case of search for a mobile device that the search range includes (Yes in S503), the searching section 127 executes search processing of a mobile device that the search range includes (S504). On the other hand, in the case of search for a mobile device in which the search range is included (No in S503), the searching section 127 executes search processing of a mobile device in which the search range is included (S505). Next, the searching section 127 returns the result data to the service section 11 as a search result (S506). The result data mentioned here is data in which mobile information that is a search result is stored in the search processing in step S504 or S505. Thereafter, the search result is returned to the mobile terminal 20 or a fixed terminal which is not illustrated or the like which is a search request source by the service section 11. However, the search result does not have to be returned without change. According to the service section 11, a process of the search result may be performed, or based on this search result, a result of further search being performed on the low-level section 12 may be returned to the search request source.

Figure 19:
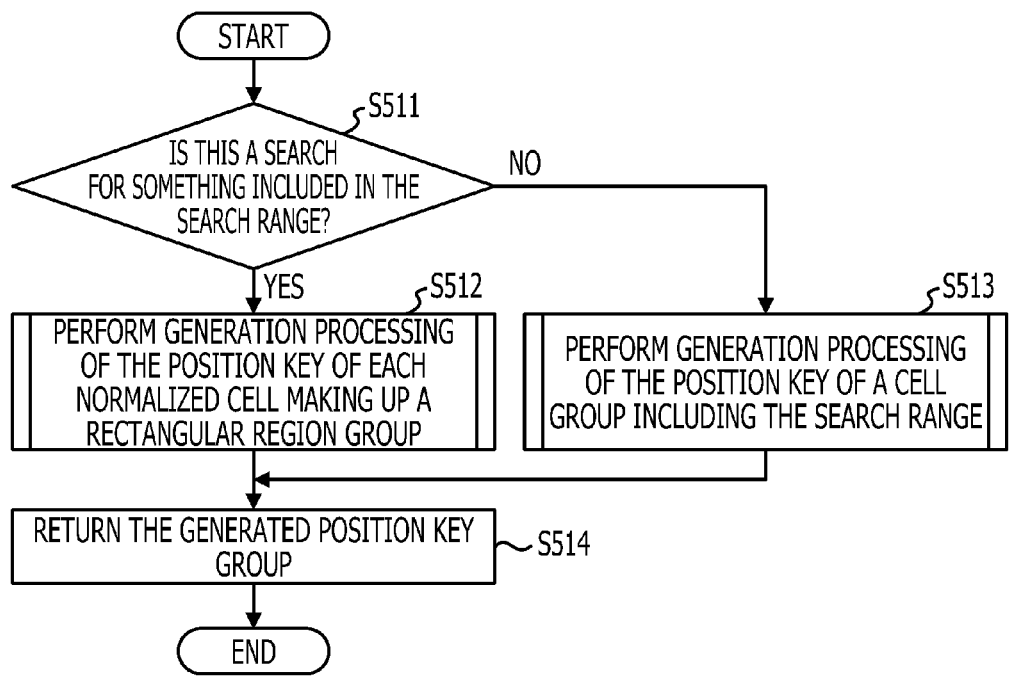
FIG. 19 is a flowchart for describing an example of a processing procedure of generation processing of a search key corresponding to a search range.

Next, the details of step S502 will be described. FIG. 19 is a flowchart for describing an example of a processing procedure of generation processing of a search key corresponding to a search range.

In step S511, the search condition generating section 126 determines based on the meaning of a search range specified in the search request whether the search range is search for a mobile device that the search range includes, or search for a mobile device in which the search range is included. In the case of search for a mobile device that the search range includes (Yes in S511), the position key generating section 123 executes generation processing of the position key of each normalize cell making up a group of rectangular regions according to the search range (S512). That is to say, with regard to a group of rectangular regions according to the search range, processing described in FIG. 9 through FIG. 12 is executed. As a result thereof, a position key is generated for each cell included in a normalized cell group making up a rectangular region according to the search range, and stored in the list L. This position key is used as a search key for searching for a mobile device that the search range includes.

On the other hand, in the case of search for a mobile device in which the search range is included (No in S511), the search condition generating section 126 executes generation processing of a position key for searching for a mobile device in which the search range is included (S513). The generated position key is used as a search key for searching for a mobile device in which the search range is included.

Next, the search condition generating section 126 returns the list L in which the position key group (search key group) generated in step S512 or S513 is stored (S514).

Figure 20:
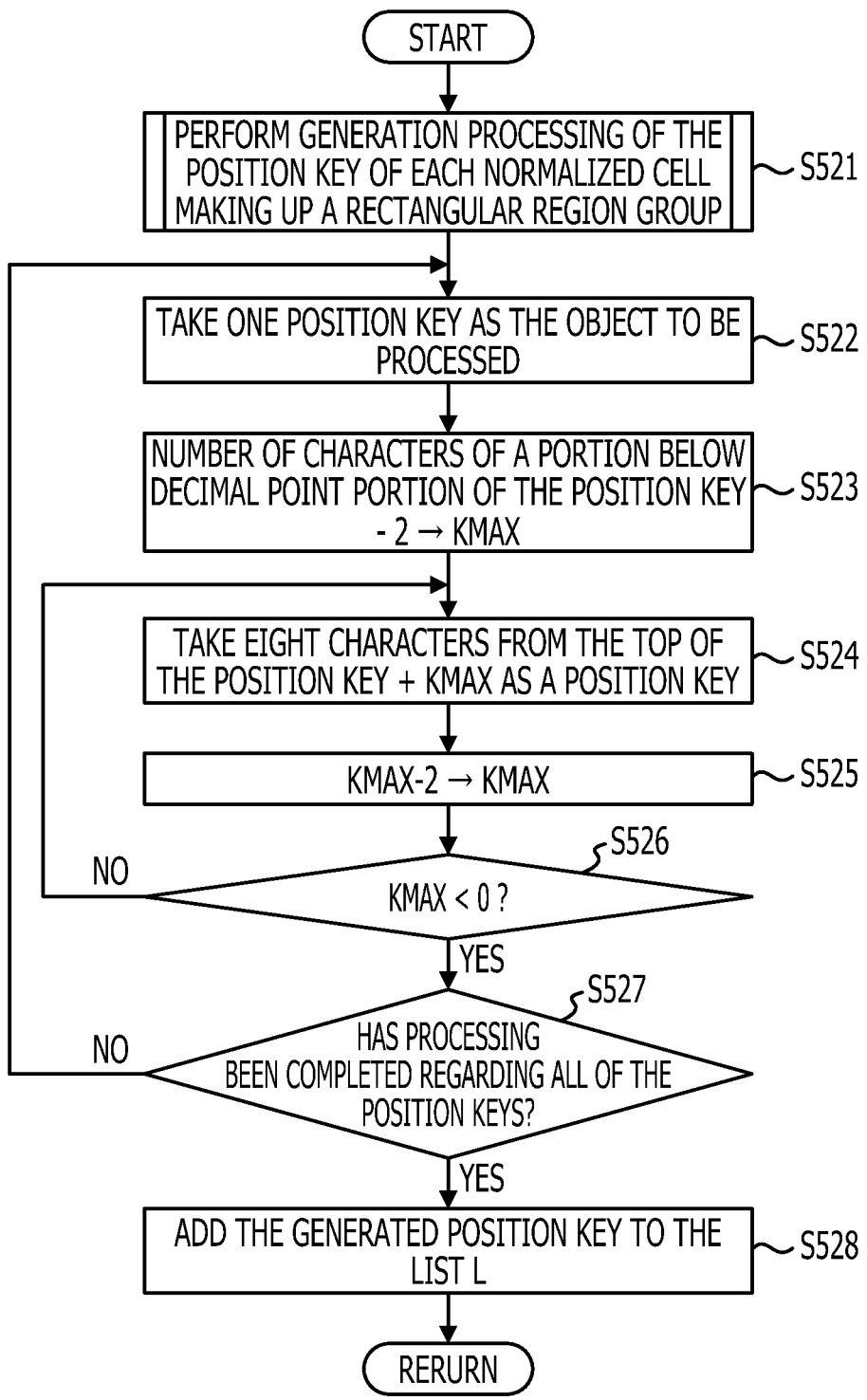
FIG. 20 is a flowchart for describing an example of a processing procedure of generation processing of a position key for searching a mobile device including a search range.

Next, the details of step S513 in FIG. 19 will be described. FIG. 20 is a flowchart for describing an example of a processing procedure of generation processing of a position key for searching for a mobile device in which a search range is included.

In step S521, the position key generating section 123 executes generation processing of the position key of each normalized cell making up a group of rectangular regions according to the search range. That is to say, with regard to a group of rectangular regions according to the search range, processing described in FIG. 9 through FIG. 12 is executed. As a result thereof, a position key is generated for each cell included in a normalized cell group making up a rectangular region according to the search range, and stored in the list L.

Next, the search condition generating section 126 takes one position key of a position key group included in the list L (hereafter, referred to as "object key") as the object to be processed (S522). Next, the search condition generating section 126 substitutes the number of characters of a portion below a decimal point of the object key-2 for a variable KMAX (S523). With the position keys according to the present embodiment, an integer portion is made up of six characters (three characters of latitude+three characters of longitude), and a sign portion ("++") is made up of two characters. Accordingly, a value obtained by subtracting 8 from the number of characters of an object key, and further subtracting 2 therefrom is substituted for the variable KMAX.

Next, the search condition generating section 126 records a character string of the number of characters from the head of the object key to 8+the variable KMAX in a storage region for work (work region) as a position key (S524). Accordingly, first, a position key from which two characters worth of the tail end of the object key have been removed is added to the work region. Note that the position key from which the two characters worth of the tail end have been removed is a position key corresponding to latitude and longitude after the one digit of the tail end of the latitude and longitude that the object key indicates is removed, i.e., a position key corresponding to (rounded off to) a digit one digit upper than the object key.

Next, the search condition generating section 126 subtracts 2 from the variable KMAX (S525). Steps S524 and S525 are repeated until the value of the variable KMAX becomes less than 0 (S526). As a result thereof, with regard to the latitude and longitude of the object key, a position key is generated and added to the work region for each digit up to the digits of the integer portion. As a specific example, if we say that the object key is "++10339515262132", further the following position keys are added to the list L.

++10339515262132++103395152621++
1033951526++10339515++103395

Upon steps S522 through S526 being executed regarding all of the position keys included in the list L (Yes in S527), the search condition generating section 126 adds a position key group recorded in the work region to the list L (S528). That is to say, the position keys newly generated in steps S522 through S526 are taken as search keys.

In this way, in the case of search for a mobile device including the search range, with the list L, a position key group wherein each position key thereof is rounded off to an upper digit is taken as a search key in addition to a position key group originally included in the list L. The reason thereof will be described later. Note that, in the case of distinguishing a position key originally included in the list L from a round-off position key, the former will be referred to as "original search key", and the latter will be referred to as "round-off search key".

Figure 21:
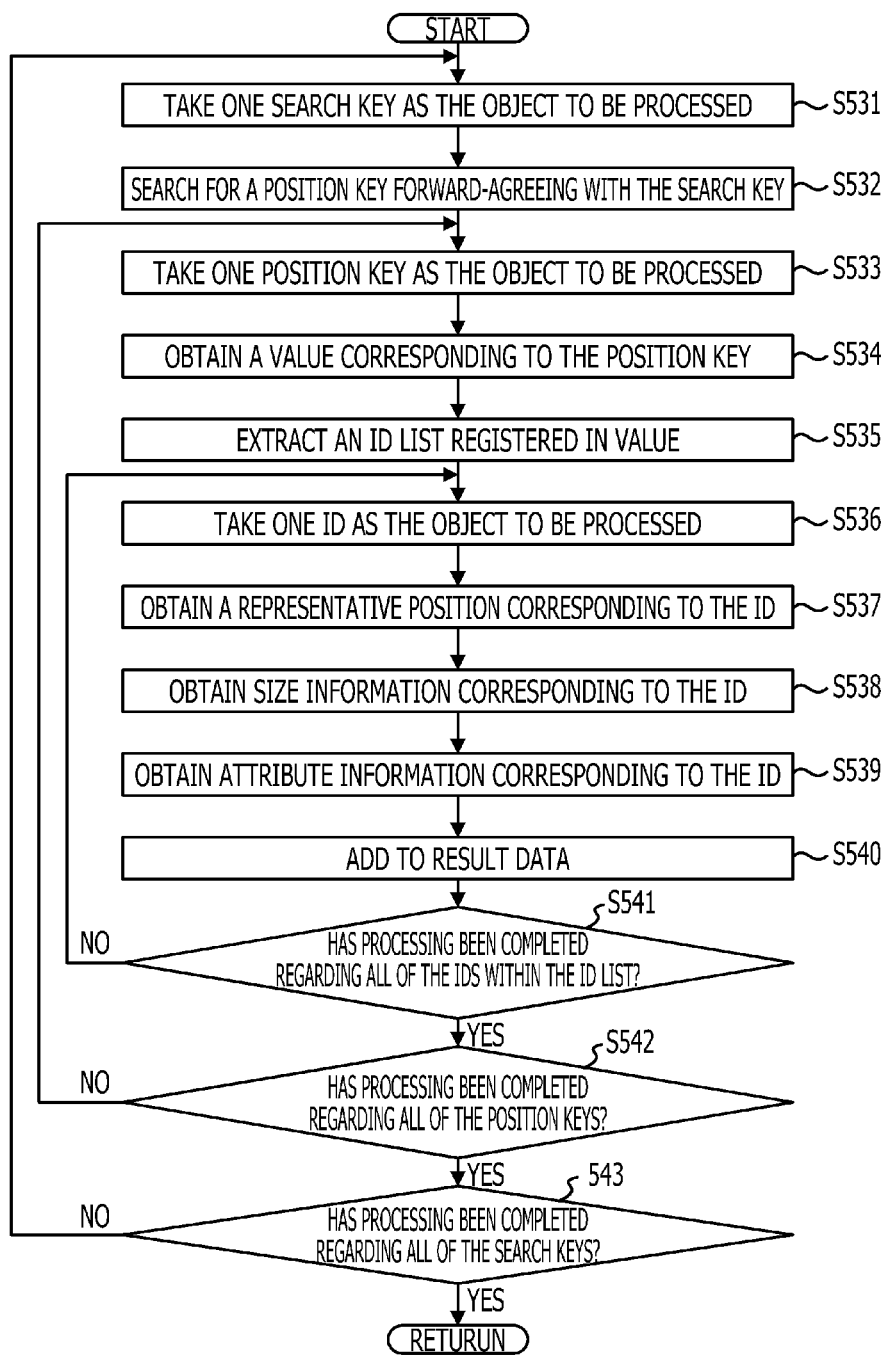
FIG. 21 is a flowchart for describing an example of a processing procedure of search processing of a mobile device that a search range includes.

Next, the details of step S504 in FIG. 18 will be described. FIG. 21 is a flowchart for describing an example of a processing procedure of search processing for a mobile device that the search range includes.

In step S531, the searching section 127 takes one search key of a search key group included in the list L generated in step S502 in FIG. 18 as the object to be processed. Next, the searching section 127 searches for position keys forward-agreeing with the search key from the mobile information storage unit 131 (S532). Note that the position keys forward-agreeing with the search key mentioned here are position keys a portion or all of which all include this search key from the forward. In the case of this search key being included in all from the forward, this case is equivalent to complete agreement.

The position keys forward-agreeing with the search key are equivalent to position keys corresponding to the lower left apex of a cell making up a mobile device that a range (cell) that the search key indicates includes. Description will be made regarding a reason why a position key forward-agreeing with the search key results in the range (cell) that this search key indicates including a cell according to this position key.

Figure 22:
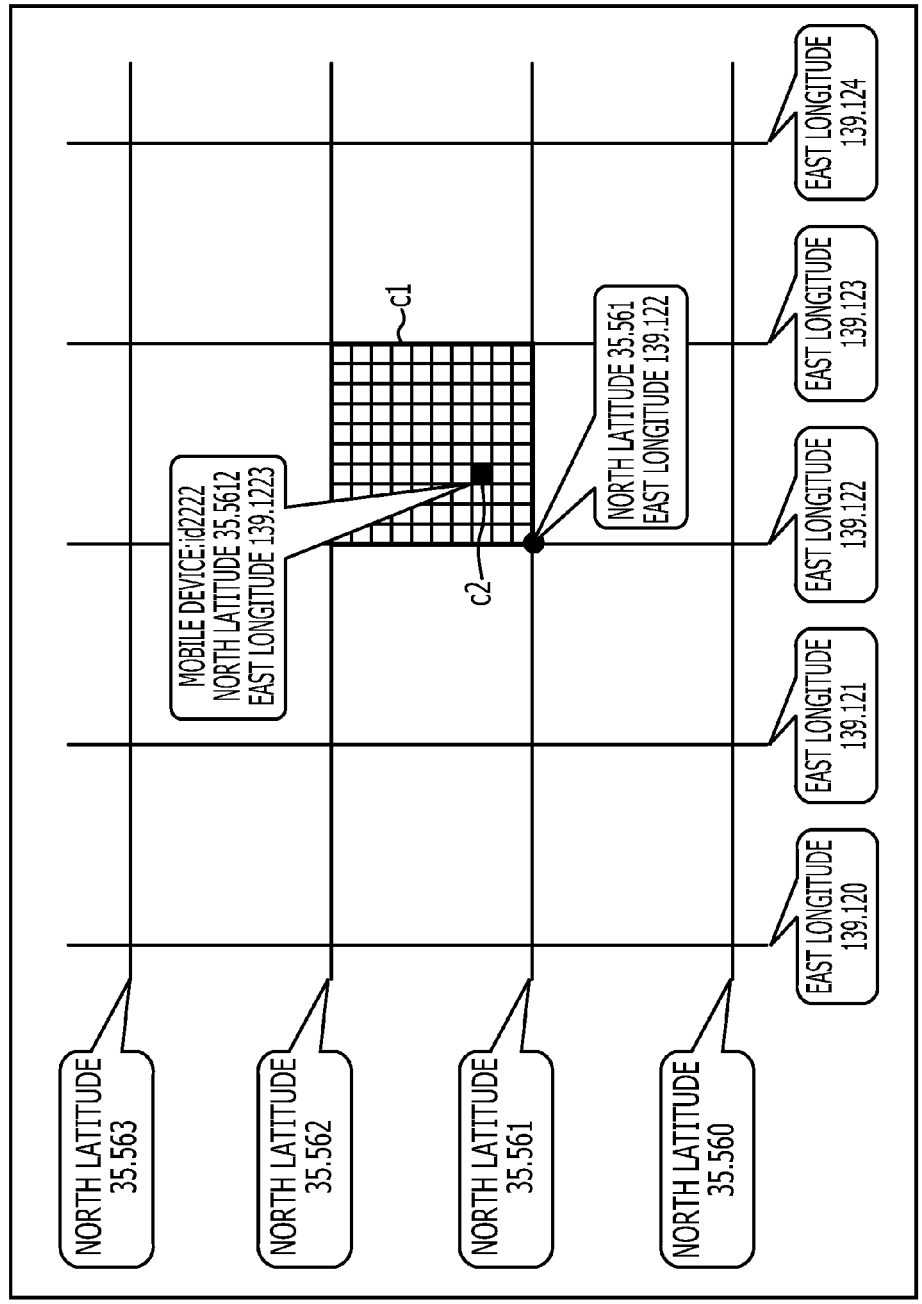
FIG. 22 is a diagram for describing significance of forward agreement with a search key.

FIG. 22 is a diagram for describing meaning of forward agreement with the search key. In the drawing, an example is illustrated wherein latitude and longitude corresponding to the search key is (35.561, 139.122), and latitude and longitude corresponding to a position key of a mobile device stored in the mobile information storage unit 131 is (35.5612, 139.1223). In this case, a cell that the search key indicates is equivalent to a cell c1 surrounded with a thick line in the drawing. On the other hand, a cell that the position key of a mobile device indicates is equivalent to a cell c2 indicated with a black rectangle in the drawing. As apparent from the drawing, the cell c1 includes the cell c2.

Also, when converting (35.561, 139.122) into a position key (i.e., a search key), this becomes "++103395152621". When converting (35.5612, 139.1223) into a position key, this becomes "++10339515262132". This position key forward-agrees with this search key.

In this way, in the event that a position key forward-agrees with the search key, a cell that this position key indicates is included in or agrees with a cell that this search key indicates. According to such a property of the position keys, with the present embodiment, a mobile device included in a certain range can be searched at high speed.

In other words, with the present embodiment, in the case that latitude and longitude is taken as a key in KVS, at the time of searching for a key included in a certain range, in order to enable such high-speed search according to forward agreement, the latitude and longitude are converted into the format of a position key, and taken as a key in KSV. Tentatively, in the case of taking a character string simply connected in order of the latitude and longitude as a position key, high-speed search according to forward agreement as described above is difficult. With a character string simply connected in order of the latitude and longitude, with the example in FIG. 22, the search key becomes "+35561+139122". Also, the position key of a mobile device becomes "+355612+1391223". This position key does not forward-agree with this search key. Also, according to a property of KVS, it is difficult to perform key search according to regular expression such as "+35561*+139122*". Note that "*" mentioned here indicates a wild card.

Note that, as described above, the size of a cell depends on the precision of latitude and longitude that the lower left apex of this cell indicates. With regard to the cell c1, the latitude and longitude of the lower left apex is in increments of 1/1000 degrees. Accordingly, the cell c1 is equivalent to a rectangular region of which one side is 1/1000 degrees. On the other hand, with regard to the cell c2, the latitude and longitude of the lower left apex is in increments of 1/10000 degrees. Accordingly, the cell c2 is equivalent to a rectangular region of which one side is 1/10000 degrees. Tentatively, in the event of indicating a cell with the same position as with the cell c1 being taken as the lower left apex, and with one side being 1/10000 degrees, the lower left apex of this cell has to be specified as (35.5610, 139.1220). On the other hand, in the event of specifying a range having the same size as the cell c1 with the lower left apex being taken as (35.5611, 139.1221), this range is specified with 100 cells with this latitude and longitude being taken as the lower left apex, and with one side being 1/10000 degrees, included in a rectangular region having the same size as the cell c1.

Next, the searching section 127 takes one of the searched position key groups as the object to be processed (hereafter, referred to as "object key") (S533). Next, the searching section 127 obtains a value corresponding to the object key from the mobile information storage unit 131 (S534). Next, the searching section 127 extracts a list of mobile device IDs from the obtained value (S535). That is to say, the value of an id is obtained from each row included in this value. Next, the searching section 127 takes one mobile device ID from this mobile device ID group list as the object to be processed (S536). Next, the searching section 127 obtains a representative position correlated with the mobile device ID to be processed (S537). Next, the searching section 127 obtains size information correlated with the mobile device ID taken as the object to be processed (S538). Next, the searching section 127 obtains attribute information correlated with the mobile device ID taken as the object to be processed (S539). Next, the searching section 127 adds the data obtained in steps S537 through S539 to the result data (S540). The result data is data for storing a search result. Steps S536 through S540 are executed regarding all of the mobile device IDs extracted in step S535 (S541). Also, steps S533 through S541 are executed regarding all of the position keys searched in step S532 (S542).

Upon steps S531 through S542 being executed regarding all of the search keys (Yes in S543), the processing in FIG. 21 is ended. Accordingly, the result data at this moment point is returned in step S506 in FIG. 18.

Figure 23A:
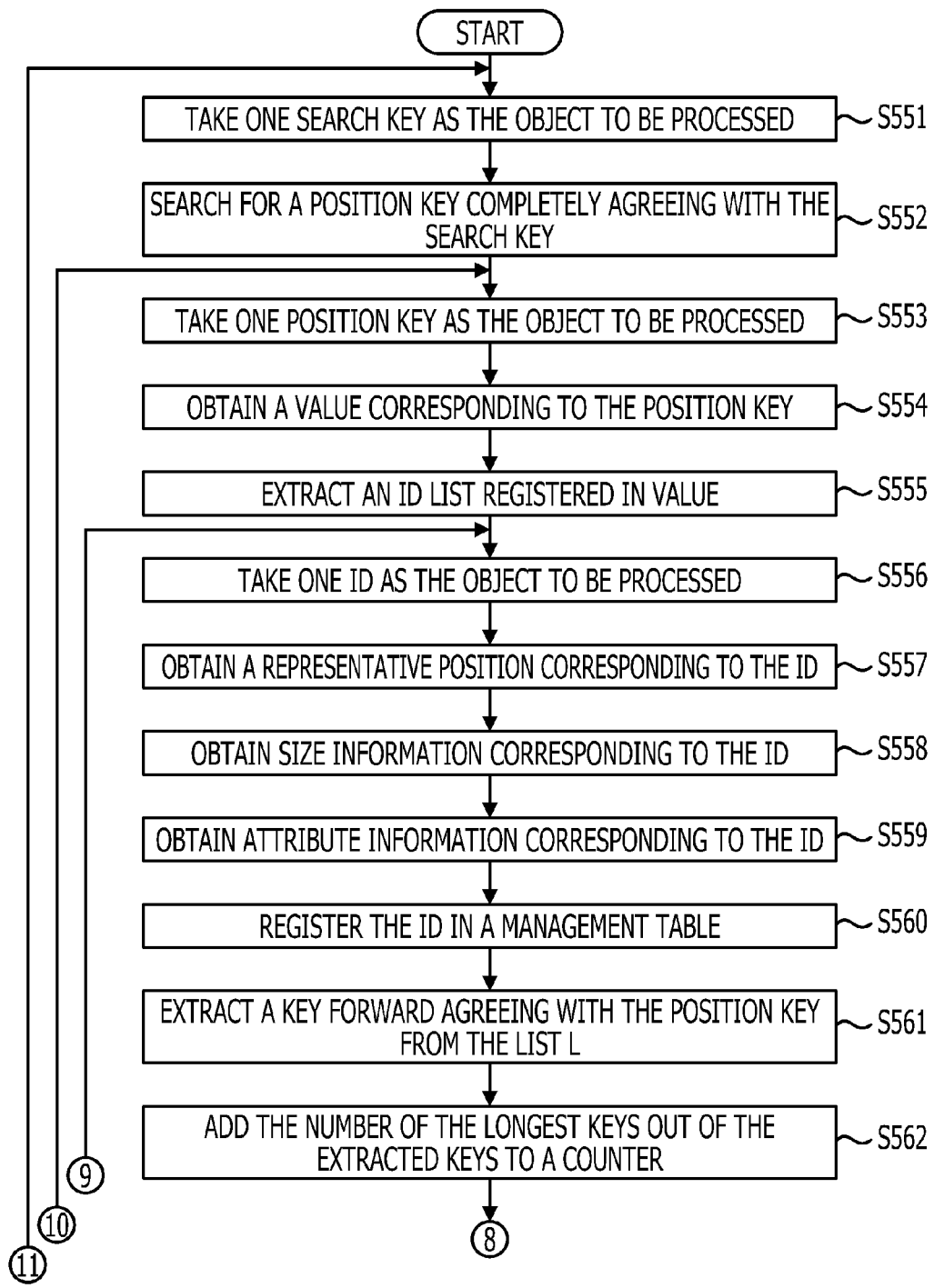
FIGS. 23A and 23B are flowcharts for describing an example of a processing procedure of search processing of a mobile device in which a search range is included.
Figure 23B:
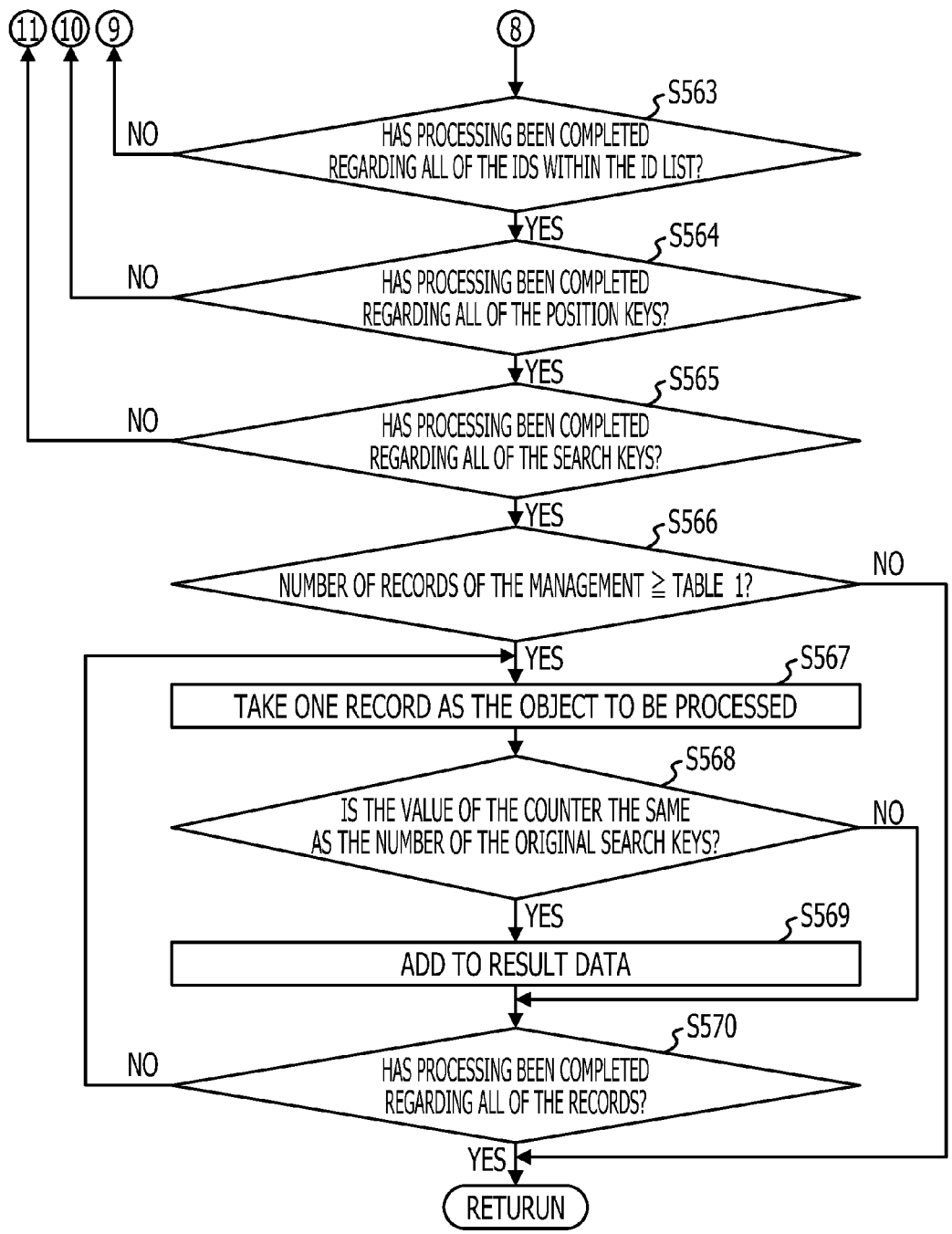

Next, the details of step S505 in FIG. 18 will be described. FIGS. 23A and 23B are flowcharts for describing an example of a processing procedure of search processing for a mobile device in which the search range is included.

In step S551, the searching section 127 takes one search key of a search key group included in the list L generated in step S502 in FIG. 18 as the object to be processed. Next, the searching section 127 searches for position keys completely agreeing with the search key from the mobile information storage unit 131 (S552).

According to the processing described in FIG. 20, a round-off search key is included in the list L in addition to the original search key. Accordingly, for example, in the event that the round-off search key is the search key in step S552, a position key completely agreeing with this search key is a position key corresponding to a cell including a cell corresponding to the original search key. Also, in the event that the original search key is the search key in step S552, a position key completely agreeing with this search key is a position key corresponding to a cell agreeing with a cell corresponding to the original search key.

Note that a cell corresponding to one search key is not restricted to a region including all of the rectangular regions groups specified as a search range. A cell corresponding to one search key is a cell including at least a portion of the search range. Accordingly, in step S552, a position key corresponding to a cell including at least a portion of the search range is searched. Subsequent steps S553 through S559 are the same as steps S533 through S539 in FIG. 21.

Next, the searching section 127 registers a mobile device ID serving as the object to be processed in a management table (S560).

FIG. 24 is a diagram illustrating a configuration example of the management table. In the drawing, one record in the management table can store a mobile device ID, a counter, attribute information, and so forth. The initial value of the counter is "0". Note that the management table is a storage region to be temporarily generated, and can be realized by using the memory device 103 or auxiliary storage device 102 or the like, for example.

In step S560, in the event that there is no record having the same mobile device ID as a mobile device ID serving as the object to be processed, a new record is generated, and a mobile device ID to be processed is recorded in this record. Also, information obtained in steps S557 through S559 is recorded in this record as attribute information or the like.

On the other hand, in the event that there is a record having the same mobile device ID as a mobile device ID serving as the object to be processed, generation of a record is not performed. That is to say, the number of records to be recorded in the management table as to the same mobile device ID is one at the maximum.

Next, the searching section 127 extracts position keys forward-agreeing with the search key from the list L (S561). Next, the searching section 127 adds the number of position keys having the maximum number of characters (longest position keys) out of the extracted position keys to the counter of a record corresponding to the mobile device ID serving as the object to be processed in the management table (S562). A position key having the maximum number of characters out of the extracted position keys is the original search key as to this search key. Accordingly, the number of the original search keys as to this search key is added to the counter.

Next, meaning of the processing in steps S560 through S562 will be described. With search for a mobile device in which the search range is included, a mobile device including all of the cells making up the search range has to be searched. A search key corresponding to a cell making up the search range is the original search key. Accordingly, in the event that there is a mobile device with cells corresponding to all of the original search keys being taken as a portion or all of the range thereof, this is an intended mobile device. However, with the original search keys, it is difficult to search for a mobile device including the search range at high speed.

Therefore, with the present embodiment, a round-off search key is employed. The significance of existence of a round-off search key is in that the round-off search key includes a cell corresponding to the original search key, and a greater cell of the mobile device than this cell is searched at high speed. That is to say, a certain position key having completely agreed with a round-off search key means a cell corresponding to this position key including a cell corresponding to the original search key that is the origin of this round-off search key. Accordingly, it can be said that a search result according to a round-off search key is a search result of the original search key.

Thus, in the event of having recorded the number of times of hits of the search based on a round-off search key for each mobile device, it can be said that a mobile device with an accumulated value of the number of times thereof agreeing with a total number of the original search keys is a mobile device including all of the cells making up the search range. An item for recording the number of hits of this search is the counter of the management table.

Figure 25:
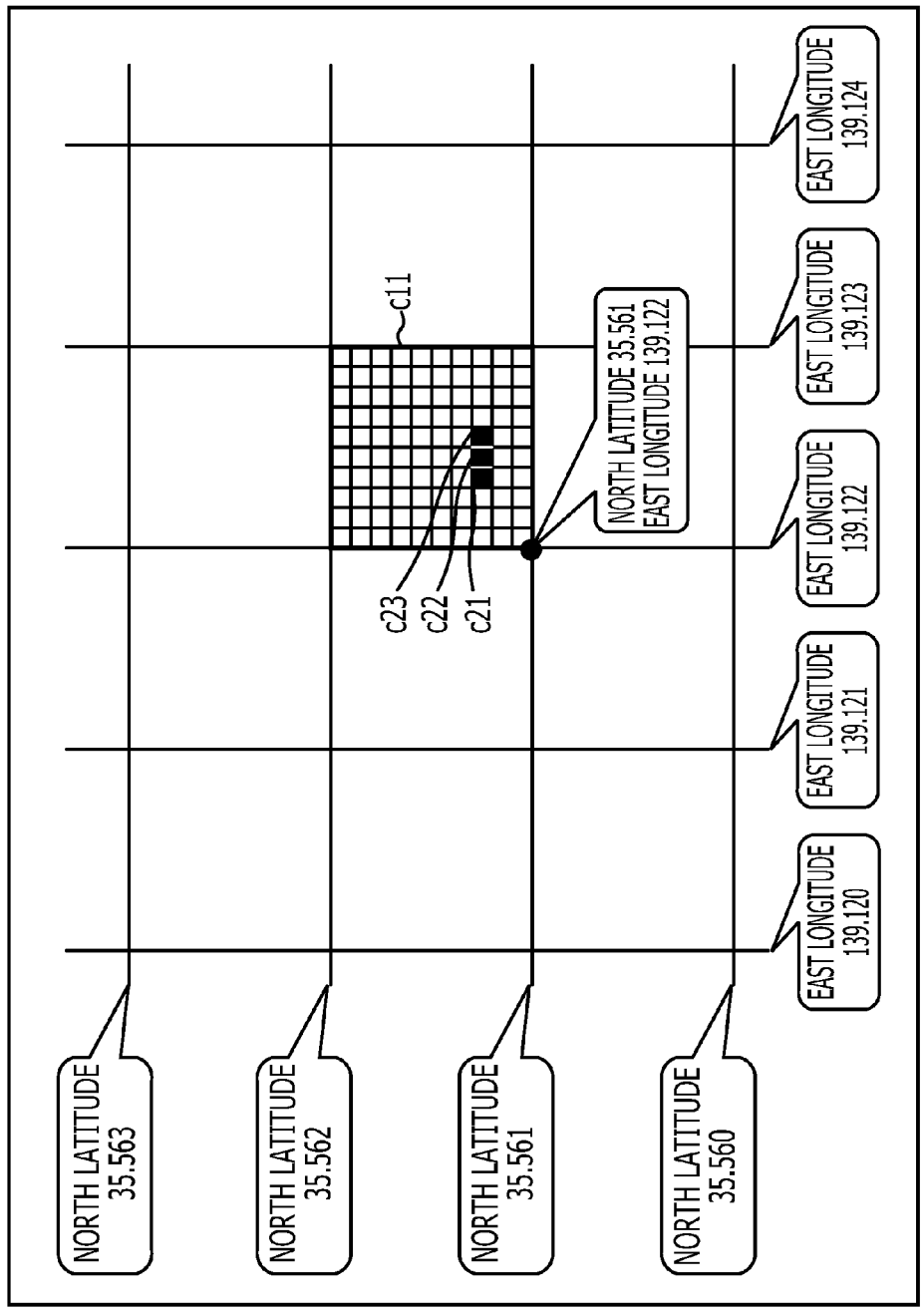
FIG. 25 is a diagram illustrating an example wherein a single round-off search key is common to multiple original search keys.
Figure 26D:
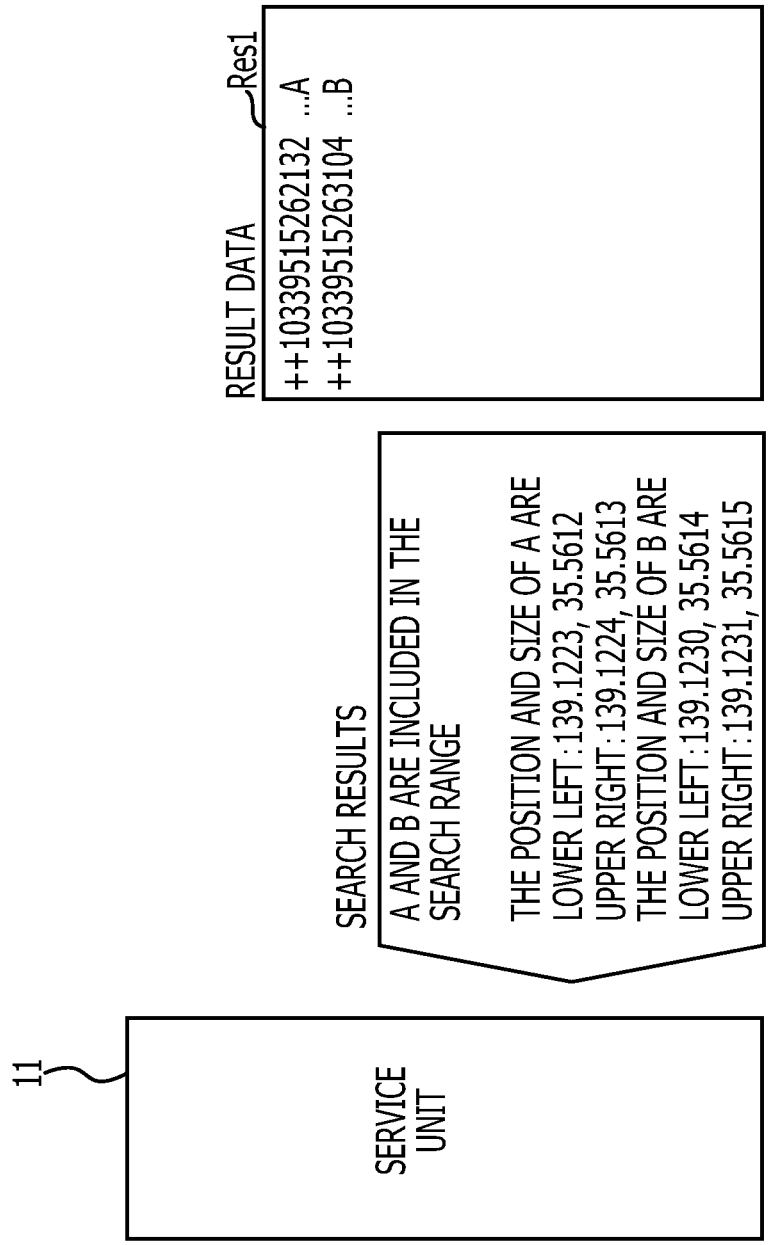
Figure 28D:
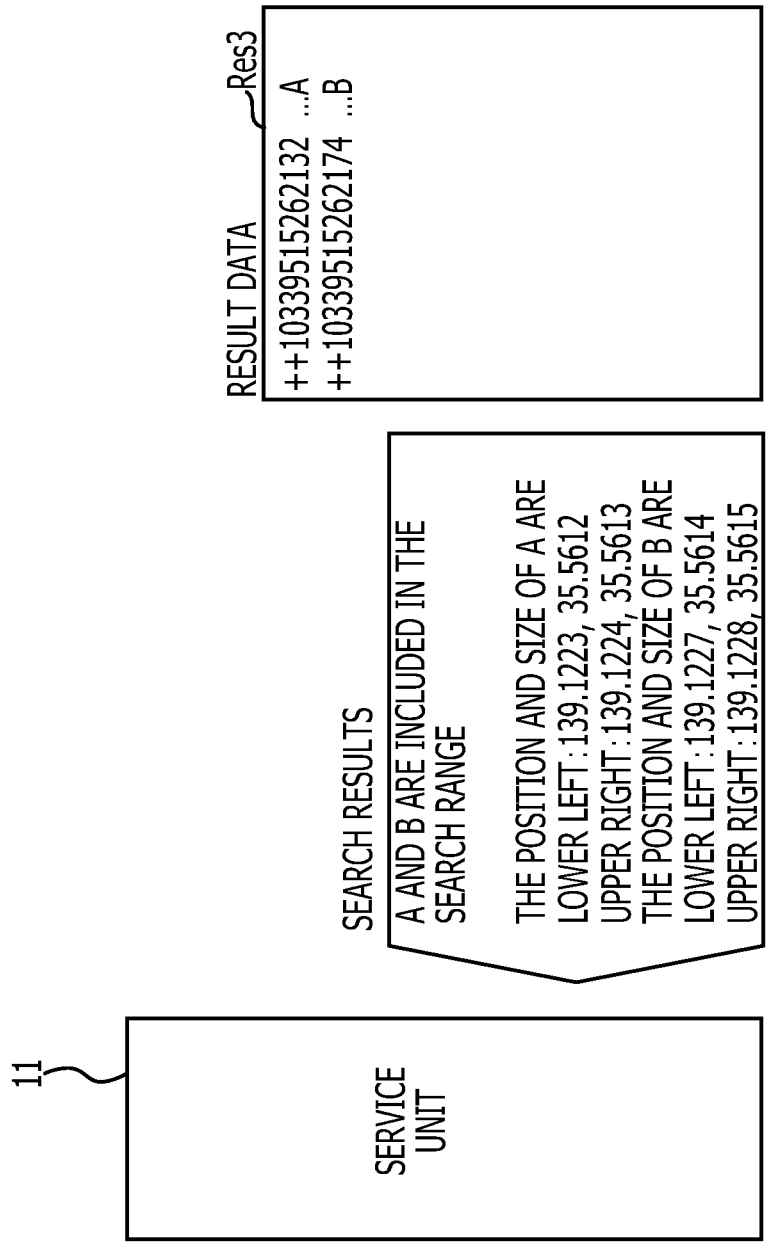
Figure 29C:
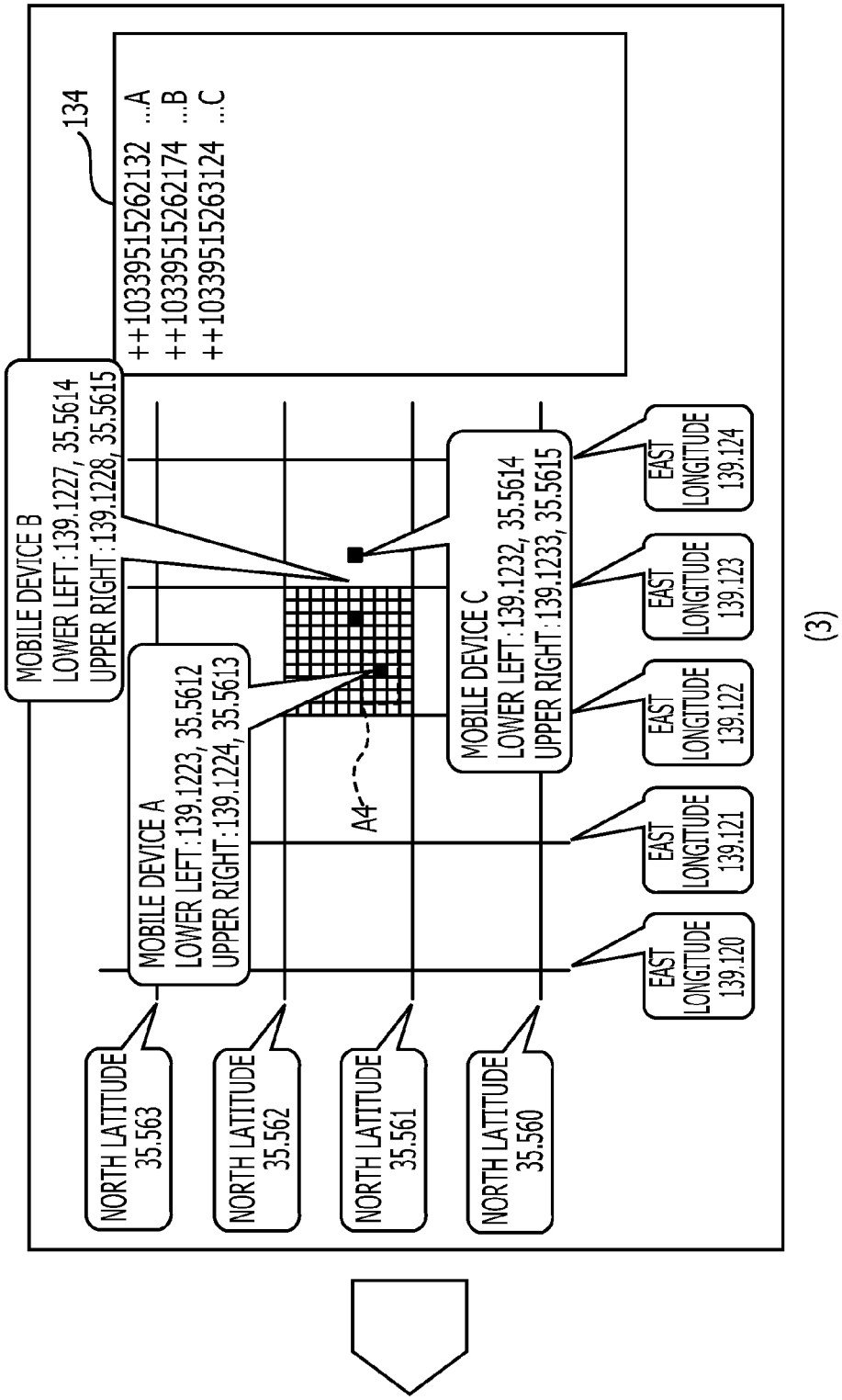
Figure 30C:
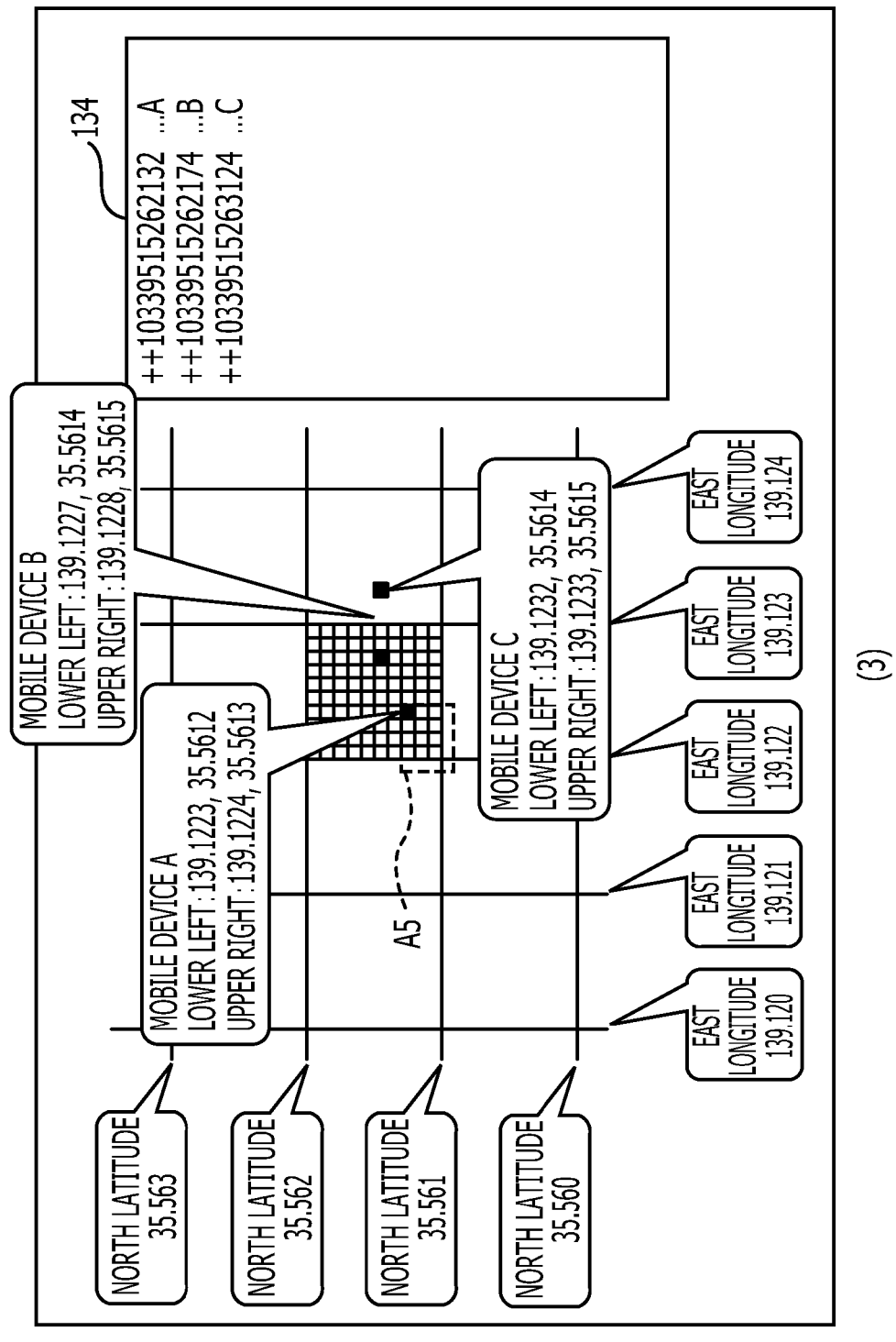
Figure 30D:
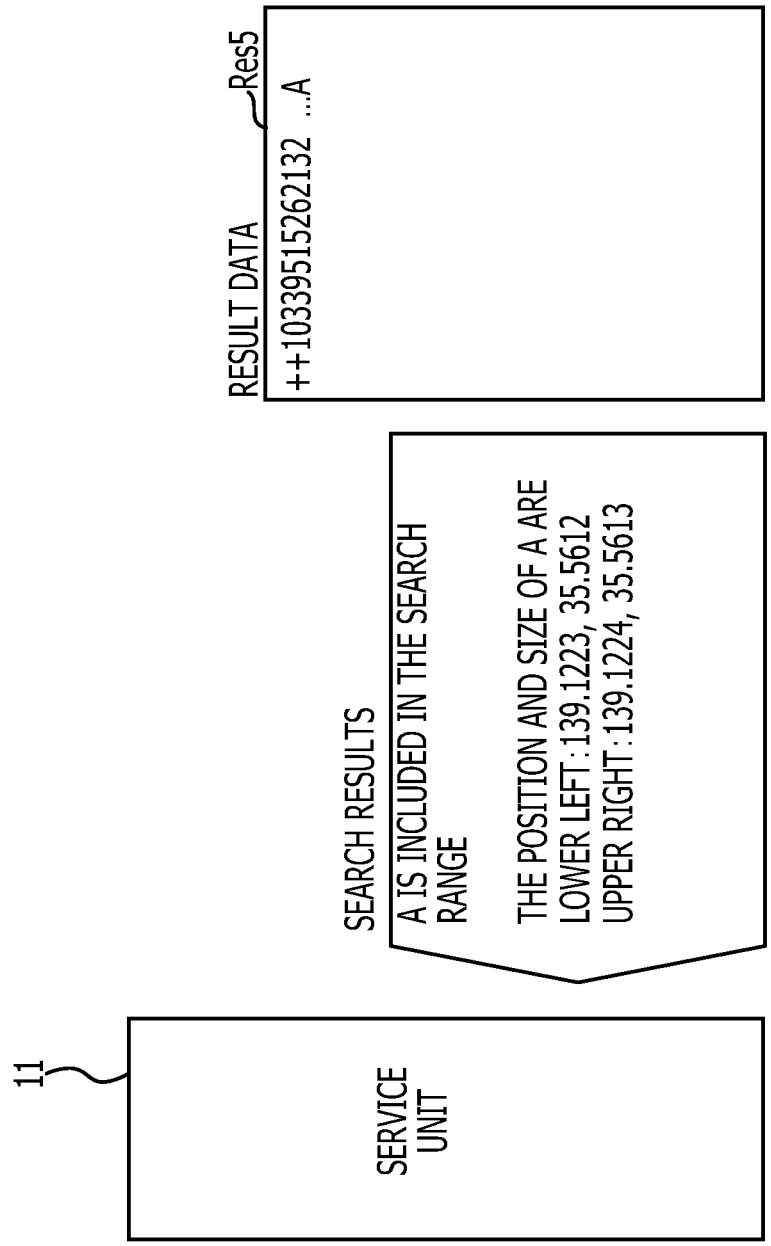
Figure 31B:
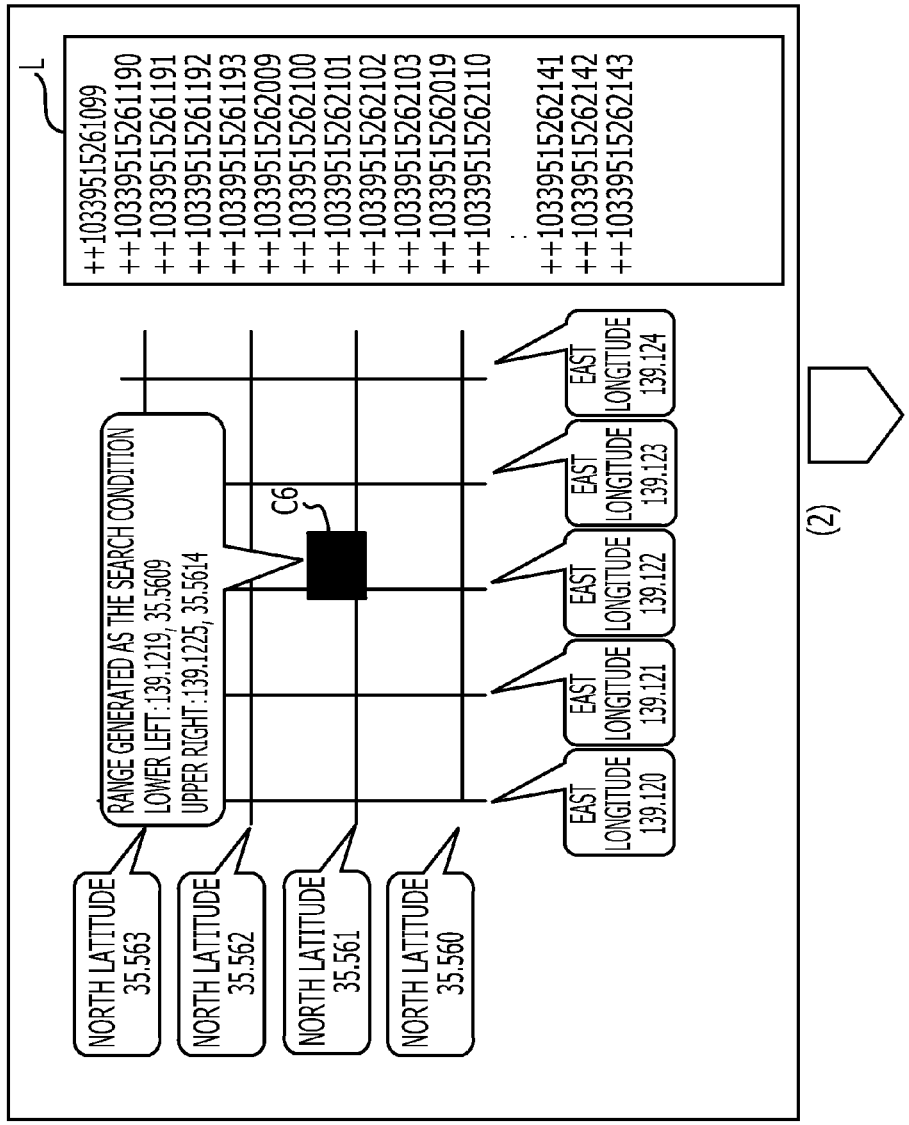
Figure 31C:
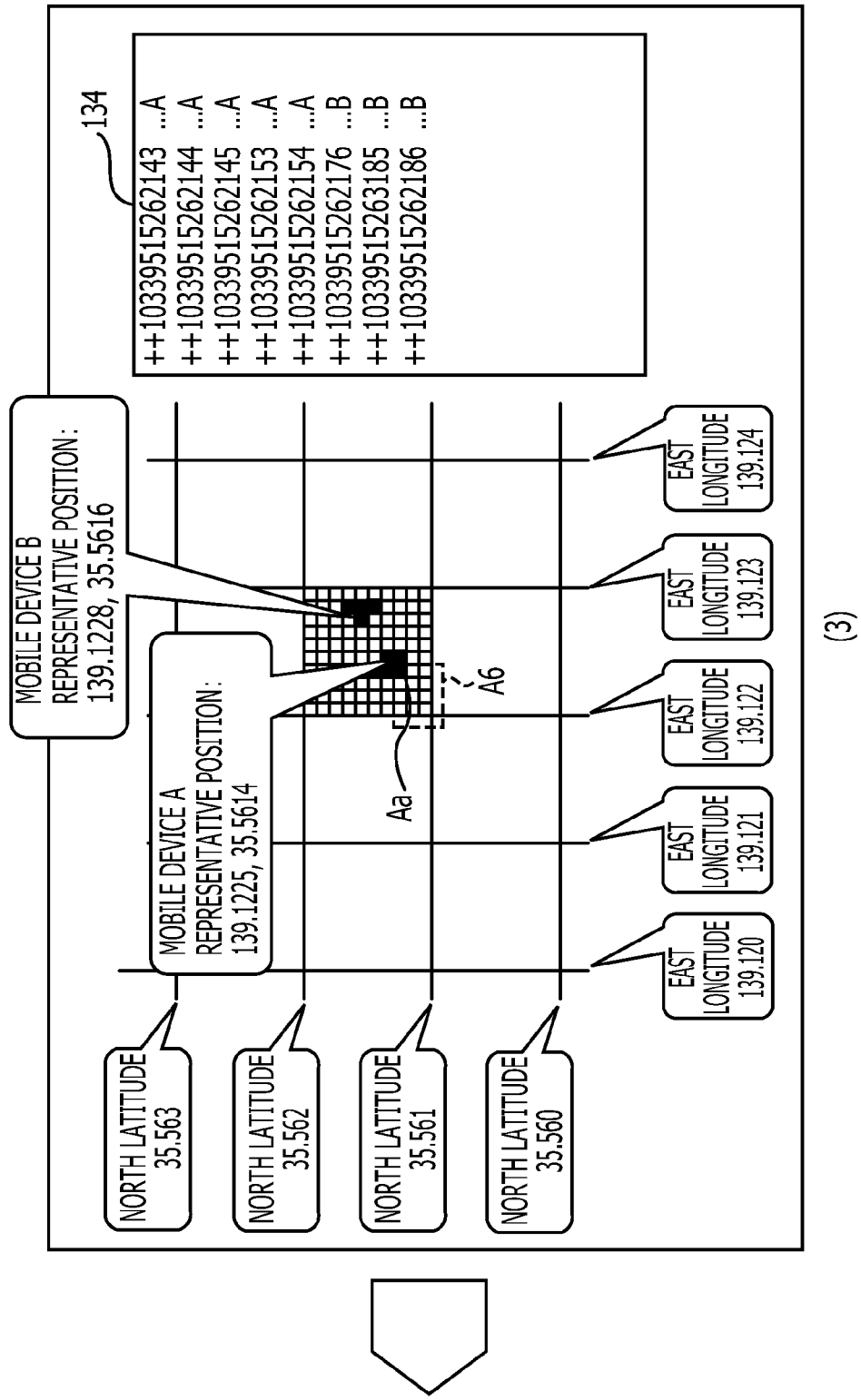
Figure 32B:
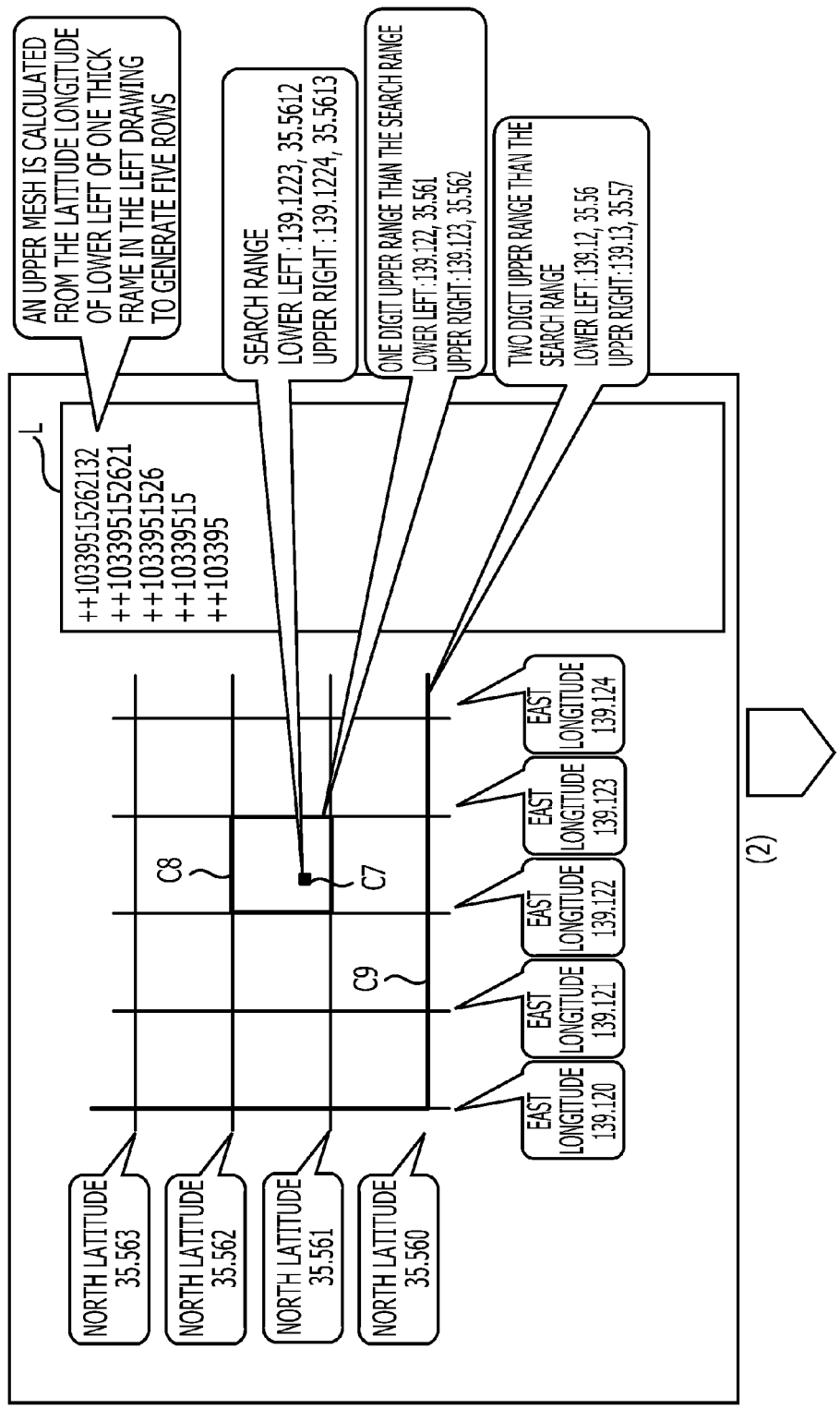

However, one round-off search key may be common to multiple original search keys as illustrated in FIG. 25.

FIG. 25 is a diagram illustrating an example wherein one round-off search key is common to multiple original search keys.

In this drawing, there are illustrated cells c21, c22, and c23 indicated with a black square in the drawing, serving as cells in increments of 1/10000 degrees, and a cell c11 indicated with a thick line in the drawing including these cells, serving as cells in increments of 1/1000 degrees. If we say that the position key of each of the cells c21, c22, and c23 is the original search key, the position key of the cell c11 is one of round-off search keys common to the cells c21, c22, and c23.

Accordingly, having hit to search based on the round-off search key according to the cell c11 means having hit to search based on the three original search keys.

In step S562, in the light of such a case, of the extracted position keys, the number of position keys having the maximum number of characters, i.e., the number of the longest position keys is added to the counter instead of simply adding one to the counter. Note that the position keys having the maximum number of characters means the original search keys. Specifically, with regard to the cells c21, c22, and c23, in FIG. 25, a round-off search key in increments of 1/1000 degrees, 1/100 degrees, 1/10 degrees, or 1 degree is generated. Tentatively, let us say that the search key serving as the object to be processed is a round-off search key with 1/100 degrees. In this case, not only the original search key according to the cells c21, c22, or c23 but also a round-off search key of each of 1/100 degrees and 1/1000 degrees are also included in the position key group extracted from the list L as position keys forward-agreeing with this round-off search key. Of such a position key group, the number of characters of the original search key according to the cell c21, c22, or c23 has to be the longest. Accordingly, in step S562, of the extracted position keys, the number of position keys having the maximum number of characters, i.e., the number of the longest position keys is added to the counter, which means that the number of the original search keys alone is added to the counter.

Subsequent steps S563 through S565 are the same as steps S541 through S543 in FIG. 21. That is to say, steps S556 through S562 are executed regarding all of the mobile device IDs extracted in step S555 (S563). Also, steps S553 through S563 are executed regarding all of the position keys searched in step S552 (S564). Further, steps S551 through S564 are executed regarding all of the search keys included in the list L (S565).

Next, the searching section 127 determines whether or not the number of records in the management table is equal to or greater than 1 (S566). In the event that the number of records in the management table is equal to or greater than 1 (Yes in S566), the searching section 127 takes one record as the object to be processed (S567). Next, the searching section 127 determines whether or not the value of this record counter is the same as the number of the original search keys (S568). As described regarding steps S560 through S562, the value of this counter is the same as the number of the original search keys, which means that a mobile device according to a mobile device ID recorded in this record includes the search range, i.e., means that this search range is included this mobile device. Accordingly, in the event that the value of this counter is the same as the number of the original search keys (Yes in S568), the searching section 127 adds the attribute information and so forth in this record to the result data (S569). Upon steps S567 through S569 being executed regarding all of the records recorded in the management table (Yes in S570), the processing in FIGS. 23A and 23B is ended.

Note that, though the search processing for mobile information has been described above, in the event that the search request accepting section 125 has accepted a search request for facility information or area information as well, basically the same processing procedure is executed except that the search destination becomes the facility information storage unit 132 or area information storage unit 133. That is to say, the mobile terminal 20 which one person or one vehicle carries is represented as a rectangular region with the finest precision in the present system. Accordingly, the same concept may be applied to even search for a store or area having a wider area than a mobile device.

The search processing for mobile information will be described with reference to a specific example. FIGS. 26A through 26D are diagrams illustrating a first specific example of the search processing for mobile information. In the drawing, an example is illustrated wherein, with a search request Req1, (139.1219, 35.5609) has been specified as the lower left apex of a search range A1, and (139.1231, 35.5621) has been specified as the upper right apex, and search for a mobile device that this search range includes has been requested.

In this case, the effective digit number KMAX becomes "4". That is to say, the precision of the search range A1 is 0.0001 degrees. Accordingly, the search range A1 is, as illustrated in (1) in the drawing, divided into 144 cell groups with one side being taken as 0.0001 degrees. However, cell groups included in a cell with (35.561, 139.122) being taken as the lower left apex, and with (35.562, 139.123) being taken as the upper right apex are integrated into a cell C1a illustrated (2) in the drawing. That is to say, one position key corresponding to the lower left apex (35.561, 139.122) of the cell C1a, and 44 position keys corresponding to the lower left apexes of 44 cell groups C1b respectively are added to the list L as search keys.

As a result thereof, position keys forward-agreeing with any search key included in the list L are searched from the mobile information storage unit 131. For example, as illustrated in (3) in the drawing, in the event that the mobile information of three mobile devices A, B, and C is stored in the mobile information storage unit 131, a position key of the mobile device A, and a position key of the mobile device B positioned in the search range A1 forward-agrees with any search key included in the list L. On the other hand, a position key of the mobile device C positioned out of the search range A1 does not forward-agree with any search key included in the list L. Accordingly, the position key of the mobile device A, and the position key of the mobile device B are included in the result data Res1.

FIGS. 27A through 27D are diagrams illustrating a second specific example of the search processing for mobile information. In the drawing, an example is illustrated wherein, with a search request Req2, (139.122, 35.561) has been specified as the latitude and longitude of the lower left apex of a search range A2, and (139.123, 35.562) has been specified as the upper right apex, and search for a mobile device that this search range includes has been requested.

In this case, the effective digit number KMAX becomes "3". That is to say, the precision of the search range A2 is 0.001 degrees. Accordingly, the search range A2 is, as illustrated in (2) in the drawing, treated as one cell C2 with one side being taken as 0.001 degrees. That is to say, one position key corresponding to the lower left apex (139.122, 35.561) of the cell C2 is added to the list L as a search key.

As a result thereof, position keys forward-agreeing with any search key included in the list L are searched from the mobile information storage unit 131. For example, as illustrated in (3) in the drawing, in the event that the mobile information of three mobile devices A, B, and C is stored in the mobile information storage unit 131, a position key of the mobile device A, and a position key of the mobile device B positioned in the search range A2 forward-agrees with a search key included in the list L. On the other hand, a position key of the mobile device C positioned out of the search range A2 does not forward-agree with a search key included in the list L. Accordingly, the position key of the mobile device A, and the position key of the mobile device B are included in the result data Rest.

FIGS. 28A through 28D are diagrams illustrating a third specific example of the search processing for mobile information. In the drawing, an example is illustrated wherein, with a search request Req3, (139.1221, 35.5611) has been specified as the latitude and longitude of the lower left apex of a search range A3, and (139.123, 35.562) has been specified as the upper right apex, and search for a mobile device that this search range includes has been requested.

In this case, the effective digit number KMAX becomes "4". That is to say, the precision of the search range A3 is 0.0001 degrees. Accordingly, the search range A3 is, as illustrated in (2) in the drawing, divided into 81 cell groups C3 with one side being taken as 0.0001 degrees. That is to say, 81 position keys corresponding to the cells included in the cell groups C3 are added to the list L as search keys.

As a result thereof, position keys forward-agreeing with any search key included in the list L are searched from the mobile information storage unit 131. For example, as illustrated in (3) in the drawing, in the event that the mobile information of three mobile devices A, B, and C is stored in the mobile information storage unit 131, a position key of the mobile device A, and a position key of the mobile device B positioned in the search range A3 forward-agree with any search key included in the list L. On the other hand, a position key of the mobile device C positioned out of the search range A3 does not forward-agree with any search key included in the list L. Accordingly, the position key of the mobile device A, and the position key of the mobile device B are included in the result data Res3.

FIGS. 29A through 29D are diagrams illustrating a fourth specific example of the search processing for mobile information. In the drawing, an example is illustrated wherein, with a search request Req4, (139.1221, 35.5611) has been specified as the latitude and longitude of the lower left apex of a search range A4, and (139.1225, 35.5614) has been specified as the upper right apex, and search for a mobile device that this search range includes has been requested.

In this case, the effective digit number KMAX becomes "4". That is to say, the precision of the search range A4 is 0.0001 degrees. Accordingly, the search range A4 is, as illustrated in (2) in the drawing, divided into 12 cell groups C4 with one side being taken as 0.0001 degrees. That is to say, 12 position keys corresponding to the cells included in the cell groups C4 are added to the list L as search keys.

As a result thereof, position keys forward-agreeing with any search key included in the list L are searched from the mobile information storage unit 131. For example, as illustrated in (3) in the drawing, in the event that the mobile information of three mobile devices A, B, and C is stored in the mobile information storage unit 131, a position key of the mobile device A positioned in the search range A4 forward-agrees with any search key included in the list L. On the other hand, a position key of the mobile device B, and a position key of the mobile device C positioned out of the search range A3 do not forward-agree with any search key included in the list L. Accordingly, the position key of the mobile device A is included in the result data Res4.

FIGS. 30A through 30D are diagrams illustrating a fifth specific example of the search processing for mobile information. In the drawing, an example is illustrated wherein, with a search request Req5, (139.1219, 35.5609) has been specified as the latitude and longitude of the lower left apex of a search range A5, and (139.1225, 35.5614) has been specified as the upper right apex, and search for a mobile device that this search range includes has been requested.

In this case, the effective digit number KMAX becomes "4". That is to say, the precision of the search range A5 is 0.0001 degrees. Accordingly, the search range A5 is, as illustrated in (2) in the drawing, divided into 30 cell groups C5 with one side being taken as 0.0001 degrees. That is to say, 30 position keys corresponding to the cells included in the cell groups C5 are added to the list L as search keys.

As a result thereof, position keys forward-agreeing with any search key included in the list L are searched from the mobile information storage unit 131. For example, as illustrated in (3) in the drawing, in the event that the mobile information of three mobile devices A, B, and C is stored in the mobile information storage unit 131, a position key of the mobile device A positioned in the search range A5 forward-agrees with any search key included in the list L. On the other hand, a position key of the mobile device B, and a position key of the mobile device C positioned out of the search range A5 do not forward-agree with any search key included in the list L. Accordingly, the position key of the mobile device A is included in the result data Res5.

FIGS. 31A through 31D are diagrams illustrating a sixth specific example of the search processing for mobile information. In the drawing, an example is illustrated wherein, with a search request Req6, (139.1219, 35.5609) has been specified as the latitude and longitude of the lower left apex of a search range A6, and (139.1225, 35.5614) has been specified as the upper right apex, and search for a mobile device that this search range includes has been requested.

In this case, the effective digit number KMAX becomes "4". That is to say, the precision of the search range A6 is 0.0001 degrees. Accordingly, the search range A6 is, as illustrated in (2) in the drawing, divided into 30 cell groups C6 with one side being taken as 0.0001 degrees. That is to say, 30 position keys corresponding to the cells included in the cell groups C6 are added to the list L as search keys.

As a result thereof, position keys forward-agreeing with any search key included in the list L are searched from the mobile information storage unit 131. For example, as illustrated in (3) in the drawing, let us say that mobile information of tow mobile devices A and B is stored in the mobile information storage unit 131. The range of the mobile device A includes five cells. Accordingly, with regard to the mobile device A, five position keys are stored in the mobile information storage unit 131. On the other hand, the range of the mobile device B includes three cells. Accordingly, with regard to the mobile device B, three position keys are stored in the mobile information storage unit 131.

One cell Aa making up the range of the mobile device A is included in the search range A6. Accordingly, the position key of the cell Aa forward-agrees with any search key included in the list L. On the other hand, the position key of another cell making up the mobile device A positioned out of the search range A6, and the position keys of all of the cells making up the mobile device B do not forward-agree with any search key included in the list L. Accordingly, the position key of the cell Aa is included in result data Res6. The cell Aa is a cell making up the mobile device A, and accordingly, the mobile device A is taken as a mobile device included in the search range.

That is to say, with the present embodiment, not only a mobile device alone completely included in the search range but also a mobile device a portion of which is overlapped with the search range are included in search results. Tentatively, when attempting to take a mobile device alone completely included in the search range as a search result, in the event that the position keys of all of the cells making up this mobile device forward-agree with the search key, the searching section 127 has to take the position keys of all of the cells as search results.

FIGS. 32A through 32D are diagrams illustrating a seventh specific example of the search processing for mobile information. In the drawing, an example is illustrated wherein, with a search request Req7a, (139.1223, 35.5612) has been specified as the latitude and longitude of the lower left apex of a search range A7, and (139.1224, 35.5613) has been specified as the upper right apex, and search for a mobile device that this search range includes has been requested. Note that, as indicated in a search request Req7b, in the event that (139.1223, 35.5612) has been specified as one set of latitude and longitude in increments of 1/10000 degrees as well, the same rectangular region as with the search range A7 has consequently been specified.

In this case, the effective digit number KMAX becomes "4". That is to say, the precision of the search range A6 is 0.0001 degrees. Accordingly, with regard to the search range A7, as illustrated in (2) in the drawing, one cell C7 with one side being taken as 0.0001 degrees is generated. This is search for a mobile device including the search range A7, and accordingly, not only the original search key corresponding to the cell C7 but also a round-off search key where a portion below a decimal point of the original search key is deleted one digit at a time are also added to the list L (see FIG. 20). Note that a portion below a decimal point of a search key is deleted one digit at a time, which results in that a character string serving as the original search key is deleted two characters. In the drawing, a cell C8 one digit upper than the cell C7, and a cell C9 two digits upper than the cell C7 are illustrated. Though upper digit cells than those are omitted for convenience, a position key corresponding to such each upper digit cell is added to the list L as a round-off search key.

As a result thereof, position keys completely agreeing with any search key included in the list L are searched from the mobile information storage unit 131. For example, as illustrated in (3) in the drawing, in the event that mobile information of two mobile devices M and N is stored in the mobile information storage unit 131, a position key of the mobile device M including the search range A7 completely agrees with a round-off search key with 1/1000 degrees included in the list L. While the number of cells in the search range A7 is "1", with regard to the position key of the mobile device M, the number of times of completely agreeing with a search key included in the list L is once. On the other hand, a position key of the mobile device N not including the search range A7 does not completely agree with any search key included in the list L. Accordingly, the position key of the mobile device M is included in the result data Res7.

As described above, according to the present embodiment, latitude and longitude are registered in KVS as a key in a position key format. Accordingly, with regard to correspondence information corresponding to this position key, high-speed search can be performed. The correspondence information is a general name for mobile information, facility information, area information, or the like. Specifically, for example, in the event of searching for mobile information included in a search range, intended mobile information can be searched by searching for a position key group forward-agreeing with any position key group corresponding to the specified search range.

Note that, with the present embodiment, as for the format of a position key, though an example is indicated wherein each digit of latitude and longitude is alternately arrayed in the sequence of longitude and latitude, the sequence of latitude and longitude may be inverted.

Also, all of the digits of latitude and longitude does not necessarily have to be alternately arrayed. That is to say, upper digits than the precision (precision of a search key) at the time of search does not have to be alternately arrayed. For example, with the example in FIG. 22, the precision of a search key is the third place below a decimal point. Accordingly, upper digits than the third place below a decimal point may be arrayed in the sequence of a longitude character string and a latitude character string. Specifically, according to the example in FIG. 22, a search key in this case becomes "+3556+1391221". Also, a position key of a mobile device becomes "+3556+139122132". With either of these, with regard to below the third place below a decimal point, the characters of a latitude character string and a longitude character string are alternately arrayed. In this case, this position key forward-agrees with this search key.

Thus, position keys according to the present embodiment are character strings where regarding all of the latitude and longitude, or in order from some upper digits counted from the least significant digit, the same digits are alternately arrayed one digit at a time. Some digits from the least significant digit mentioned here means digits below the third place below a decimal point with an immediately preceding example.

Also, with the present embodiment, the range of latitude has been taken as +90 degrees (north latitude) through −90 degrees (south latitude), and the range of longitude has been taken as +180 degrees (east longitude) through −180 degrees (west longitude). However, the range of latitude may be taken as 0 degree through 180 degrees, and the range of longitude may be taken as 0 degree through 360 degrees. In this case, a character indicating a sign (+ or −) does not have to be included in the head two characters of a position key.

Note that, with regard to cell groups to be generated regarding a rectangular region group making up a search range, the reason to perform integration into an upper digit cell is for consistently enabling search of a mobile device that the search range includes using search according to forward agreement of a search key regardless of the precision of a position key registered in the mobile information storage unit 131. For example, let us say that mobile information of a mobile device having the range of the cell C1*a* indicated in (2) in FIG. 26B has been registered in the mobile information storage unit 131. In this case, a position key regarding the cell C1*a* is in increments of 1/1000 degrees.

On the other hand, if we say that a rectangular region making up the position range A1 has been specified in increments of 1/10000 degrees, this rectangular region is, first, as illustrated in (1) in the drawing, divided into cell groups in increments of 1/10000 degrees. Even in the event of searching for a position key forward-agreeing with a position key (a search key) corresponding to each of the cell groups as it is, a position key corresponding to the cell C1*a* is not searched. This is because a search key is longer than a position key to be searched.

In order to exclude such a situation, cell groups making up a rectangular region group making up a search range are integrated into an upper digit cell as much as possible.

On the other hand, the reason why integration into an upper digit is performed regarding cell groups to be generated regarding a rectangular region group indicating size information of a mobile device (range of a mobile device) at the time of registering mobile information is for consistently enabling search of at least a part of mobile devices including the search range by complete agreement with a search key at the time of search of a mobile device including the search range.

For example, let us say that a rectangular region indicated with A1 in FIG. 26A has been specified as a rectangular region indicating size information (range) of a mobile device, and also registration has been requested. In this case, though the rectangular region indicated with A1 is a position range A1, now let us say that this is the range A1 of a mobile device. In this case, if we say that this rectangular region has been specified in increments of 1/10000 degrees, this rectangular region is first, as illustrated in (1), divided into cell groups in increments of 1/10000 degrees. If we say that these cell groups have not been integrated, and this mobile information has been registered, this mobile information is correlated with 144 position keys with precision of 1/10000 degrees.

Let us say that, in such a state, with a search request for a mobile device including a search range, the same latitude and longitude as with the lower left apex of a cell C1*a* in (2) in FIG. 26B has been specified as the lower left apex of this search range. That is to say, let us say that the same range as with the cell C1*a* has been specified as a search range. This latitude and longitude is in increments of 1/1000 degrees. Accordingly, a search key according to this search range is generated in increments of each of 1/1000 degrees, 1/100 degrees, 1/10 degrees, and 1 degree. In the event of attempting to search for a position key completely agreeing with any search key of these, there is no position key completely agreeing with these search keys of the 144 position keys with precision of 1/10000 described above. That is to say, a mobile device according to the range A1 is consequently not included in the search result including cell C1*a* regardless of including the cell C1*a*.

On the other hand, in the event that some cell groups included in the range A1 are, as illustrated in (2) in FIG. 26B, integrated into the cell C1*a* in increments of 1/1000 degrees, a position key corresponding to this cell C1*a* completely agrees with a search key with 1/1000 degrees of the above search keys. Accordingly, the mobile device according to the range A1 is searched assuming that the mobile device includes the cell C1*a*.

Though the embodiment of the present disclosure has been described in detail so far, the present disclosure is not restricted to such a particular embodiment, and various modifications and changes can be made within the scope of the present disclosure laid forth in the Claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information management method to be executed by a computer, the information management method comprising:
   accepting a registration request including values for latitude, longitude, and correspondence information corresponding to a place indicated by the latitude and the longitude;
   generating a character string as a key by alternately arraying one latitude character of latitude character string and one longitude character of longitude character string, the latitude character string and the longitude character string generated based on the latitude and the longitude, and the one latitude character and the one longitude character corresponding to a same digit position of at least two digits of the latitude and the longitude;
   dividing a position range corresponding to the latitude and the longitude into a plurality of increment regions according to precision of the values for the latitude and the longitude when the registration request has been received;
   generating, for the position range, a first group of a latitude minimum value and a longitude minimum value for the plurality of increment regions,
      wherein the generating of the character string as the key generates the key for the latitude and longitude minimum values included in the first group; and
   storing the correspondence information in a storage unit in a manner correlated with the key and storing the key in a manner correlated with the latitude and longitude minimum values in the first group,
   to thereby in response to a search request, execute a search for the stored key which is searchable for the correspondence information.

2. The information management method according to claim 1, wherein the generating of the first group of latitude and longitude minimum values comprises:
   integrating, in the first group of latitude and longitude minimum values, at least one other increment region which latitude and longitude precision value is larger by at least one digit than the precision of the values for the latitude and longitude of the position range, and
   generating a second group of the latitude and longitude minimum values of the other increment region not included in the increment region for the first group of latitude and longitude minimum values.

3. An information management method to be executed by a computer, the information management method comprising:
   accepting a search request which specifies values for latitude, longitude;
   generating a character string as a search key by alternately arraying one latitude character of a latitude character string corresponding to the specified latitude and one longitude character of a longitude character string corresponding to the specified longitude, the one latitude character and the one longitude character corresponding to a same digit position of at least two digits of the latitude and the longitude;

dividing a position range corresponding to the latitude and the longitude into a plurality of increment regions according to precision of the values for the latitude and the longitude when the search request has been received;

generating, for the position range, a first group of a latitude minimum value and a longitude minimum value for the plurality of increment regions, wherein the generating of the character string as the search key generates the search key for the latitude and longitude minimum values included in the first group; and searching for a stored key which forward agrees with the search key to search for information correlated with the stored key in a storage unit, wherein the searching searches for the stored key which forward agrees with the search key according to the latitude and longitude minimum values included in the first group.

4. The information management method according to claim 3, wherein the generating of the first group of latitude and longitude minimum values comprises:

integrating in the first group of latitude and longitude minimum values at least one other increment region which latitude and longitude precision value is larger by at least one digit than the precision of the values for the latitude and longitude of the position range, and generating a second group of the latitude and longitude minimum values of the other increment region not included in the increment region for the first group of latitude and longitude minimum values.

5. An information management apparatus comprising:

a processor that executes a procedure, the procedure comprising:

accepting a registration request including values for latitude, longitude, and correspondence information corresponding to a place indicated by the latitude and the longitude, generating a character string as a key by alternately arraying one latitude character of latitude character string and one longitude character of longitude character string, the latitude character string and the longitude character string generated based on the latitude and the longitude, and the one latitude character and the one longitude character corresponding to a same digit position of at least two digits of the latitude and the longitude, and dividing a position range corresponding to the latitude and the longitude into a plurality of increment regions according to precision of the values for the latitude and the longitude when the registration request has been received, generating, for the position range, a first group of a latitude minimum value and a longitude minimum value for the plurality of increment regions, wherein the generating of the character string as the key generates the key for the latitude and longitude minimum values included in the first group, and storing the correspondence information in a storage unit in a manner correlated with the key and storing the key in a manner correlated with the latitude and longitude minimum values in the first group, to thereby in response to a search request, execute a search for the stored key which is searchable for the correspondence information.

6. The information management apparatus according to claim 5, wherein the generating of the first group of latitude and longitude minimum values comprises:

integrating, in the first group of latitude and longitude minimum values, at least one other increment region which latitude and longitude precision value is larger by at least one digit than the precision of the values for the latitude and longitude of the position range, and generating a second group of the latitude and longitude minimum values of the other increment region not included in the increment region for the first group of latitude and longitude minimum values.

7. An information management apparatus comprising:

a processor that executes a procedure, the procedure comprising:

accepting a search request which specifies values for latitude, longitude, generating a character string as a search key by alternately arraying one latitude character of a latitude character string corresponding to the specified latitude and one longitude character of a longitude character string corresponding to the specified longitude, the one latitude character and the one longitude character corresponding to a same digit position of at least two digits of the latitude and the longitude, dividing a position range corresponding to the latitude and the longitude into a plurality of increment regions according to precision of the values for the latitude and the longitude when the search request has been received, generating, for the position range, a first group of a latitude minimum value, and a longitude minimum value for the plurality of increment regions, wherein the generating of the character string as the search key generates the search key for the latitude and longitude minimum values included in the first group, and searching for a stored key which forward agrees with the search key to search for information correlated with the stored key in a storage unit, wherein the searching searches for the stored key which forward agrees with the search key according to the latitude and longitude minimum values included in the first group.

8. The information management apparatus according to claim 7, wherein the generating the first group of latitude and longitude minimum values comprises:

integrating in the first group of latitude and longitude minimum values at least one other increment region which latitude and longitude precision value is larger by at least one digit than the precision of the values for the latitude and longitude of the position range, and generating a second group of the latitude and longitude minimum values of the other increment region not included in the increment region for the first group of latitude and longitude minimum values.

* * * * *